United States Patent [19]
Spiewak et al.

[11] Patent Number: 6,136,412
[45] Date of Patent: Oct. 24, 2000

[54] MICROTEXTURED CATALYST TRANSFER SUBSTRATE

[75] Inventors: Brian Edward Spiewak, Inver Grove Heights; Olester Benson, Jr., Woodbury; Mark Kevitt Debe, Stillwater, all of Minn.

[73] Assignee: 3M Innovative Properties Company, Saint Paul, Minn.

[21] Appl. No.: 09/369,619

[22] Filed: Aug. 6, 1999

Related U.S. Application Data

[60] Continuation-in-part of application No. 09/208,657, Dec. 10, 1998, which is a division of application No. 08/948,599, Oct. 10, 1997, Pat. No. 5,879,828.

[51] Int. Cl.[7] .............................. B32B 5/16; B32B 27/06; B32B 27/14; H01M 6/00; B44C 1/22
[52] U.S. Cl. ..................... 428/143; 428/144; 428/148; 428/323; 428/328; 428/411.1; 428/413; 428/421; 428/473.5; 428/474.4; 428/457; 428/522; 428/524; 29/623.1; 216/35; 422/177; 427/384
[58] Field of Search ..................... 428/141, 143, 428/144, 148, 414, 418, 421, 474.4, 474.7, 473.5, 524, 522, 411.1, 476.3, 457, 458, 460, 463, 323, 328, 168, 172, 413; 422/177; 216/35; 427/384; 29/623.1

[56] References Cited

U.S. PATENT DOCUMENTS

| | | | |
|---|---|---|---|
| H788 | 6/1990 | Schneider, Jr. ........................ | 156/634 |
| 3,442,715 | 5/1969 | Yee et al. ............................... | 502/4 |
| 3,676,222 | 7/1972 | Deibert ................................... | 429/42 |
| 3,969,545 | 7/1976 | Slocum .................................. | 427/163 |
| 4,148,294 | 4/1979 | Scherber et al. ...................... | 126/270 |
| 4,155,781 | 5/1979 | Diepers ................................. | 148/175 |
| 4,209,008 | 6/1980 | Lemkey et al. ....................... | 126/452 |
| 4,215,183 | 7/1980 | MacLeod ............................... | 429/30 |
| 4,252,843 | 2/1981 | Dorer et al. ........................... | 427/162 |
| 4,252,865 | 2/1981 | Gilbert et al. ......................... | 428/611 |
| 4,259,209 | 3/1981 | Nakane et al. ........................ | 252/430 |
| 4,293,394 | 10/1981 | Darlington et al. .................. | 204/98 |
| 4,340,276 | 7/1982 | Maffitt et al. ........................ | 350/164 |
| 4,396,643 | 8/1983 | Kuehn et al. ......................... | 427/160 |
| 4,539,256 | 9/1985 | Shipman ............................... | 428/315.5 |
| 4,550,123 | 10/1985 | Lopatin et al. ........................ | 521/64 |
| 4,557,957 | 12/1985 | Manniso ................................ | 428/36 |
| 4,568,598 | 2/1986 | Bilkadi et al. ........................ | 428/141 |
| 4,576,850 | 3/1986 | Martens ................................ | 428/156 |
| 4,650,845 | 3/1987 | Hegel .................................... | 526/261 |
| 4,654,104 | 3/1987 | McIntyre et al. ..................... | 204/98 |
| 4,654,281 | 3/1987 | Anderman et al. ................... | 429/209 |
| 4,719,533 | 1/1988 | Koch ..................................... | 361/230 |
| 4,720,400 | 1/1988 | Manniso ............................... | 427/243 |
| 4,726,989 | 2/1988 | Mrozinski ............................. | 428/315.5 |
| 4,731,310 | 3/1988 | Anderman et al. ................... | 429/194 |
| 4,735,875 | 4/1988 | Anderman et al. ................... | 429/194 |
| 4,791,037 | 12/1988 | Anderman ............................ | 429/196 |
| 4,810,594 | 3/1989 | Bregoli et al. ........................ | 429/13 |
| 4,812,352 | 3/1989 | Debe ..................................... | 428/142 |

(List continued on next page.)

FOREIGN PATENT DOCUMENTS

| | | |
|---|---|---|
| 1299936 | 5/1992 | Canada . |
| 0 094 679 A2 | 5/1983 | European Pat. Off. . |
| 0 309 259 A2 | 9/1988 | European Pat. Off. . |
| 0 700 108 | 3/1996 | European Pat. Off. . |
| 51-46589 | 4/1976 | Japan . |
| 57-060670 | 4/1982 | Japan . |
| 60-825 | 1/1985 | Japan . |
| 63-117321 | 5/1988 | Japan . |
| 6-68157 | 8/1994 | Japan . |
| 1100497 | 1/1968 | United Kingdom . |
| 1 547 534 | 6/1979 | United Kingdom . |
| WO 94/15210 | 7/1994 | WIPO . |
| WO 95/06002 | 2/1995 | WIPO . |
| WO 97/25369 | 7/1997 | WIPO . |

OTHER PUBLICATIONS

M. Uchida, Y. Aoyama, N. Eda, A. Ohta, J. Electrochem. Soc., *New Preparation Method for Polymer–Electrolyte Fuel Cells*, vol. 142, No. 2, Feb. 1995.

D. D. DesMarteau, *Novel Fluorinated Acids for Phosphoric Acid Fuel Cells*, Final Report, Dept. of Chemistry, Clemson University, Clemson, S.C., 1992.

Darryl D. DesMarteau, *Novel perfluorinated ionomers and ionenes*, Journal of Fluorine Chemistry, 72 (1995) p. 203–208.

Proceedings from DARPA's Direct Methanol Fuel Cell Program Review, System Planning Corporation, USA Today Bldg., Arlington, VA., Nov. 14–15, 1996, pp. 14–18.

K. Robbie, L.J. Friedrich, S.K. Dew, T. Smy, M.J. Brett, *Fabrication of thin films with highly porous microstructures*, J. Vac. Sci. Technol. A, vol. 13, No. 3, May/Jun. 1995, p. 1032–1035.

Kevin Robbie, Michael J. Brett, Akhlesh Lakhtakia, *First thin film realization of a helicoidal bianisotropic medium*, J. Vac. Sci. Technol. A 13(6), Nov./Dec. 1995 p. 2991–2993.

Kenneth G. Kreider, Michael J. Tarlov, James P. Cline, *Sputtered thin–film pH electrodes of platinum, palladium, ruthenium, and iridium oxides*, Sensprs amd Actiatprs B 29 (1995) p. 167–172.

E–TEK, Inc., Gas Diffusion Electrodes and Catalyst Materials, C. Noble Metal Catalysts on Carbon, 1995 Catalogue, p. 15–21.

(List continued on next page.)

*Primary Examiner*—Paul Thibodeau
*Assistant Examiner*—Ramsey Zacharia
*Attorney, Agent, or Firm*—Philip Y. Dahl

[57] ABSTRACT

A membrane electrode assembly is provided comprising an ion conducting membrane and one or more electrode layers that comprise nanostructured elements, wherein the nanostructured elements are in incomplete contact with the ion conducting membrane. This invention also provides methods to make the membrane electrode assembly of the invention. The membrane electrode assembly of this invention is suitable for use in electrochemical devices, including proton exchange membrane fuel cells, electrolyzers, chlor-alkali separation membranes, and the like.

24 Claims, 28 Drawing Sheets

U.S. PATENT DOCUMENTS

| | | | |
|---|---|---|---|
| 4,826,554 | 5/1989 | McIntyre et al. | 156/280 |
| 4,849,311 | 7/1989 | Itoh et al. | 429/192 |
| 4,853,305 | 8/1989 | Anderman et al. | 429/212 |
| 4,863,813 | 9/1989 | Kyer | 429/33 |
| 4,867,881 | 9/1989 | Kinzer | 210/490 |
| 4,910,099 | 3/1990 | Gottesfeld | 429/13 |
| 4,957,943 | 9/1990 | McAllister et al. | 521/64 |
| 4,992,126 | 2/1991 | Door | 156/182 |
| 5,039,561 | 8/1991 | Debe | 427/255.6 |
| 5,120,594 | 6/1992 | Mrozinski | 428/195 |
| 5,138,220 | 8/1992 | Kirkpatrick | 213/309 |
| 5,143,805 | 9/1992 | Anderman et al. | 429/217 |
| 5,162,167 | 11/1992 | Minh et al. | 429/30 |
| 5,176,786 | 1/1993 | Debe | 156/600 |
| 5,183,597 | 2/1993 | Lu | 264/1.4 |
| 5,238,729 | 8/1993 | Debe | 428/245 |
| 5,260,360 | 11/1993 | Mrozinski et al. | 425/95 |
| 5,264,299 | 11/1993 | Krasij et al. | 429/30 |
| 5,277,996 | 1/1994 | Marchetti et al. | 429/44 |
| 5,308,465 | 5/1994 | Hillrichs et al. | 204/283 |
| 5,326,619 | 7/1994 | Dower et al. | 428/164 |
| 5,336,558 | 8/1994 | Debe | 428/323 |
| 5,338,430 | 8/1994 | Parsonage et al. | 204/412 |
| 5,352,651 | 10/1994 | Debe et al. | 503/227 |
| 5,364,712 | 11/1994 | Townsend | 429/42 |
| 5,384,208 | 1/1995 | Brand et al. | 429/34 |
| 5,387,462 | 2/1995 | Debe | 428/245 |
| 5,395,705 | 3/1995 | Door et al. | 429/42 |
| 5,399,184 | 3/1995 | Harada | 29/623.4 |
| 5,415,888 | 5/1995 | Banerjee et al. | 427/125 |
| 5,418,007 | 5/1995 | Debe | 427/154 |
| 5,429,886 | 7/1995 | Struthers | 429/44 |
| 5,459,016 | 10/1995 | Debe et al. | 430/201 |
| 5,460,896 | 10/1995 | Takada et al. | 429/33 |
| 5,472,799 | 12/1995 | Watanabe | 429/30 |
| 5,514,461 | 5/1996 | Meguro et al. | 428/310.5 |
| 5,547,551 | 8/1996 | Bahar et al. | 204/296 |
| 5,561,000 | 10/1996 | Dirven et al. | 429/42 |
| 5,599,614 | 2/1997 | Bahar et al. | 442/171 |
| 5,614,306 | 3/1997 | Jobe et al. | 442/381 |
| 5,620,807 | 4/1997 | Mussell et al. | 429/33 |
| 5,626,805 | 5/1997 | Meguro et al. | 264/41 |
| 5,635,039 | 6/1997 | Cisar et al. | 204/252 |
| 5,635,041 | 6/1997 | Bahar et al. | 204/282 |
| 5,641,565 | 6/1997 | Sogo | 428/315.7 |
| 5,645,919 | 7/1997 | Bothe et al. | 428/143 |
| 5,645,929 | 7/1997 | Debe | 428/323 |
| 5,659,296 | 8/1997 | Debe et al. | 340/632 |
| 5,666,949 | 9/1997 | Debe et al. | 128/202.22 |
| 5,702,755 | 12/1997 | Mussell | 427/115 |
| 5,702,839 | 12/1997 | Frost et al. | 429/42 |
| 5,723,173 | 3/1998 | Fukuonka et al. | 427/115 |
| 5,783,325 | 7/1998 | Cabasso et al. | 429/42 |
| 5,843,390 | 12/1998 | Plinke et al. | 423/239.1 |
| 5,879,828 | 3/1999 | Debe et al. | 429/41 |
| 5,910,378 | 6/1999 | Debe et al. | 429/42 |

OTHER PUBLICATIONS

M. Razaq, A. Razaaq, E. Yeager, Darryl D. DesMarteau, S. Singh, *Perfluorosulfonimide as an Additive in Phosphoric Acid Fuel Cell*, J. Electrochem. Soc., vol. 136, No. 2, Feb. 1989, p. 385–390.

M. Razaq, A. Razaaq, E. Yeager, Darryl D. DesMarteau, S. Singh, *Oxygen electroreduction in perfluorinated sulphonyl imides*, Journal of Applied Electrochemistry 17 (1987) p. 1057–1064.

Minoru Mizuhata, Kazuaki Yasuda, Keisuke Oguro, Hiroyasu Takenaka, *Preparation of Gas Diffusion Electrode with Highly–active Catalyst for PEFCs*, Electrochemical Society Proceedings vol. 95–23, p. 24–33.

Acc. No. 96–005215/01 (Abstract from Derwent Database).
Acc. No. 88–311503/44 (Abstract from Derwent Database).
Acc. No. 88–144518/21 (Abstract from Derwent Database).
Acc. No. 95–218572/29 (Abstract from Derwent Database).
Acc. No. 88–317781/45 (Abstract from Derwent Database).
Acc. No. 95–188591/25 (Abstract from Derwent Database).

MICROTEXTURED CATALYST TRANSFER SUBSTRATE

This document is a continuation in part of U.S. Ser. No. 09/208,657 filed Dec. 10, 1998, which is in turn a division of U.S. Ser. No. 08/948,599 filed Oct. 10, 1997 and issued as U.S. Pat. No. 5,879,828 on Mar. 9, 1999, the disclosure of which is herein incorporated by reference.

TECHNICAL FIELD

This invention relates to microtextured catalyst transfer substrates and methods of making them, useful in producing membrane electrode assemblies which are suitable for use in electrochemical devices, including proton exchange membrane fuel cells, sensors, electrolyzers, chlor-alkali separation membranes, and the like.

BACKGROUND

Electrochemical devices, including proton exchange membrane fuel cells, sensors, electrolyzers, chlor-alkali separation membranes, and the like, have been constructed from membrane electrode assemblies (MEAs). Such MEAs comprise at least one electrode portion, which include a catalytic electrode material such as Pt in contact with an ion conductive membrane. Ion conductive membranes (ICMs) are used in electrochemical cells as solid electrolytes. In a typical electrochemical cell, an ICM is in contact with a cathode and an anode, and transports ions that are formed at the anode to the cathode, allowing current to flow in an external circuit connecting the electrodes. The central component of an electrochemical cell, such as a fuel cell, sensor, electrolyzer, or electrochemical reactor, is the 3-layer membrane electrode assembly, or MEA. It consists, in the most general sense, of two catalyzed electrodes between which is sandwiched an ion conducting electrolyte, preferably a solid polymer electrolyte for the applications of this invention. This 3-layer MEA is in turn sandwiched between two porous, electrically conducting elements called electrode backing layers (EBLs), to form a 5-layer MEA.

MEAs can be used in sensors and hydrogen/oxygen fuel cells. A typical 5-layer MEA for use in a hydrogen/oxygen fuel cell might comprise a first EBL, a first Pt electrode portion, an ICM containing a proton-exchange electrolyte, a second Pt electrode portion, and a second EBL. Such a five-layer MEA can be used to generate electricity by oxidization of hydrogen gas, as illustrated in the following reactions:

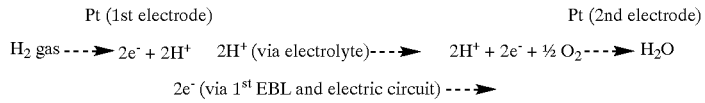

Pt (1st electrode)   Pt (2nd electrode)

$H_2$ gas ---▶ $2e^- + 2H^+$   $2H^+$ (via electrolyte)---▶   $2H^+ + 2e^- + \tfrac{1}{2} O_2$ ---▶ $H_2O$ $2e^-$ (via $1^{st}$ EBL and electric circuit) ---▶

In a typical hydrogen/oxygen fuel cell, the ions to be conducted by the membrane are protons. Importantly, ICMs do not conduct electrons/electricity, since this would render the fuel cell useless, and they must be essentially impermeable to fuel gasses, such as hydrogen and oxygen. Any leakage of the gasses employed in the reaction across the MEA results in waste of the reactants and inefficiency of the cell. For that reason, the ion exchange membrane must have low or no permeability to the gasses employed in the reaction.

ICMs also find use in chlor-alkali cells wherein brine mixtures are separated to form chlorine gas and sodium hydroxide. The membrane selectively transports sodium ions while rejecting chloride ions. ICMs also can be useful for applications such as diffusion dialysis, electrodialysis, and pervaporization and vapor permeation separations. While most ICMs transport cations or protons, it is known in the art that membranes can be prepared that are transportive to anions, such as $OH^-$.

The ICM typically comprises a polymeric electrolyte material, which may constitute its own structural support or may be contained in a porous structural membrane. Cation- or proton-transporting polymeric electrolyte materials may be salts of polymers containing anionic groups and nearby fluorocarbon groups.

Fuel cell MEAs have been constructed using catalyst electrodes in the form of applied dispersions of either Pt fines or carbon supported Pt catalysts. The predominant catalyst form used for polymer electrolyte membranes is Pt or Pt alloys coated onto larger carbon particles by wet chemical methods, such as the reduction of chloroplatinic acid. This conventional form of catalyst is dispersed with ionomeric binders, solvents and often polytetrafluoroethylene (PTFE) particles, to form an ink, paste or dispersion that is applied to either the membrane, or the electrode backing material. In addition to mechanical support, it is generally believed in the art that carbon support particles provide necessary electrical conductivity within the electrode layer.

In another variation, a catalyst metal salt can be reduced in an organic solution of a solid polymer electrolyte to form a distribution of catalyst metal particles in the electrolyte, without a support particle, which can then be cast onto an electrode backing layer to form the catalyst electrode.

In a further variation, Pt fines can be mixed directly with a solution of solvents and polymer electrolyte and coated onto the electrode backing layer or membrane ICM. However, because of limitations on how small the fines can be made, this approach typically results in very high, and therefore expensive, loading of the catalyst.

Various other structures and means have been used to apply or otherwise bring a catalyst in contact with an electrolyte to form electrodes. These MEAs can include: (a) porous metal films or planar distributions of metal particles or carbon supported catalyst powders deposited on the surface of the ICM; (b) metal grids or meshes deposited on or imbedded in the ICM; or (c) catalytically active nanostructured composite elements embedded in the surface of the ICM.

The prior art teaches that an effective MEA design must maximize contact between the catalyst and the ionomer electrolyte in order to obtain higher efficiency and capacity to handle higher currents. It is reportedly crucial to maximize the three-phase interface between the catalyst, ionomer and the gaseous reactants which may permeate the ionomer. To that end, a primary objective of previous research has been to optimize catalyst utilization by maximizing the surface area of catalyst which is in contact with the ion exchange resin or ionomer, in order to effectively facilitate the exchange of protons between the catalyst surface site of the redox reactions and the ion conduction membrane. Catalyst not in direct complete contact with the ionomer has been termed "non-reacting" catalyst.

Nanostructured composite articles have been disclosed. See, for example, U.S. Pat. Nos. 4,812,352, 5,039,561, 5,176,786, 5,336,558, 5338,430, and 5,238,729. U.S. Pat. No. 5,338,430 discloses that nanostructured electrodes embedded in solid polymer electrolyte offer superior properties over conventional electrodes employing metal fines or carbon supported metal catalysts, particularly for sensors, including:

protection of the embedded electrode material, more efficient use of the electrode material, and enhanced catalytic activity.

SUMMARY OF THE INVENTION

Briefly, this invention provides a membrane electrode or membrane electrode assembly (MEA) comprising an ion conducting membrane (ICM) and one or more electrode layers that comprise nanostructured elements, which further comprise catalytic material, wherein the nanostructured elements are in incomplete contact with the ICM, that is, wherein greater than 0% and less than 99% of the volume of said elements is embedded in the ICM. This invention also provides methods of making an MEA. The MEA of this invention is suitable for use in electrochemical devices, including proton exchange membrane fuel cells, sensors, electrolyzers, chlor-alkali separation membranes, and the like.

In the MEA of the present invention, the catalyst electrodes are incorporated into very thin surface layers on either side of an ion conductive membrane (ICM) and the catalyst electrode particles are in incomplete contact with the ICM. The electrode layers are in the form of a dense distribution of isolated catalyst particles partially encapsulated in the outermost surface of the ICM. One representative measure of catalyst utilization is the amount of electrochemical current in amps generated per milligram of catalyst (Pt) in a hydrogen/oxygen cell. It has been discovered that, in spite of the absence of complete contact with the ICM, conductive supports such as carbon particles, or additional ionomer, catalyst utilization that is several times higher than previously demonstrated can be achieved where a high density of catalyst particles carried on nanostructured supports is localized close to but partially outside of the surface of the ICM. This result contradicts expectations that any catalyst not in contact with an electrolyte ionomer or ICM is used less efficiently or not used at all.

The present invention also provides a substrate comprising a polymeric layer having a first surface wherein at least a portion of said first surface is microtextured, bearing microstructures on at least one microtextured portion of said first surface.

In another aspect, there are provided methods for preparing a membrane electrode assembly. One such method comprises the steps of 1) pretreating a membrane comprising a perfluorosulfonic acid polymer electrolyte by exposure to a non-aqueous solvent, and 2) compressing the pretreated membrane together with electrode particles so as to transfer the electrode particles to a surface of the membrane. A second such method comprises the step of compressing together a membrane which comprises an electrolyte and nanostructured elements so as to transfer the elements to a surface of the membrane and thereby to break between 5% and 100% of the elements into two or more pieces. A third such method comprises the steps of 1) applying nanostructured elements to a surface of an electrode backing layer, and 2) joining that surface of the electrode backing layer to a membrane layer which comprises an electrolyte.

The MEA of this invention can be made by lamination transfer of the nanostructured elements so as to only partially embed them in the surfaces of either the ICM or EBL. In one embodiment, partial embedding is accomplished by carrying out the attachment at low temperatures. The low temperature process is preferably accomplished by pretreating the ICM by exposure to a solvent, most preferably heptane, just prior to attaching the catalyst coated nanostructured acicular support particles. Static pressing or continuous nip rolling methods can be used. In another embodiment, the catalyst support particles, preferably with very low catalyst loadings of less than 0.1 mg/cm$^2$, are generated and transfered to the ICM surface such that they are broken by compressive forces into a thin and dense distribution of smaller elements that are partially embedded in the ICM.

The present invention provides an MEA comprising nanostructured elements in incomplete contact with an ICM wherein preferably there is a dense distribution of nanoscopic catalyst particles in incomplete contact with an ICM. The nanostructured elements can have one end embedded in an ICM and another end protruding from the ICM. The population of nanostructured elements may lie partially within and partially outside an ICM. The methods of making an MEA include a process wherein the ICM is pretreated with a solvent prior to compression with nanostructured elements to form the electrode layer. A second method includes a process wherein the nanostructured elements are broken by compressive forces into a dense distribution of smaller elements during the formation of the electrode layer. A third method of making an MEA includes a process wherein the nanostructured elements are applied to an electrode backing layer which is then joined to an ICM to form an MEA.

In another aspect, the present invention provides an MEA comprising microtextures which increase the effective catalyst surface density of the MEA.

In a further aspect, the invention provides a fuel cell assembly comprising at least one MEA disclosed above.

In yet another aspect, the invention provides an electrochemical device comprising at least one MEA disclosed above.

In still another aspect, the present invention provides a process for making a membrane electrode assembly comprising the steps of:

A) providing a substrate comprising a polymeric layer having a first surface wherein at least a portion of said first surface is microtextured, bearing microstructures on at least one microtextured portion of said first surface and having a catalyst deposited on the microstructures;

B) providing a polymer electrolyte membrane; and

C) transferring the microstructures to one or more surfaces of the polymer electrolyte membrane.

As used herein:

"dimensionally stable" means retaining original spatial dimensions within the stated tolerance under the relevant conditions;

"prepolymeric composition" means monomers, oligomers, short chain polymers, and mixtures thereof, which are capable of reacting further to increase their polymeric character and/or molecular weight, typically with accompanying desirable changes in their physical properties;

"curing" means exposing to conditions such as thermal energy and/or radiation energy that change a prepolymeric composition into a more highly polymeric composition, including crosslinking and/or further polymerization;

"composite membrane" means a membrane composed of more than one material and including both a porous membrane material and an ion conducting electrolyte material;

"membrane electrode assembly" means a structure comprising a membrane that includes an electrolyte and at least one but preferably two or more electrodes adjoining the membrane;

"microtextures" means surface structures, features or convolutions made by any process, including impression, molding or etching, whose average depth is between 1 and 100 micrometers ($\mu$m);

"microtextured surface" means a surface or portion of a surface having a multiplicity of microtextures over the majority of its extent, but preferably over 75% or more of its extent and more preferably over 90% or more of its extent, which may or may not also comprise occasional larger features;

"complete contact" means, with regard to contact between a catalyst particle and an ICM, that the catalyst particle is fully embedded in the ICM;

"nanostructured element" means an acicular, discrete, microscopic structure comprising a catalytic material on at least a portion of its surface;

"microstructure" means an acicular, discrete, microscopic structure;

"nanostructures" means surface structures, features, convolutions, and the like having at least one dimension of about 10 nanometers (nm) or less or having a crystallite size of about 10 nm or less measured as diffraction peak half widths in standard 2-theta x-ray diffraction scans;

"nanoscopic catalyst particle" means a particle of catalyst material having at least one dimension of about 10 nm or less or having a crystallite size of about 10 nm or less, measured as diffraction peak half widths in standard 2-theta x-ray diffraction scans;

"adhesion treating" means thermal, electrical, mechanical or chemical modification of a layer or the addition of a tie layer or other material to enhance the interfacial adhesion of the treated layer to another layer;

"acicular" means having a ratio of length to average cross-sectional width of greater than or equal to 3;

"discrete" refers to distinct elements, having a separate identity, but does not preclude elements from being in contact with one another; and "microscopic" means having at least one dimension equal to or smaller than about a micrometer.

It is an advantage of the present invention to provide an MEA with superior catalyst particle density and utilization and superior current capacity. In addition, it is an advantage of the present invention to provide methods of making the MEA of the present invention which are practical for batchwise or continuous manufacture. Furthermore, it is an advantage of the present invention to provide a substantially self-humidifying cathode, reducing the need to humidify the cathode oxidant supply. It is still another advantage of the present invention to provide a microtextured catalyst transfer substrate that can increase the PEM surface area, be reused, and/or enable continuous roll goods processing of these materials.

DETAILED DESCRIPTION

The present invention describes a membrane electrode assembly (MEA), in which catalyst electrodes are incorporated into very thin surface layers on either side of an ion conductive membrane (ICM) and in which the catalyst electrode particles are in incomplete contact with the ICM. The electrode layers are in the form of a dense distribution of discrete catalyst particles partially encapsulated in the outermost surface of the ICM.

The MEA of this invention can be made by lamination transfer of the catalyst support particles so as to only partially embed them in the surfaces of either the 2CM or EBL. In one embodiment, partial embedding is accomplished by carrying out the attachment at low temperatures. The low temperature process is preferably accomplished by pretreating the ICM, which is preferably a perfluorosulfonic acid polymer membrane, by exposure to a solvent, most preferably heptane, just prior to attaching the catalyst coated nanostructured acicular support particles. Static pressing or, more preferably, continuous nip rolling methods can be used. In another embodiment, the catalyst coated support particles are generated and transfered to the ICM surface such that they are broken by compressive forces into a thin and dense distribution of smaller elements that are no longer necessarily acicular and are partially embedded in the ICM.

Figure 1:
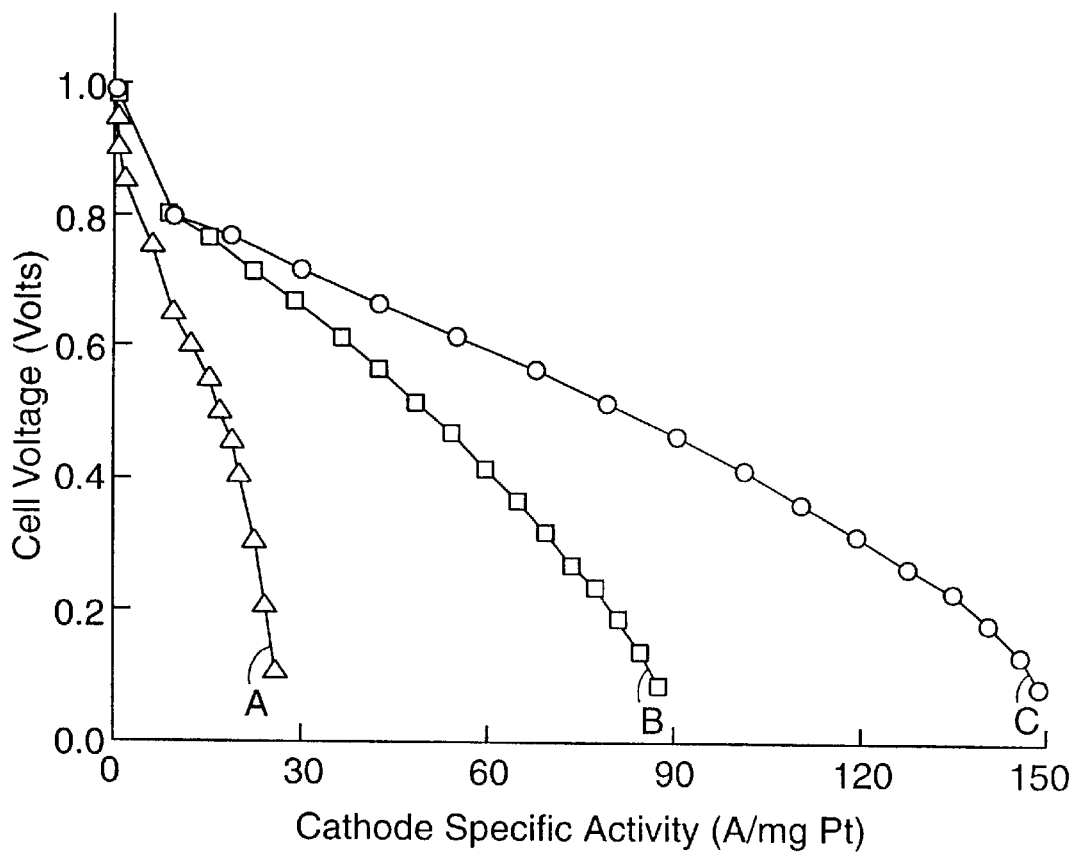
FIG. 1 is a graph of cell voltage vs. cathode specific activity for two fuel cells of the present invention and a comparative example.

The present invention allows much lower catalyst loadings than previously attained, due to improved catalyst utilization and improved access to the catalyst by the gaseous reactants as a result of localization of the catalyst in a thinner layer, closer to the surface, on a support that takes less volume. As shown in FIG. 1, the catalyst utilization in amps/mg of Pt is 4–5 times higher than previously reported with conventional catalysts under the same test conditions. Reducing the amount of catalyst required is very important because of the high cost of catalyst materials. Because the present invention allows the catalyst surface area per unit volume to be much higher than conventional catalysts, and more of it is accessible and utilized, the amount of water generated on the cathode of a ICM fuel cell per unit volume basis of catalyst/membrane interface is higher and therefore this interface region can be self-humidifying. This reduces the need to humidify the cathode oxidant supply and therefore improves overall system efficiency.

It has been discovered that it is not necessary to have intimate contact between all of the catalyst surface area and polymer electrolyte to obtain superior fuel cell performance. It is shown that a majority of the catalyst surface area on the acicular support particles can be tens, hundreds or thousands of Angstroms away from the ICM itself and give improved performance.

Figure 2:
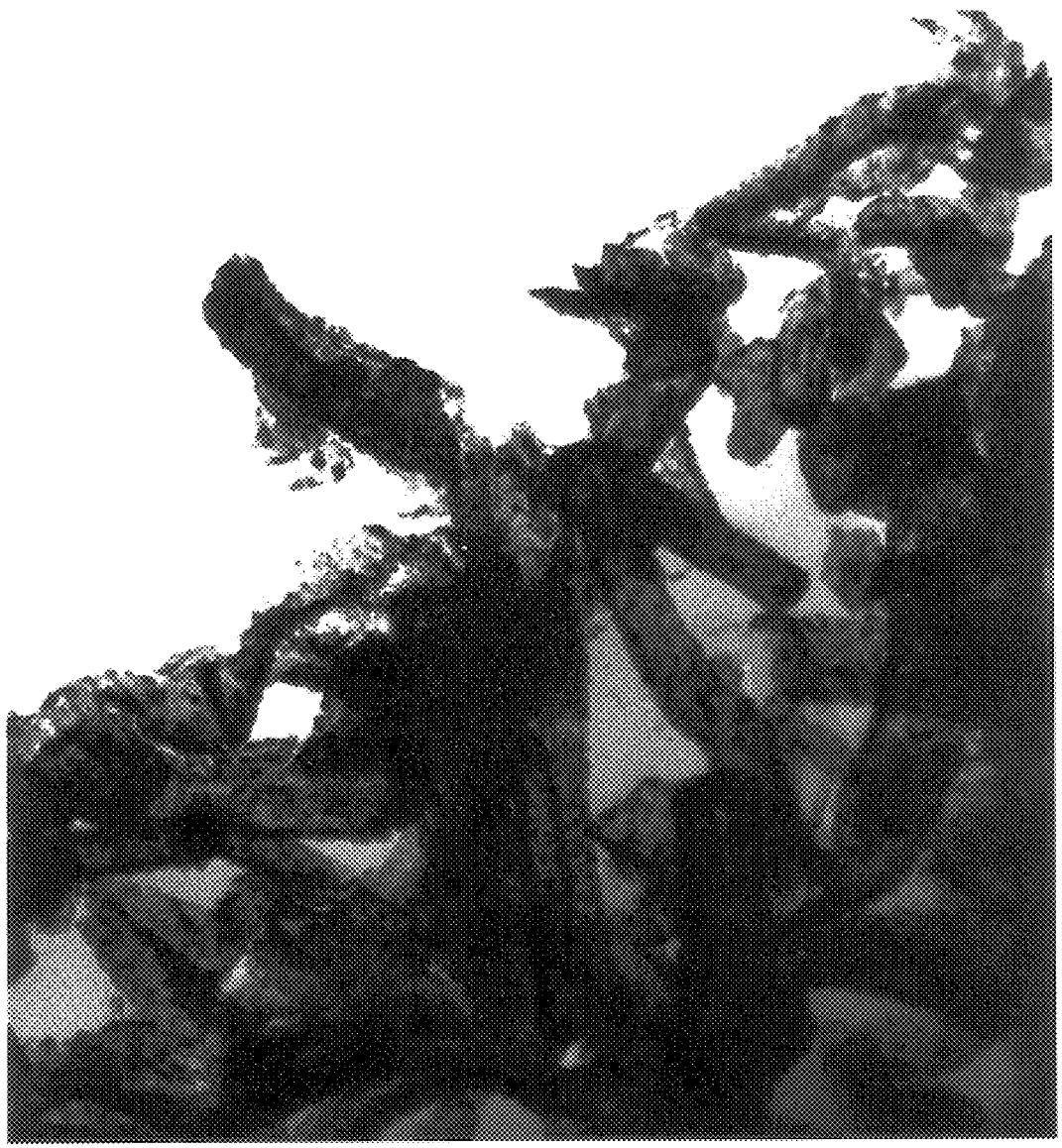
FIG. 2 is a transmission electron micrograph taken at 300,000× magnification of a cross-section of one surface of an MEA of the present invention.
Figure 3:
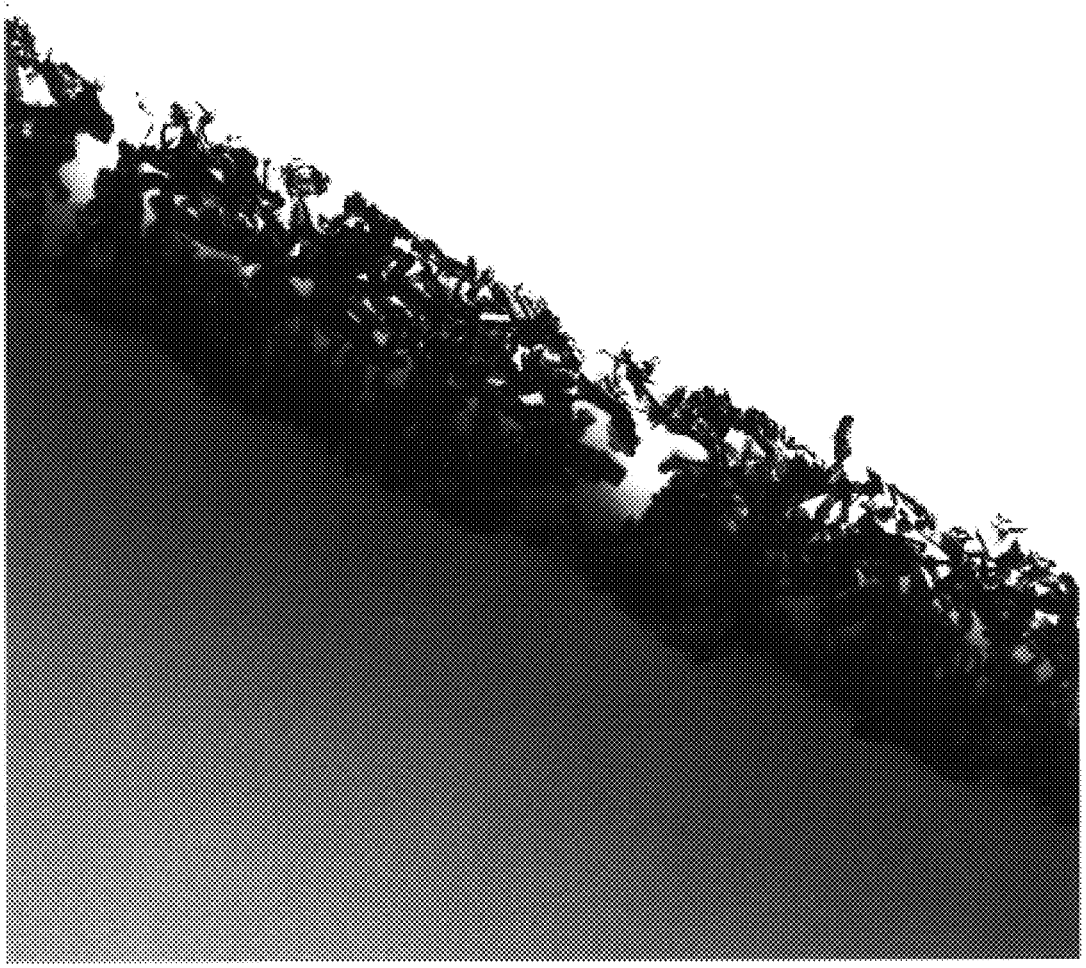
FIG. 3 is a transmission electron micrograph taken at 30,000× magnification of a cross-section of one surface of an MEA of the present invention.

The process for preparing the MEA involves deposition of catalyst material onto oriented acicular support particles previously arrayed on an initial substrate, then transfer of that film of catalyst support particles to the surface of the ICM or EBL. The catalyst is applied to the outer surface of the support particles and the catalyst support particles are localized within 2 μm of the ICM/EBL interface. FIGS. 2 and 3 show transmission electron micrographs taken at magnifications of 300,000× and 30,000× of a thin cross-section of one surface of a catalyst coated ion exchange membrane of one embodiment of the current invention. Pt particles are distributed over larger non-conductive, acicular shaped support particles that are randomly arrayed and partially embedded in the surface of the ICM. The Pt loading for the MEA shown in FIGS. 2 and 3 is 0.025 mg/cm$^2$. The Pt catalyst particles are seen as black dots, estimated to be less than about 5 nm in size, decorating pieces and fragments of a non-conductive support material. Some of the support pieces are wholly embedded within the membrane and others are partially embedded. There is no other ionomer or electrolyte besides the ICM. The support fragments have no spatial characteristic in common other than that they are localized within a very thin layer, less than 2 μm thick, at the surface of the solid polymer electrolyte membrane. For a given catalyst loading (in mg/cm$^2$) the electrochemical activity of the catalyst electrode is directly related to the active surface area of that catalyst. That surface area is in turn determined by the number of catalyst particles and their sizes, since the smaller the particle the higher the surface area to volume ratio. For high catalyst activities in fuel cell electrodes catalyst particles with dimensions in the range of 2–10 nm are desirable.

For the purpose of illustration, if 0.025 mg/cm$^2$ of Pt catalyst is dispersed into 2.5 nm diameter particles, distributed into a membrane surface layer 1 μm thick, then the number density of particles in this surface region would be $14 \times 10^{17}/cm^3$. This is an order of magnitude larger than the number density that would be found for similar sized catalyst particles if they were supported on typical carbon particles, which occupy a much larger volume, and which are typically applied in layer thickness of at least 10 1m.

The catalyst support of the present invention also shows improved weight per cent loading of catalyst. The acicular support particles of the instant invention can support much higher weight percentages of catalyst while the catalyst particle size remains relatively small. This distinguishes commonly used carbon particles. For example, a common catalyst currently sold by E-tek, Inc., Natick, Mass., for use in fuel cells is 20 to 40 wt % Pt on Vulcan XC-72 carbon black. Higher weight percents, beyond 80%, lead to larger catalyst particles and lower specific surface area of the catalyst. For example, catalyst particles composed of 80% Pt on Vulcan XC-72 carbon black have an average particle size of 25 nm (see, e.g., the E-tek 1995 Catalog).

Figure 4:
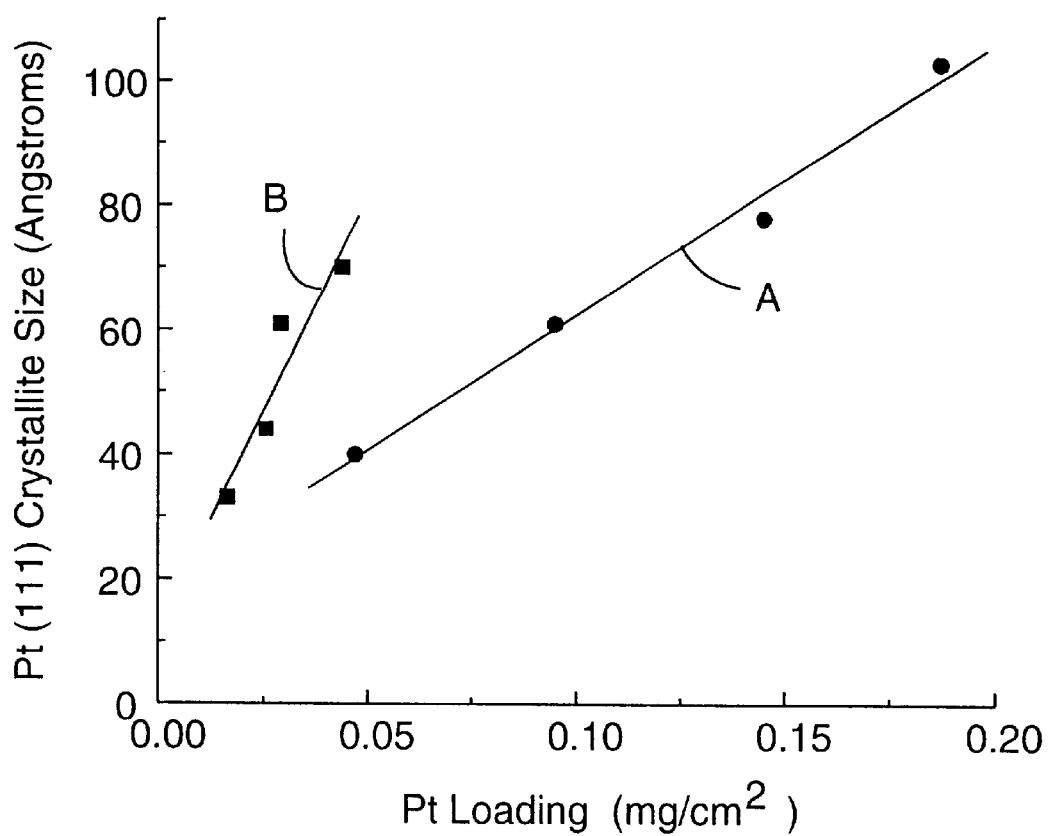
FIG. 4 is a graph of Pt crystallite size vs. Pt loading for nanostructured catalyst supports of the present invention.

In contrast, nanostructured support particles of this invention have a mass density of 0.005 mg/cm$^2$ and are coated with at least 0.025 mg/cm$^2$ of platinum, representing a catalyst wt % of 83.3. (See type B particles of the examples below.) Higher Pt loading can result in an even greater wt %. FIG. 2 shows such a loading, where the catalyst particles are still on the order of 4 nm in size, as shown in FIG. 4. Hence, in contrast to conventional catalyst supports, the instant invention can support extremely high wt % loadings of catalyst without loss of the desirable small sized particles having a high surface area-to-volume ratio. This is due to the acicular shape (high aspect ratio) of the particles, the large number per unit area contained on the original support substrate, and the tendency of the catalyst to nucleate into small particles as it is deposited on the supports by the particular deposition method used. These are desirable characteristics of the catalyst support of the instant invention.

The use of nanostructured elements in catalyst electrode layers is one factor allowing an extremely high weight percent loading of catalyst, while still obtaining small catalyst particles having a high surface area-to-volume ratio. This is due to 1) nucleation of the catalyst into small distinct particles as it is deposited on the support particles, 2) the density of distinct catalyst particles on the surface of each element, 3) the acicular shape of the nanostructured elements, and 4) the large number of elements per unit area.

Nanostructured elements suitable for use in the present invention may comprise metal-coated whiskers of organic pigment, most preferably C.I. PIGMENT RED 149 (perylene red or PR 149). The crystalline whiskers have substantially uniform but not identical cross-sections, and high length-to-width ratios. The nanostructured whiskers are conformally coated with materials suitable for catalysis, and which endow the whiskers with a fine nanoscopic surface structure capable of acting as multiple catalytic sites.

Methods for making microstructured layers are known in the art. For example, methods for making organic microstructured layers are disclosed in *Materials Science and Engineering*, A158 (1992), pp. 1–6; *J. Vac. Sci. Technol. A*, 5, (4), July/August, 1987, pp. 1914–16; *J. Vac. Sci. Technol. A*, 6, (3), May/August, 1988, pp. 1907–11; *Thin Solid Films*, 186, 1990, pp. 327–47; *J. Mat. Sci.*, 25, 1990, pp. 5257–68; *Rapidly Quenched Metals*, Proc. of the Fifth Int. Conf. on Rapidly Quenched Metals, Wurzburg, Germany (Sep. 3–7, 1984), S. Steeb et al., eds., Elsevier Science Publishers B.V., New York, (1985), pp. 1117–24; *Photo. Sci. and Eng.*, 24, (4), July/August, 1980, pp. 211–16; and U.S. Pat. Nos. 4,568,598 and 4,340,276, the disclosures of which patents are incorporated herein by reference. Methods for making inorganic-based microstructured layers of whiskers are disclosed, for example, in *J. Vac. Sci. Tech. A*, 1, (3), July/September, 1983, pp. 1398–1402 and U.S. Pat. No. 3,969,545; U.S. Pat. Nos. 4,252,865, 4,396,643, 4,148,294, 4,252,843, 4,155,781, 4,209,008, and 5,138,220, the disclosures of which patents are incorporated herein by reference. K. Robbie, et al, "Fabrication of Thin Films with Highly Porous Microstructures," *J. Vac. Sci. Tech. A*, Vol. 13 No. 3, May/June 1995, pages 1032–35 and K. Robbie, et al., "First Thin Film Realization of Bianisotropic Medium," *J. Vac. Sci. Tech. A*, Vol. 13, No. 6, November/December 1995, pages 2991–93.

Orientation of the microstructures is generally uniform in relation to the surface of the substrate. The microstructures are usually oriented normal to the original substrate surface, the surface normal direction being defined as that direction of the line perpendicular to an imaginary plane lying tangent to the local substrate surface at the point of contact of the base of the microstructure with the substrate surface. The surface normal direction is seen to follow the contours of the surface of the substrate. The major axes of the microstructures can be parallel or nonparallel to each other.

Alternatively, the microstructures can be nonuniform in shape, size, and orientation. For example, the tops of the microstructures can be bent, curled, or curved, or the microstructures can be bent, curled, or curved over their entire length.

Preferably, the microstructures are of uniform length and shape, and have uniform cross-sectional dimensions along their major axes. The preferred length of each microstructure is less than about 50 $\mu$m. More preferably, the length of each microstructure is in the range from about 0.1 to 5 $\mu$m, most preferably 0.1 to 3 $\mu$m. Within any microstructured layer it is preferable that the microstructures be of uniform length. Preferably, the average cross-sectional dimension of each microstructure is less than about 1 $\mu$m, more preferably 0.01 to 0.5 $\mu$m. Most preferably, the average cross-sectional dimension of each microstructure is in the range from 0.03 to 0.3 $\mu$m.

Preferably, the microstructures have an areal number density in the range from about $10^7$ to about $10^{11}$ microstructures per square centimeter. More preferably, the microstructures have an areal density in the range from about $10^8$ to about $10^{10}$ microstructures per square centimeter.

Microstructures can have a variety of orientations and straight and curved shapes, (e.g., whiskers, rods, cones, pyramids, cylinders, laths, and the like that can be twisted, curved, or straight), and any one layer can comprise a combination of orientations and shapes.

The microstructures have an aspect ratio (i.e., a length to diameter ratio) preferably in the range from about 3:1 to about 100:1.

Materials useful as a substrate include those which maintain their integrity at the temperature and vacuum imposed upon them during the vapor deposition and annealing steps. The substrate can be flexible or rigid, planar or non-planar, convex, concave, textured, or combinations thereof.

Preferred substrate materials include organic materials and inorganic materials (including, for example, glasses, ceramics, metals, and semiconductors). Preferred inorganic substrate materials are glass or metal. A preferred organic substrate material is a polyimide. More preferably, the substrate is metallized with a 10–70 nm thick layer of an electrically conductive metal for removal of static charge. The layer may be discontinuous. Preferably the layer is the same metal used to coat the microstructure whiskers.

Representative organic substrates include those that are stable at the annealing temperature, for example, polymers such as polyimide film (commercially available, for example, under the trade designation "KAPTON" from DuPont Electronics, Wilmington, Del.), high temperature stable polyimides, polyesters, polyamides, and polyaramids.

Metals useful as substrates include, for example, aluminum, cobalt, copper, molybdenum, nickel, platinum, tantalum, or combinations thereof. Ceramics useful as a substrate material include, for example, metal or non-metal oxides such as alumina and silica. A useful inorganic non-metal is silicon.

The organic material from which the microstructures can be formed may be coated onto the substrate using techniques known in the art for applying a layer of an organic material onto a substrate, including, for example, vapor phase deposition (e.g., vacuum evaporation, sublimation, and chemical vapor deposition), and solution coating or dispersion coating (e.g., dip coating, spray coating, spin coating, blade or knife coating, bar coating, roll coating, and pour coating (i.e., pouring a liquid onto a surface and allowing the liquid to flow over the surface)). Preferably, the organic layer is applied by physical vacuum vapor deposition (i.e., sublimation of the organic material under an applied vacuum).

Useful organic materials for producing microstructures by, for example, coating followed by plasma etching, can include for example, polymers and prepolymers thereof (e.g., thermoplastic polymers such as, for example, alkyds, melamines, urea formaldehydes, diallyl phthalates, epoxies, phenolics, polyesters, and silicones; thermoset polymers, such as acrylonitrile-butadiene-styrenes, acetals, acrylics, cellulosics, chlorinated polyethers, ethylene-vinyl acetates, fluorocarbons, ionomers, nylons, parylenes, phenoxies, polyallomers, polyethylenes, polypropylenes, polyamide-imides, polyimides, polycarbonates, polyesters, polyphenylene oxides, polystyrenes, polysulfones, and vinyls); and organometallics (e.g., bis($\eta^5$-cyclopentadienyl)iron (II), iron pentacarbonyl, ruthenium pentacarbonyl, osmium pentacarbonyl, chromium hexacarbonyl, molybdenum hexacarbonyl, tungsten hexacarbonyl, and tris(triphenylphosphine) rhodium chloride).

Preferably, the chemical composition of the organic-based microstructured layer will be the same as that of the starting organic material. Preferred organic materials useful in preparing the microstructured layer include, for example, planar molecules comprising chains or rings over which $\eta$-electron density is extensively delocalized. These organic materials generally crystallize in a herringbone configuration. Preferred organic materials can be broadly classified as polynuclear aromatic hydrocarbons and heterocyclic aromatic compounds.

Polynuclear aromatic hydrocarbons are described in Morrison and Boyd, *Organic Chemistry*, Third Edition, Allyn and Bacon, Inc. (Boston: 1974), Chapter 30. Heterocyclic aromatic compounds are described in Morrison and Boyd, supra, Chapter 31.

Preferred polynuclear aromatic hydrocarbons, which are commercially available, include, for example, naphthalenes, phenanthrenes, perylenes, anthracenes, coronenes, and pyrenes. A preferred polynuclear aromatic hydrocarbon is N,N'-di(3,5-xylyl)perylene-3,4,9, 10 bis(dicarboximide) (commercially available under the trade designation "C. I. PIGMENT RED 149" from American Hoechst Corp. of Somerset, N.J.), herein designated "perylene red."

Preferred heterocyclic aromatic compounds, which are commercially available, include, for example, phthalocyanines, porphyrins, carbazoles, purines, and pterins. Representative examples of heterocyclic aromatic compounds include, for example, metal-free phthalocyanine (e.g., dihydrogen phthalocyanine) and its metal complexes (e.g. copper phthalocyanine).

The organic materials preferably are capable of forming a continuous layer when deposited onto a substrate. Preferably, the thickness of this continuous layer is in the range from 1 nanometer to about one thousand nanometers.

Orientation of the microstructures can be affected by the substrate temperature, the deposition rate, and angle of incidence during deposition of the organic layer. If the temperature of the substrate during deposition of the organic material is sufficiently high (i.e., above a critical substrate temperature which has been associated in the art with a value one-third the boiling point, in degrees Kelvin, of the organic material), the deposited organic material will form randomly oriented microstructures either as deposited or when subsequently annealed. If the temperature of the substrate during deposition is relatively low (i.e., below the critical substrate temperature), the deposited organic material tends to form uniformly oriented microstructures when annealed. For example, if uniformly oriented microstructures comprising perylene red are desired, the temperature of the substrate during the deposition of the perylene red is preferably about 0 to about 30° C. Certain subsequent conformal coating processes, such as DC magnetron sputtering and cathodic arc vacuum processes, can produce curvilinear microstructures.

There can be an optimum maximum annealing temperature for different film thicknesses in order to fully convert the deposited layer to microstructures. When fully converted, the major dimension of each microstructure is directly proportional to the thickness of the initially deposited organic layer. Since the microstructures are discrete, are separated by distances on the order of their cross-sectional dimensions, and preferably have uniform cross-sectional dimensions, and all the original organic film material is converted to microstructures, conservation of mass implies that the lengths of the microstructures will be proportional to the thickness of the layer initially deposited. Due to this relationship of the original organic layer thickness to the lengths of the microstructures, and the independence of cross-sectional dimensions from length, the lengths and aspect ratios of the microstructures can be varied independently of their cross-sectional dimensions and areal densities. For example, it has been found that the length of microstructures are approximately 10–15 times the thickness of the vapor deposited perylene red layer, when the thickness ranges from about 0.05 to about 0.2 $\mu$m. The surface area of the microstructured layer (i.e., the sum of the surface areas of the individual microstructures) is much greater than that of the organic layer initially deposited on the substrate. Preferably, thickness of the initially deposited layer is in the range from about 0.03 to about 0.5 $\mu$m.

Each individual microstructure can be monocrystalline or polycrystalline, rather than amorphous. The microstructured layer can have highly anisotropic properties due to the crystalline nature and uniform orientation of the microstructures.

If a discontinuous distribution of microstructures is desired, masks may be used in the organic layer deposition step to selectively coat specific areas or regions of the substrate. Other techniques known in the art for selectively depositing an organic layer on specific areas or regions of a substrate may also be useful.

In the annealing step, the substrate having an organic layer coated thereon is heated in a vacuum for a time and at a temperature sufficient for the coated organic layer to undergo a physical change, wherein the organic layer grows to form a microstructured layer comprising a dense array of discrete, oriented monocrystalline or polycrystalline microstructures. Uniform orientation of the microstructures is an inherent consequence of the annealing process when the substrate temperature during deposition is sufficiently low. Exposure of the coated substrate to the atmosphere prior to the annealing step is not observed to be detrimental to subsequent microstructure formation.

If, for example, the coated organic material is perylene red or copper phthalocyanine, annealing is preferably done in a vacuum (i.e., less than about 0.001 Torr) at a temperature in the range from about 160 to about 270° C. The annealing time necessary to convert the original organic layer to the microstructured layer is dependent on the annealing temperature. Typically, an annealing time in the range from about 10 minutes to about 6 hours is sufficient. Preferably the annealing time is in the range from about 20 minutes to about 4 hours. Further, for perylene red, the optimum annealing temperature to convert all of the original organic layer to a microstructured layer, but not sublime it away, is observed to vary with the deposited layer thickness. Typically, for original organic layer thicknesses of 0.05 to 0.15 $\mu$m, the temperature is in the range of 245 to 270° C.

The time interval between the vapor deposition step and the annealing step can vary from several minutes to several months, with no significant adverse effect, provided the coated composite is stored in a covered container to minimize contamination (e.g., dust). As the microstructures grow, the organic infrared band intensities change and the laser specular reflectivity drops, allowing the conversion to be carefully monitored, for example, in situ by surface infrared spectroscopy. After the microstructures have grown to the desired dimensions, the resulting layered structure, which comprises the substrate and the microstructures, is allowed to cool before being brought to atmospheric pressure.

If a patterned distribution of microstructures is desired, microstructures may be selectively removed from the substrate, for example, by mechanical means, vacuum process means, chemical means, gas pressure or fluid means, radiation means, and combinations thereof. Useful mechanical means include, for example, scraping microstructures off the substrate with a sharp instrument (e.g., with a razor blade), and encapsulating with a polymer followed by delamination. Useful radiation means include laser or light ablation. Such ablation can result in a patterned electrode. Useful chemical means include, for example, acid etching selected areas or regions of the microstructured layer. Useful vacuum means include, for example, ion sputtering and reactive ion etching. Useful air pressure means include, for example, blowing the microstructures off the substrate with a gas (e.g., air) or fluid stream. Combinations of the above are also possible, such as use of photoresists and photolithography.

The microstructures can be extensions of the substrate and of the same material as the substrate by, e.g., vapor depositing a discontinuous metal microisland mask onto the surface of a polymer, then plasma or reactive ion etching away the polymer material not masked by the metal microislands, to leave polymer substrate posts protruding from the surface, so long as they are transferable to the ICM.

A preferred method for making an organic-based microstructured layer is disclosed in U.S. Pat. Nos. 4,812,352 and 5,039,561, the disclosures of which are incorporated herein by reference. As disclosed therein, a method for making a microstructured layer comprises the steps of i) depositing or condensing a vapor of an organic material as a thin, continuous or discontinuous layer onto a substrate; and ii) annealing the deposited organic layer in a vacuum for a time and at a temperature sufficient to induce a physical change in the deposited organic layer to form a microstructured layer comprising a dense array of discrete microstructures but insufficient to cause the organic layer to evaporate or sublimate.

Useful inorganic materials for producing microstructures include, for example, carbon, diamond-like carbon, ceramics (e.g., metal or non-metal oxides such as alumina, silica, iron oxide, and copper oxide; metal or non-metal nitrides such as silicon nitride and titanium nitride; and metal or non-metal carbides such as silicon carbide; metal or non-metal borides such as titanium boride); metal or non-metal sulfides such as cadmium sulfide and zinc sulfide; metal silicides such as magnesium silicide, calcium silicide, and iron silicide; metals (e.g., noble metals such as gold, silver, platinum, osmium, iridium, palladium, ruthenium, rhodium, and combinations thereof; transition metals such as scandium, vanadium, chromium, manganese, cobalt, nickel, copper, zirconium, and combinations thereof; low melting metals such as bismuth, lead, indium, antimony, tin, zinc, and aluminum; refractory metals such as tungsten, rhenium, tantalum, molybdenum, and combinations thereof); and semiconductor materials (e.g., diamond, germanium, selenium, arsenic, silicon, tellurium, gallium arsenide, gallium antimonide, gallium phosphide, aluminum antimonide, indium antimonide, indium tin oxide, zinc antimonide, indium phosphide, aluminum gallium arsenide, zinc telluride, and combinations thereof).

The microstructures of the preferred embodiment can be made to have random orientations by control of the substrate temperature during the deposition of the initial PR149 layer, as described above. They can also be made to have curvilinear shapes by conditions of the conformal coating process. As discussed in FIG. 6 of L. Aleksandrov, "Growth of Crystalline Semiconductor Materials On Crystal Surfaces," Chapter 1, Elsevier, N.Y., 1984, the energies of the arriving atoms applied by different coating methods, e.g., thermal evaporation deposition, ion deposition, sputtering and implantation, can range over 5 orders of magnitude.

It is within the scope of the present invention to modify the methods for making a microstructured layer to make a discontinuous distribution of microstructures.

Preferably, the one or more layers of conformal coating material, if applied, serve as a functional layer imparting desirable catalytic properties, as well as electrical conductivity and mechanical properties (e.g., strengthens and/or protects the microstructures comprising the microstructured layer), and low vapor pressure properties.

The conformal coating material preferably can be an inorganic material or it can be an organic material including a polymeric material. Useful inorganic conformal coating materials include, for example, those described above in the description of the microstructures. Useful organic materials include, for example, conductive polymers (e.g., polyacetylene), polymers derived from poly-p-xylylene, and materials capable of forming self-assembled layers.

The preferred thickness of the conformal coating is typically in the range from about 0.2 to about 50 nm. The conformal coating may be deposited onto the microstructured layer using conventional techniques, including, for example, those disclosed in U.S. Pat. Nos. 4,812,352 and 5,039,561, the disclosures of which are incorporated herein by reference. Any method that avoids disturbance of the microstructured layer by mechanical forces can be used to deposit the conformal coating. Suitable methods include, for example, vapor phase deposition (e.g., vacuum evaporation, sputter coating, and chemical vapor deposition) solution coating or dispersion coating (e.g., dip coating, spray coating, spin coating, pour coating (i.e., pouring a liquid over a surface and allowing the liquid to flow over the microstructured layer, followed by solvent removal)), immersion coating (i.e., immersing the microstructured layer in a solution for a time sufficient to allow the layer to adsorb molecules from the solution, or colloidals or other particles from a dispersion), electroplating and electroless plating. More preferably, the conformal coating is deposited by vapor phase deposition methods, such as, for example, ion sputter deposition, cathodic arc deposition, vapor condensation, vacuum sublimation, physical vapor transport, chemical vapor transport, and metalorganic chemical vapor deposition. Preferably, the conformal coating material is a catalytic metal or metal alloy.

For the deposition of a patterned conformal coating, the deposition techniques are modified by means known in the art to produce such discontinuous coatings. Known modifications include, for example, use of masks, shutters, directed ion beams, and deposition source beams.

Key aspects of the formed acicular support nanostructures is that they be easily transferable from the initial substrate into the membrane or EBL surface to form the MEA catalyst electrode layer; they allow more catalyst particles to be deposited on the surface, preferably at least an 80 wt % ratio of catalyst particles to the combined weight of support and catalyst particles; they have sufficient number density and aspect ratio to provide a high value of surface area support for the catalyst, at least 10 to 15 times the planar area of the substrate; and the shape and orientation of the acicular support particles on the initial substrate are conducive to uniform coating with catalyst particles.

Key aspects of the catalyst deposition methods are that they result in the formation of catalyst particle sizes in the several nanometer range, preferably the 2–10 nm range, which uniformly coat at least a portion of the outer surface area of the support particles.

In general, nanoscopic catalyst is deposited on the microstructure whiskers at nucleation sites which grow into catalyst particles. It has been discovered that the size of the resultant catalyst particle is a function of the initial size of the acicular support and the amount of catalyst loading. For the same catalyst loading, in mg/cm$^2$, longer catalyst supports will result in smaller catalyst particle sizes, compared to shorter catalyst supports of the same cross-sectional dimensions. This is illustrated in FIG. 4, which reports the results of Example 13, below. FIG. 4 shows the size of Pt crystallites deposited on long (type A, about 1.5 $\mu$m long) and short (type B, about 0.5 $\mu$m long) catalyst support whiskers, labelled "A" and "B" respectively in FIG. 4.

It has been discovered that catalyst utilization can be increased by the use of smaller catalyst particles in lower loadings of catalyst onto shorter microstructure supports. Catalyst utilization can be further increased by localizing those catalyst particles in a thinner surface layer which is partially non-embedded in the ICM. It has been discovered that all of these goals can be achieved simultaneously by making shorter microstructure supports, coating them with a lower loading of catalyst, and applying the nanostructured elements to an ICM such that they are broken and fragmented during the application step to form a thin partially embedded layer. Nanostructured elements useful in this method are preferably less than 1.0 $\mu$m in length, more preferably less than 0.6 $\mu$m in length, have aspect ratios of at least 10 and have a number density of at least 10 per square micrometer. The loading of catalyst for nanostructured elements useful in this method is less than 0.1 mg per square centimeter of the initial nanostructured element substrate area, preferably less than 0.05 mg/cm$^2$, and most preferably less than 0.03 mg/cm$^2$.

The ion conductive membrane (ICM) may be composed of any suitable ion exchange electrolyte. The electrolytes are preferably solids or gels. Electrolytes useful in the present invention can include ionic conductive materials, such as polymer electrolytes, and ion-exchange resins. The electrolytes are preferably proton conducting ionomers suitable for use in proton exchange membrane fuel cells.

Ionic conductive materials useful in the invention can be complexes of an alkalai metal or alkalai earth metal salt or a protonic acid with one or more polar polymers such as a polyether, polyester, or polyimide, or complexes of an alkalai metal or alkalai earth metal salt or a protonic acid with a network or crosslinked polymer containing the above polar polymer as a segment. Useful polyethers include: polyoxyalkylenes, such as polyethylene glycol, polyethylene glycol monoether, polyethylene glycol diether, polypropylene glycol, polypropylene glycol monoether, and polypropylene glycol diether; copolymers of these polyethers, such as poly(oxyethylene-co-oxypropylene) glycol, poly(oxyethylene-co-oxypropylene) glycol monoether, and poly(oxyethylene-co-oxypropylene) glycol diether; condensation products of ethylenediamine with the above polyoxyalkylenes; esters, such as phosphoric acid esters, aliphatic carboxylic acid esters or aromatic carboxylic acid esters of the above polyoxyalkylenes. Copolymers of, e.g., polyethylene glycol with dialky siloxanes, polyethylene glycol with maleic anhydride, or polyethylene glycol monoethyl ether with methacrylic acid are known in the art to exhibit sufficient ionic conductivity to be useful in an ICM of the invention.

Useful complex-forming reagents can include alkalai metal salts, alkalai metal earth salts, and protonic acids and protonic acid salts. Counterions useful in the above salts can be halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, tetrafluoroethylene sulfonic acid, hexafluorobutane sulfonic acid, and the like.

Ion-exchange resins useful as electrolytes in the present invention include hydrocarbon- and fluorocarbon-type resins. Hydrocarbon-type ion-exchange resins can include phenolic or sulfonic acid-type resins; condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of a tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases, and can be preferable for composite electrolyte membranes useful in the invention. One family of fluorocarbon-type resins having sulfonic acid group functionality is the Nafion™ resins (DuPont Chemicals, Wilmington, Del., available from ElectroChem, Inc., Woburn, Mass., and Aldrich Chemical Co., Inc., Milwaukee, Wis.). Other fluorocarbon-type ion-exchange resins that can be useful in the invention comprise (co) polymers of olefins containing aryl perfluoroalkyl sulfonylimide cation-exchange groups, having the general formula (I): $CH_2=CH-Ar-SO_2-N^-- SO_2(C_{1+n}F_{3+2n})$, wherein n is 0–11, preferably 0–3, and most preferably 0, and wherein Ar is any substituted or unsubstituted divalent aryl group, preferably monocyclic and most preferably a divalent phenyl group, referred to as phenyl herein. Ar may include any substituted or unsubstituted aromatic moieties, including benzene, naphthalene, anthracene, phenanthrene, indene, fluorene, cyclopentadiene and pyrene, wherein the moieties are preferably molecular weight 400 or less and more preferably 100 or less. Ar may be substituted with any group as defined herein. One such resin is p-STSI, an ion conductive material derived from free radical polymerization of styrenyl trifluoromethyl sulfonylimide (STSI) having the formula (II): styrenyl-$SO_2N^-$—$SO_2CF_3$.

ICM's may also be composite membranes, comprising a porous membrane material combined with any of the above-described electrolytes. Any suitable porous membrane may be used. Porous membranes useful as reinforcing membranes of the invention can be of any construction having sufficient porosity to allow at least one liquid solution of an electrolyte to be infused or imbibed thereinto and having sufficient strength to withstand operating conditions in an electrochemical cell. Preferably, porous membranes useful in the invention comprise a polymer that is inert to conditions in the cell, such as a polyolefin, or a halogenated, preferably fluorinated, poly(vinyl) resin. Expanded PTFE membranes may be used, such as Poreflon™, produced by Sumitomo Electric Industries, Inc., Tokyo, Japan, and Tetratex™ produced by Tetratec, Inc., Feasterville, Pa.

Porous membranes useful in the present invention may comprise microporous films prepared by thermally-induced phase separation (TIPS) methods, as described in, e.g., U.S. Pat. Nos. 4,539,256, 4,726,989, 4,867,881, 5,120,594 and 5,260,360, the teachings of which are incorporated herein by reference. TIPS films exhibit a multiplicity of spaced, randomly dispersed, equiaxed, nonuniform shaped particles of a thermoplastic polymer, optionally coated with a liquid that is immiscible with the polymer at the crystallization temperature of the polymer, preferably in the form of a film, membrane, or sheet material. Micropores defined by the particles preferably are of sufficient size to allow electrolyte to be incorporated therein.

Polymers suitable for preparing films by the TIPS process include thermoplastic polymers, thermosensitive polymers, and mixtures of these polymers, so long as the mixed polymers are compatible. Thermosensitive polymers such as ultrahigh molecular weight polyethylene (UHMWPE) cannot be melt-processed directly but can be melt-processed in the presence of a diluent that lowers the viscosity thereof sufficiently for melt processing.

Suitable polymers include, for example, crystallizable vinyl polymers, condensation polymers, and oxidation polymers. Representative crystallizable vinyl polymers include, for example, high- and low-density polyethylene, polypropylene, polybutadiene, polyacrylates such as poly (methyl methacrylate), fluorine-containing polymers such as poly(vinylidene fluoride), and the like. Useful condensation polymers include, for example, polyesters, such as poly (ethylene terephthalate) and poly(butylene terephthalate), polyamides, including many members of the Nylon™ family, polycarbonates, and polysulfones. Useful oxidation polymers include, for example, poly(phenylene oxide) and poly(ether ketone). Blends of polymers and copolymers may also be useful in the invention. Preferred polymers for use as reinforcing membranes of the invention include crystallizable polymers, such as polyolefins and fluorine-containing polymers, because of their resistance to hydrolysis and oxidation. Preferred polyolefins include high density polyethylene, polypropylene, ethylene-propylene copolymers, and poly(vinylidene fluoride).

Preferred membranes are fluorocarbon-type ion-exchange resins having sulfonic acid group functionality and equivalent weights of 800–1100, including Nafion™ 117, 115 and 112 membranes. More preferably, Nafion™ membranes as received are pretreated by immersing into a) boiling ultrapure $H_2O$ for 1 hour, b) boiling 3% $H_2O_2$ for one hour, c) boiling ultra pure $H_2O$ for 1 hour, d) boiling 0.5 M $H_2SO_4$ for one hour, e) boiling ultra pure deionized (DI) $H_2O$ for one hour. The Nafion is then stored in ultra pure DI water until use. Prior to forming an MEA, the Nafion is dried by laying it between several layers of clean linen cloth at 30° C. for 10–20 minutes.

Where used, the electrode backing layer (EBL) can be any material capable of collecting electrical current from the electrode while allowing reactant gasses to pass through. The EBLs provide porous access of gaseous reactants and water vapor to the catalyst and membrane, and also collect the electronic current generated in the catalyst layer for powering the external load. The EBL is typically carbon paper or a mesh or a porous or permeable web or fabric of a conductive material such as carbon or a metal. A preferred EBL material is ELAT™, obtained from E-TEK, Inc., Natick, Mass. A more preferred material is a porous polymer filled with conductive particles. The most preferred ELAT™ electrode backing material is about 0.4 mm thick and is designated as carbon only, that is, it contains no metal or catalyst. In one embodiment of the present invention, nanostructured elements are attached to an EBL prior to joining the EBL with an ICM to form an MEA.

Nanostructured elements, described herein, are applied directly to the surface of the ICM or EBL but not embedded in their entirety. The nanostructured elements may be embedded only so far as necessary to create a firm attachment between the particles and the ICM. While as much as 99% of the volume of the nanostructured elements may be embedded within the ICM, preferably, no more than 95% of the volume of the nanostructured elements is contained within the ICM, and more preferably no more than 90%. Most preferably, at least half of the volume of the nanostructured elements is outside of the ICM. In some embodiments, each nanostructured element may lie partially within and partially outside the ICM. In other embodiments, a part of the entire population of nanostructured elements may lie within the ICM and a part without, with some particles embedded, others non-embedded, and others partially embedded.

The nanostructured elements can be partially embedded in the surface of the ICM in a single orientation or in random directions. In the former case the catalyst coated support particles can be oriented parallel to the surface of the ICM so that in principle only catalyst on one side of the support particles contacts the solid polymer electrolyte, or they can be oriented more or less perpendicular to the ICM surface and have a fraction of their length embedded in the ICM surface, or the catalyst coated acicular-shaped support particles can have any intermediate position or combination of positions. Furthermore, the nanostructured elements may be broken or crushed so as to both further reduce their size and allow further compaction of the electrode layer.

It has been discovered that the catalyst particles can be applied to the EBL as well as the ICM by the same methods discussed herein to obtain a functional MEA. As with the ICMs, nanostructured elements are applied directly to the surface of the EBL, optionally without additional ionomer or electrolyte. They can be partially embedded in a single orientation or in random directions, may be broken or crushed in their final state, and may be in incomplete contact with the ICM.

Processes suitable for applying the catalyst particles to the membrane to form the MEA include static pressing with heat and pressure, or for continuous roll production, laminating, nip rolling, or calendering, followed by delamination of the initial catalyst support film substrate from the ICM surface, leaving the catalyst particles embedded.

Nanostructured elements, supported on a substrate, can be transferred and attached to the ICM (or EBL) by applying mechanical pressure and optionally heat and subsequently removing the original substrate. Any suitable source of pressure may be employed. A hydraulic press may be employed. Preferably, pressure may be applied by one or a series of nip rollers. This process is also adaptable to a continuous process, using either a flat bed press in a repeating operation or rollers in a continuing operation. Shims, spacers, and other mechanical devices intermediate between the source of pressure and the particle substrate may be employed for uniform distribution of pressure. The electrode particles are preferably supported on a substrate which is applied to the ICM surface, such that the particles contact the membrane surface. In one embodiment, an ICM may be placed between two sheets of polyimide-supported nanostructured films of nanostructured elements which are placed against the ICM. Additional layers of uncoated polyimide and PTFE sheets are further layered on either side of the sandwich for uniform distribution of pressure, and finally a pair of stainless steel shims is placed outside of this assembly. The substrate is removed after pressing, leaving the electrode particles attached to the ICM. Alternately, the electrode particles may be applied directly to the ICM surface, free of any substrate and without inclusion of any additional ionomer, and then pressed into the surface.

The pressure, temperature and duration of pressing may be any combination sufficient to partially embed the nanostructured elements in the membrane. The precise conditions used depend in part on the nature of the nanostructured elements used.

In one embodiment, relatively short nanostructured supports coated with a lower loading of catalyst are applied to an ICM under pressure and heat such that they are broken and fragmented during the application step to form a thin partially embedded layer. Preferably, the resulting layer is less than about 2 $\mu$m thick; more preferably less than 1.0 $\mu$m, and most preferably less than 0.5 $\mu$m thick. Nanostructured elements useful in this method are preferably less than 1.0 $\mu$m in length and more preferably less than 0.6 $\mu$m in length, and the loading of catalyst for nanostructured elements useful in this method is less than 0.2 milligrams per square centimeter (mg/cm$^2$) of the whisker substrate area, preferably less than 0.1 mg/cm$^2$, and most preferably less than 0.05 mg/cm$^2$. In this embodiment, a pressure of between 90 and 900 MPa is preferably used. Most preferably, a pressure of between 180 and 270 MPa is used. Preferably the press temperature is between 80° C. and 300° C., and most preferably between 100° C. and 150° C. The pressing time is preferably greater than 1 second and most preferably about one minute. After loading into the press, the MEA components may be allowed to equilibrate to the press temperature, at low or no pressure, prior to pressing. Alternately, the MEA components may be preheated in an oven or other apparatus adapted for the purpose Preferably the MEA components are preheated for 1 to 10 minutes before pressing. The MEA may be cooled before or after removal from the press. The platens of the press may be water cooled or cooled by any other suitable means. Preferably, the MEA is cooled for 1 to 10 minutes while still under pressure in the press. The MEA is preferably cooled to under about 50° C. before removal from the press. A press employing vacuum platens may optionally be used.

An advantage of using this process for generating the catalyst support layer is that the catalyst density will be as uniform as that of the acicular support particles. Obtaining uniform catalyst loadings across the MEA is important in fuel cells to obtain uniform power and minimal hot spots which can cause a cell to fail if a pinhole burns through the membrane. It can be difficult to obtain uniformly dispersed loadings at very low levels using solution dispersions, inks or pastes of catalyst particles and polymer electrolytes since that requires very dilute solutions and very thin wet layers, each of which can be difficult to control at high coating speeds because of varying rates of drying. In contrast, the current process invention of forming a uniform layer of catalyst support structures on a temporary substrate, applying the catalyst to the support structures, then transferring the catalyzed support structures into the surface of the ICM or EBL ensures that even the lowest catalyst loadings will remain uniformly distributed over arbitrarily large catalyzed areas.

In another embodiment, the MEA can be formed at room temperature and pressures of between 9 and 900 MPa by pretreatment of the ICM with the appropriate solvent. The ICM is preferably a perfluorosulfonic acid polymer membrane and more preferably a Nafion™ membrane. This allows the water uptake ability of the ICM to remain high, and hence improves its conductivity. In contrast, the prior art requires elevated temperatures to obtain an intimate bond between the catalyst/ionomer layer and the ICM. By briefly exposing a perfluorosulfonic acid polymer membrane surface to a solvent, preferably heptane, that catalyst coated nanostructured support particles can be transferred to and partially embedded in the ICM from the support substrate, at room temperature.

In this embodiment, a pressure of between 9 and 900 MPa is preferably used. Most preferably, a pressure of between 45 and 180 MPa is used. Preferably the press temperature is room temperature, i.e. about 25° C., but may be anywhere between 0 and 50° C. The pressing time is preferably greater than 1 second and most preferably between 10 seconds and about one minute. Since the pressing occurs at room temperature, no preheating or post-press cool are required.

The ICM is pretreated by brief exposure to the solvent by any means, including immersion, contact with a saturated material, spraying, or condensation of vapor, but preferably by immersion. Excess solvent may be shaken off after the pretreatment. Any duration of exposure which does not compromise the ICM may be used, however, a duration of at least one second is preferred. The solvent used may be chosen from apolar solvents, heptane, isopropanol, methanol, acetone, IPA, $C_8F_{17}SO_3H$, octane, ethanol, THF, MEK, DMSO, cyclohexane, or cyclohexanone. Apolar solvents are preferred. Heptane is most preferred, as it is observed to have the optimum wetting and drying conditions and to allow complete transfer of the nanostructured catalysts to the ICM surface without causing the ICM to swell or distort. This pretreatment of the ICM may be used with any catalyst particles and is not limited to nanostructured elements, although they are the preferred catalyst particles.

Figure 5A:
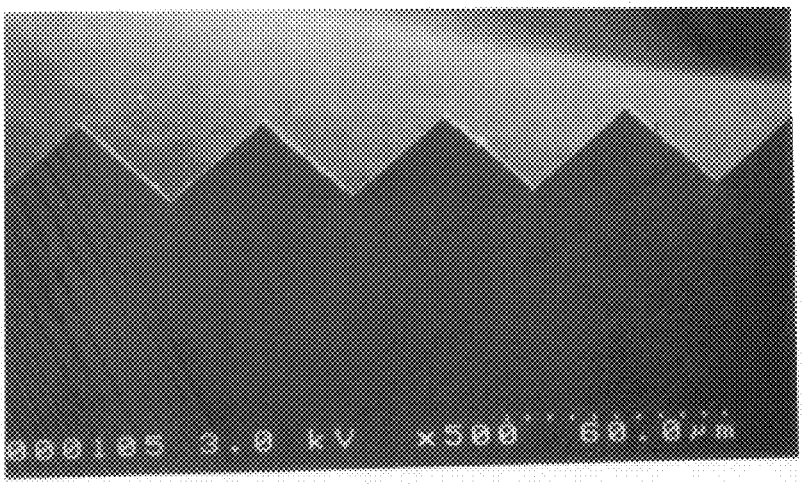
FIG. 5(a) is a scanning electron micrograph taken at 500× magnification of a cross section of one surface of an MEA of the present invention.
Figure 5B:
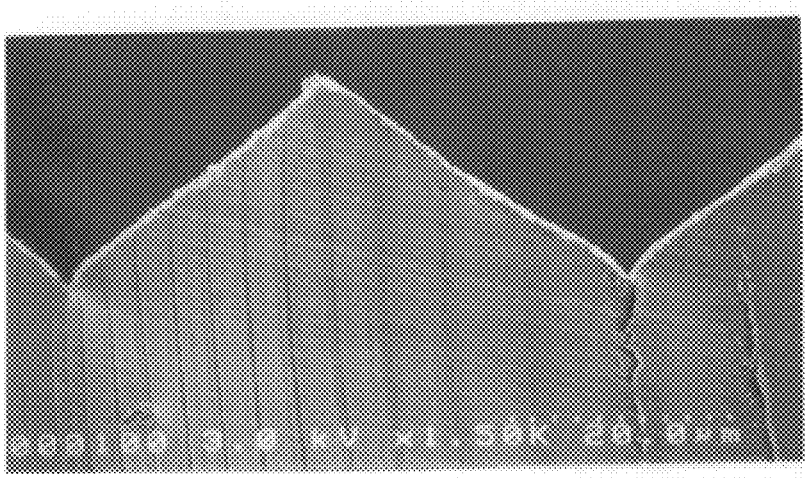
FIG. 5(b) is a scanning electron micrograph taken at 3000× magnification of a cross section of one surface of an MEA of the present invention.
Figure 5C:
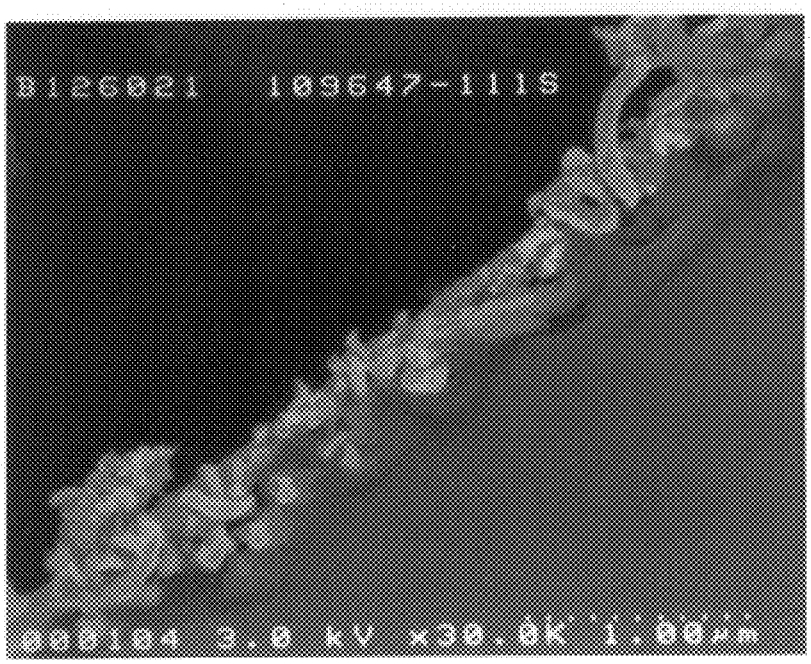
FIG. 5(c) is a scanning electron micrograph taken at 30,000× magnification of a cross section of one surface of an MEA of the present invention.

It has been discovered that the thin electrode layers of the instant invention can be imparted with microtextures having features sized in the 1 to 50 $\mu$m range, i.e., smaller than the membrane thickness but larger than the catalyst support particle, so that the catalyzed membrane surface is also replicated with these microtextures. FIGS. 5(a), 5(b) and 5(c) are scanning electron micrographs of a cross section of such an MEA surface where the nanostructured electrode layer conforms to a microtextured shape of 25 $\mu$m high peaks and valleys, taken at 500×, 5,000× and 30,000×, respectively. The actual electrode layer surface area per unit planar area of MEA (measured normal to the stacking axis of the MEA's) is increased by the geometric surface area factor of the microtextured substrate. In the example illustrated in FIG. 5, this factor is 1.414, or the square root of two, since each part of the surface is at a 45° angle to the normal stacking axis. However, the resulting increase in MEA thickness is much less than 1.414 and in practice is negligible. This is so due to interleaving of the ICM/EBL interface. In addition, the depth of the microtexture can be made relatively small compared to the thickness of the ICM, that is, much less than one-half of the thickness of the MEA.

The microtexture can be imparted by any effective method. One preferred method is to form the nanostructures on an initial substrate that is microtextured. The microtextures are imparted to the MEA during the step of transferring the nanostructured elements to the ICM, and remain after the initial substrate is stripped away. The conditions of nanostructure and MEA formation are the same as described above. Another method is to impress or mold the microtexture into a formed MEA. It is not necessary that the microtextures be uniformly geometric. Randomly sized and arrayed features can serve the same purpose.

Figure 6:
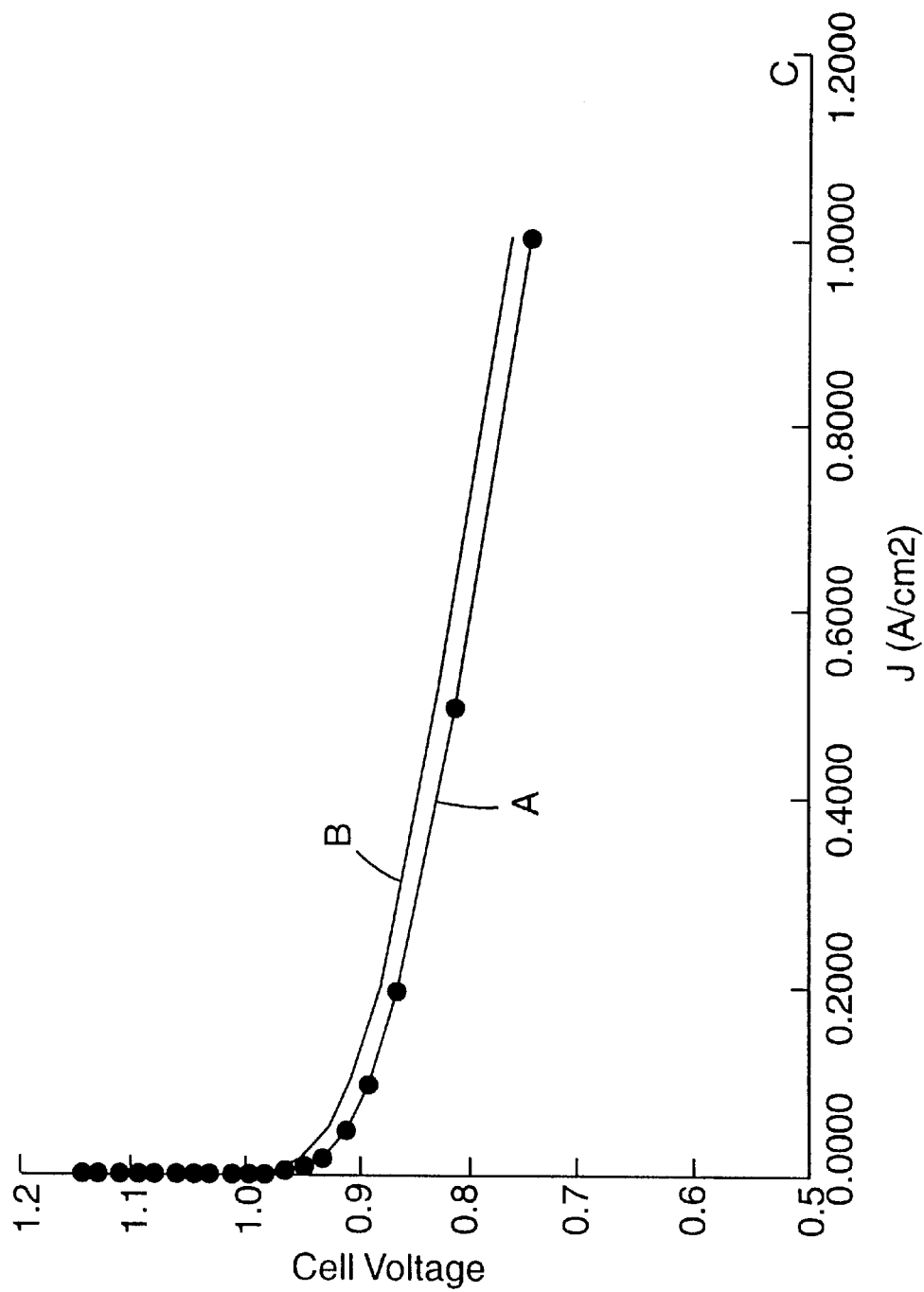
FIG. 6 is a graph of current density vs. cell voltage for a fuel cell MEA of the present invention and calculated results for a further fuel cell of the present invention.

In a fuel cell, the exchange current density, $J_0$, is the equilibrium current density equivalent of each half cell reaction pathway under open circuit conditions. Since it is expressed in terms of amps/unit real area of catalyst/membrane interface, the exchange current of the fuel cell MEA is also increased by a factor of 1.414. This increase in exchange current per unit planar area of the MEA has the effect of shifting the polarization curve upward, resulting in an increase in voltage at a given current density. Exactly how much depends on the conductivity of the membrane, as indicated in FIG. 6, which illustrates the effect of increasing the exchange current density relative to the MEA planar area. Trace A of FIG. 6 is a plot of current density vs. cell voltage for a typical cell. Trace B indicates a calculated increase in current density by a factor of 1.414. Since this increase in power density (watts/liter) from the fuel cell was obtained effectively without an increase in geometric size or thickness of the MEA, it represents a real and sizeable increase in fuel cell power density of a stack of several hundred such MEA's and bipolar plates. In contrast, merely fan-folding the MEA would simply increase the MEA thickness for no net change in power density, i.e. power per unit volume of MEA. This increase in actual catalyst area per unit MEA volume by microtexturing the catalyst electrode area, can only be achieved when the catalyst layer is sufficiently thin, about an order of magnitude thinner than the size of the microtexture features, and those microtexture features are smaller than the thickness of the ion exchange membrane. For example, the thickness of the catalyzed surface region of the ICM in this invention can be 2 $\mu$m or less. The peak to valley height of the microtextured features can be 20 $\mu$m, and the thickness of the ICM membrane can be 50 $\mu$m or larger. The effect of increased exchange current is larger when the fuel cell operating conditions are limited by the effect of the cathode overpotential, such as when operating on air at higher cell voltages (such as greater than about 0.7 volts) and lower cell current densities (such as less than about 0.7 amp/cm$^2$). Since these are typical design operating goals for fuel cell stacks, this is potentially a significant advantage of the instant invention.

When the microtextures are imparted by use of a microtextured substrate for the nanostructured whiskers of this invention, two further advantages appear in the process for applying the catalyst and forming the MEA. A key aspect of the support particles of this invention is that they be applied to a substrate from which they can be transferred to the membrane surface. This requirement may result in support particles which are easily brushed off a flat substrate or damaged by winding up such a flat substrate around a core, such as would be done in a continuous web coating process.

Having the nanostructured catalyst support coated onto a microtextured substrate can prevent the possibility of damage because the vast majority of the much smaller catalyst coated support particles will reside in the valleys, below the peaks which will protect them from damage on roll-up. FIGS. 22(a-d) are scanning electron micrographs taken at 1000×, 3000×, 10,000×, and 40,000× magnification, respectively, of one surface of a microtextured catalyst transfer substrate (MCTS) of the present invention after deposition thereon of a nanostructured catalyst. FIG. 23 is a scanning electron micrograph taken at 993× magnification of the same surface as in FIG. 22, after wiping the surface with one pass of a cotton swab. The majority of support particles remain on the microtextured polymer surface.

A second process advantage provided by the microtextured substrate may be realized in the process of transferring the catalyzed support particles into the ICM surface. Often heat and pressure may be used, and removing air from the interface at the start of the pressing process can be important, such as by applying a vacuum. When transferring from large pieces of planar substrate carrying the catalyst support particles, air can be trapped between the ICM and the support substrate. Having the microtextured peaks to space the ICM and substrate apart during evacuation can allow this air to be more effectively removed in the moments just before the press-transfer commences.

There are several materials that are useful in producing the microtextured substrate of the present invention. The particular substrate chosen is preferably dimensionally stable within a tolerance of 20%, more preferably 10%, more preferably 5% and most preferably 2% at the highest processing temperature to which the substrate will be exposed. Typically, this will be during the step of annealing the microstructures and may be 200° C., 240° C. or as much as 260° C. Dimensional stability is measured by comparison of the linear distance between microtextured features at room temperature before and after heating to the specified temperature.

There are several thermoplastic materials that are dimensionally stable above 200° C. that may be useful in the microtextured catalyst transfer substrate of the present invention. The following broad categories include one or more resins that are typically processed in this temperature range: acrylonitrile-butadiene-styrenes, acrylics, epoxies, fluoropolymers, polyamides, polyarylamides, polyarylates, polyarylsulfones, polyesters, polyetheretherketones, polyetherimides, polyethersulfones, polyimides, polyketones, polymethylpentanes, polyphenylene ethers, polyphenylene oxides, polyphenylene sulfides, polyphthalamides, and polysulfones. More detailed information regarding processing and melting temperatures may be found in pages 1–2 through 1–34, and 1–86 through 1–104 of the "1999 Plastics Digest," Edition 20, Volume 1 (1999).

Preferred materials for the microtextured catalyst transfer substrate of the present invention include acrylics, epoxies, fluoropolymers, polyamides, polyimides, polyketones, and polyphenyleneoxides.

Useful microtextured surfaces include those described in U.S. Pat. No. 5,183,597, which is herein incorporated by reference. The microtextured polymeric substrate of the present invention is characterized by a tough, flexible substrate, one face of which bears a microtexture. This microtexture preferably has a depth of about 2 to 10 times the height of the nanostructured elements that it supports. The microtexture more preferably has a depth of about 5 times the height of the nanostructured elements that it supports. The microtexture depth is preferably less than about one-half of the thickness of the PEM onto which it will be used to transfer catalyst. The microtexture depth is more preferably less than about one-quarter of the thickness of the PEM onto which it will be used to transfer catalyst.

This microtexture preferably has a depth of at least about 5 μm and comprises a flexible, cured prepolymeric resin, which cured prepolymeric resin is substantially confined to the microtextured portion of the polymeric substrate. The substrate is preferably tough, having a tensile strength of at least approximately 1500 MPa. The microtextured catalyst transfer substrate is preferably flexible. This allows continuous roll processing providing economy of scale and economy of manufacturing over earlier flat substrates and microtextured metal substrates. The substrate chosen is preferably capable of wrapping around the circumference of a cylinder of about 30 cm diameter without breaking or adversely affecting the dimensional stability of the substrate. The substrate chosen is more preferably capable of wrapping around the circumference of an about 10 cm diameter cylinder without breaking or adversely affecting the dimensional stability of the substrate. The substrate chosen is most preferably capable of wrapping around the circumference of an about 3 cm diameter cylinder without breaking or adversely affecting the dimensional stability of the substrate. The preferred substrate may be rolled upon itself.

Useful prepolymeric resin compositions which can be cured to a sufficiently flexible state include, but are not limited to, acrylate, epoxy or urethane based materials, but preferably they are acrylate based materials. As used herein "acrylate" encompasses methacrylate. The prepolymeric resin composition can be a one-part, solvent-free, radiation addition-polymerizable, crosslinkable, organic prepolymeric composition plus a photoinitiator at between about 0.05 to 4% by weight of the resin composition. The reactive prepolymeric resin composition has a viscosity preferably between about 400 to 5,000 cps. To achieve the desired viscosity, it usually is necessary to include a reactive monomer in the prepolymeric resin composition. When the prepolymeric resin composition is acrylate-based, the reactive monomer may be an ethylenically unsaturated monomer such as an alkyl acrylate or other examples described in U.S. Pat. No. 4,576,850, which is herein incorporated by reference. The prepolymeric resin composition can also include nonreactive materials such as fillers.

A method of producing a polymeric substrate having a microtextured surface useful in the present invention comprises the following steps:

a) preparing a radiation curable prepolymeric resin composition of a one-part, solvent-free, radiation addition-polymerizable, crosslinkable, organic prepolymeric composition;

b) depositing a bead of the prepolymeric resin composition along one edge of a master negative microtextured molding surface;

c) covering the master with a support layer, the support layer optionally having an adhesion promoting interface;

d) applying force progressively to the substrate to advance the bead of prepolymeric resin while applying sufficient pressure to fill the cavities of the master, optionally applying sufficient resin such that the resin does not protrude above the cavities more than about 20% of the cavity depth;

e) curing the deposited prepolymeric resin by radiation to provide a composite of the support layer when included and cured prepolymeric resin, optionally performing this step while keeping the temperature adjacent the surface of the deposited prepolymeric resin from rising to not more than about 30° C. above a typical use temperature of the finished polymeric substrate article; and f) removing the resulting microtexture-bearing polymeric substrate from the master.

When a resin thickness is desired above the cavities in step (d) of this method, sufficient pressure should be applied to squeeze out excess resin so that this resin thickness above the cavities is less than about 20% of the depth of the cavities, preferably no greater than about 10%. By maintaining a minimum resin thickness, the heat rise during curing can be kept to a minimum.

The support layer preferably has sufficient strength and flexibility to permit it to move a bead of the prepolymeric composition across a rigid master negative molding surface. Suitable materials for this support layer include, for example, metallic foils, acrylonitrile-butadiene-styrenes, acrylics, epoxies, fluoropolymers, polyamides, polyarylamides, polyarylates, polyarylsulfones, polyesters, polyetheretherketones, polyetherimides, polyethersulfones, polyimides, polyketones, polymethylpentanes, polyphenylene ethers, polyphenylene oxides, polyphenylene sulfides, polyphthalamides, and polysulfones. Of these materials, metallic foils, acrylics, epoxies, fluoropolymers, polyamides, polyimides, polyketones, and polyphenyleneoxides are preferred. Acrylics and polyimides are more preferred.

The support layer may include a chemical, electrical, mechanical, or thermal surface treatment to provide an adhesion promoting interface between the support layer and a polymeric layer. The adhesion promoting interface can be a surface layer or a separate layer having affinity for the support layer and the polymeric layer, a reaction product of two or more reactive species, or an etched or roughened surface to promote attachment of the polymeric layer.

The preferred masters for use in producing the microtextured surfaces contain a plurality of utilitarian discontinuities. These utilitarian discontinuities may range from random to ordered. The preferred materials for random masters include common abrasive articles. The preferred materials for ordered masters include a metallic master tool such as electroformed nickel or nickel-plated copper or brass and a polymeric resin (thermoplastic or thermoset) that is stable to the curing conditions and has been shaped by such a metallic master tool. Such a polymeric master is relatively inexpensive and yet can be used to form thousands of replications of polymeric substrate articles without becoming unduly worn. When the polymeric master is made from a radiation-transparent polymeric resin material, the prepolymeric resin can be cured by being irradiated through the master. By using a radiation-transparent master, input support layers for the polymeric substrate articles of the present invention can include opaque materials, e.g. metallic foils, or include other desirable coatings. The substrates can have any thickness, although it should be sufficiently flexible for the desired processing methods. A polymeric master can have sufficient body and flexibility to permit it to move a bead of the prepolymeric composition across the substrate, which accordingly can be rigid. A polymeric master can have a low-energy surface to afford good release from a cured prepolymeric resin. When the master is made from a radiation-transparent polymeric resin such as a polyolefin, it is possible to prepare polymeric substrate bearing microtextures on both surfaces of the substrate. When a polymeric layer with sufficient mechanical properties is used, no support layer is required.

Electron beam radiation may be used to cure the polymer layer in the microtextured surface shape by exposing the layer to an appropriate dosage and acceleration voltage. The preferred dosage ranges from about 1 kiloGray (kGy) to about 100 kGy, while the range between about 10 to 70 kGy is more preferred. The preferred acceleration voltage ranges from about 100 to about 300 kilovolts (kV), while the range between about 175 to 250 kV is more preferred. Other methods of forming the polymeric substrate include curing the microtextured surface shape with thermal radiation, ultraviolet through near-infrared light, or combinations including these methods and those mentioned above.

After transferring the catalyst coated nanostructures from the microtextured surface to a polymer electrolyte membrane, the polymer layer of the present invention can be reused by subsequently forming nanostructures on the surface and depositing catalyst on the nanostructures before transferring these catalyst coated nanostructures to another PEM. The surface may be cleaned after one or more or these transfer processes, such as by mechanical buffing.

This invention is useful in electrochemical devices such as fuel cells, batteries, electrolyzers, electrochemical reactors such as chlor-alkali separation membranes, or gas, vapor or liquid sensors, using membrane electrodes optimized for the immediate purpose.

Objects and advantages of this invention are further illustrated by the following examples, but the particular materials and amounts thereof recited in these examples, as well as other conditions and details, should not be construed to unduly limit this invention.

EXAMPLES

There are a number of basic processes and materials common to all the examples. These include the preparation of the nanostructured catalyst support, application of the catalyst to the support, determination of the catalyst loading, fabrication of the membrane-electrode assembly, the type of fuel cell apparatus and testing station, the fuel cell test parameters, and the kinds of proton exchange membranes or ion conducting membranes used. These are defined in general as follows:

Nanostructured catalyst support preparation and catalyst deposition. In the following examples, the nanostructured catalyst electrodes and the process for making them are as described in U.S. Pat. No. 5,338,430, incorporated herein by reference, and other patents referenced therein. The nanostructured catalyst consists of catalyst materials, e.g. Pt or Pd, conformally coated onto nanometer sized whisker-like supports. The whiskers are produced by vacuum annealing thin films (approximately 1000 to 1500 Å) of an organic pigment material (PR 149, American Hoechst Co., Somerset, N.J.) previously vacuum coated onto substrates such as polyimide. The whisker-like supports, with lengths of 1 to 2 $\mu$m, grow with uniform cross-sectional dimensions of about 30 to 60 nm, end-oriented on a substrate to form a dense film of closely spaced supports (30 to 40 per square micrometer) which can be transferred into or onto the surface of a polymer electrolyte to form a catalyst electrode. The nanostructured catalyst electrode has a very high surface area which is readily accessible to fuel and oxidant gases.

Measurement of catalyst loading is done both by monitoring the thickness of the Pt layer deposited during vacuum coating using a quartz crystal oscillator, as is known in the art of vacuum coating, and by a simple gravimetric method. In the latter case, a sample of the polyimide-supported nanostructured film layer is massed using a digital balance accurate to approximately 1 microgram. Then, the nanostructured layer is wiped off the polyimide substrate using a paper tissue or linen cloth, and the substrate is remassed. Because a preferred property of the catalyst support is that it transfer easily and completely to the ion conducting membrane, it also can be easily removed by simple wiping with a cloth. The mass per unit area of the catalyst support particles, without Pt, can also be measured this way.

The ion conducing membranes (ICMs) used were all of the perfluorinated sulfonic acid type. Nafion™ 117, 115 and 112 membranes were obtained from DuPont, Corp., Wilmington, Del. The Dow Chemical membrane (Dow Chemical Co., Midland, Mich.) tested was a Dow experimental membrane designated as XUS 13204.20, having a dried thickness of approximately 113 $\mu$m.

The process used for transferring the catalyst coated support particles into the surface of the membrane was a dry heat and pressure method. To prepare, e.g. an MEA with 5 cm$^2$ of active area, two 5 cm$^2$ square pieces of the nanostructured catalyst, coated on metallized polyimide substrate, one for the anode, one for the cathode, were placed on either side of the center of a 7.6 cm×7.6 cm ICM. The metallized layer on the polyimide was 10 to 70 nm thick Pt. One Teflon™ sheet and one polyimide sheet, each 50 $\mu$m thick and the same size at least as the ICM, were placed on either side of this stack. Two sheets of 50 $\mu$m thick polyimide, similarly sized, were placed on the outside of this stack. This assembly was then placed between two steel plates, 0.25 mm thick, and placed on the vacuum platens of a heated mechanical press. A low grade vacuum was applied to partially remove air (less than 2 Torr) from between the layers and then the sandwich was pressed at 130° C. at about 200 MPa (2.25 tons/cm$^2$) for 1 minute. The press platens were then cooled to under about 50° C. with the pressure applied before opening and removing the sandwich. The original 5 cm$^2$polyimide substrates could be easily peeled away from the ICM leaving the catalyst embedded in the surface of the ICM.

A similar process was used for applying the catalyst coated support particles to the electrode backing layer (EBL). Alternatively, the catalyst support particles can be transferred to a membrane by continuous roll processes such as passing the above sandwich assemblies in continuous or semi-continuous sheet form through the nip of a mill as in calendering or laminating processes. The two mill rolls can be heated, both made of steel, or steel and a softer material such as rubber, have a controlled gap or use controlled line pressure to determine the gap of the nip.

MEA's prepared as described above were mounted in a 5 cm$^2$ fuel cell test cell (Fuel Cell Technologies, Inc., Albuquerque, N.M.) using two pieces of 0.38 mm (0.015 in.) thick ELAT™ electrode backing material (E-TEK, Inc., Natick, Mass.). Teflon-coated fiberglass gaskets (The Furon Co., CHR Division, New Haven, Conn.), 250 $\mu$m thick, with 5 cm$^2$ square holes cut in the center for the electrode area, were used to seal the cell. The ELAT™ electrode backing material is designated as carbon only, i.e., it contains no catalyst.

The test cell was attached to a test station also purchased from Fuel Cell Technologies, Inc. The test parameters for the fuel cell polarization curves, unless otherwise indicated, were obtained under the conditions of 207 kPa (30 psig) H$_2$ and 414 kPa (60 psig) oxygen gauge pressures, flowing at about 1 standard liter per minute (SLM). Humidification of the gas streams was provided by passing the gas through sparge bottles maintained at approximately 115° C. and 105° C., respectively, for hydrogen and oxygen. The cell temperature was 80° C. Polarization curves were obtained periodically until they became stable. Pure oxygen was used as the preferred oxidant to show the advantages of the catalysts because it allows the polarization curve to be more reflective of the cathode overpotential and hence catalyst activity and less dependent on diffusion limiting processes as occurs with air as the oxidant.

Before use, the Nafion membrane was pretreated by sequentially immersing into a) boiling water for one hour, b) boiling 3% $H_2O_2$ for one hour, c) boiling ultra pure $H_2O$ for 1 hour, d) boiling 0.5 M $H_2SO_4$ for one hour, e) boiling ultra pure DI $H_2O$ for one hour. The Nafion was then stored in ultra pure DI water until use. Prior to forming an MEA the Nafion was dried by laying it between several layers of clean linen cloth at 30° C. for 10 to 20 minutes. Unless otherwise noted below, the Nafion membrane was further pretreated prior to attachment of electrode material by exposure to reagent grade heptane, usually by briefly dipping the membrane in heptane followed by gently shaking off excess heptane.

Example 1

Figure 7A:
FIG. 7(a) is a scanning electron micrograph taken at 15,000× magnification of a cross section of one surface of an MEA of the present invention.
Figure 7B:
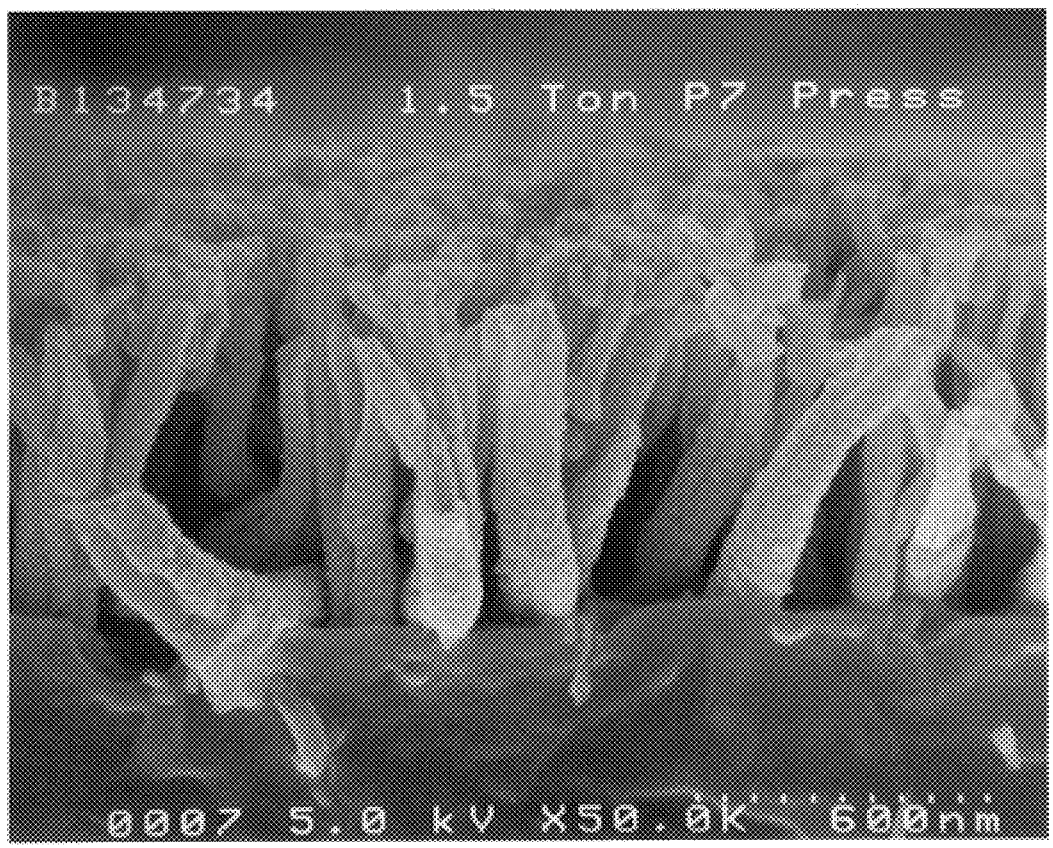
FIG. 7(b) is a scanning electron micrograph taken at 50,000× magnification of a cross section of one surface of an MEA of the present invention.

A 5 $cm^2$ membrane electrode assembly (MEA) was prepared as described above, using heptane-treated Nafion 117 as the ion-conducting membrane. The pretreated membrane was sandwiched between two pieces of polyimide-supported nanostructured catalyst film, prepared as in a), above, having 1500 Å mass equivalent thickness of palladium electron beam vapor coated on the nanostructured elements. The sandwich assembly, prepared as described above, was pressed at 27 MPa (0.3 tons/$cm^2$ of catalyst electrode area) for 2 minutes at room temperature. The polyimide substrate was peeled away leaving the Pd-coated support particles attached to the surface of the membrane. FIG. 7 shows high resolution cross-sectional scanning electron micrographs at 15,000× (FIG. 7(*a*)) and 50,000× (FIG. 7(*b*)) magnifications, of the Pd-coated support particles attached to the membrane surface at their tips only.

The micrographs of FIG. 7 show that almost all of the catalyst coating on the support particles was outside the ICM and that there was no other ionomer or polymer electrolyte in contact with the catalyst. Similar results could be obtained with platinum coating on the support particles.

Example 2

Figure 8A:
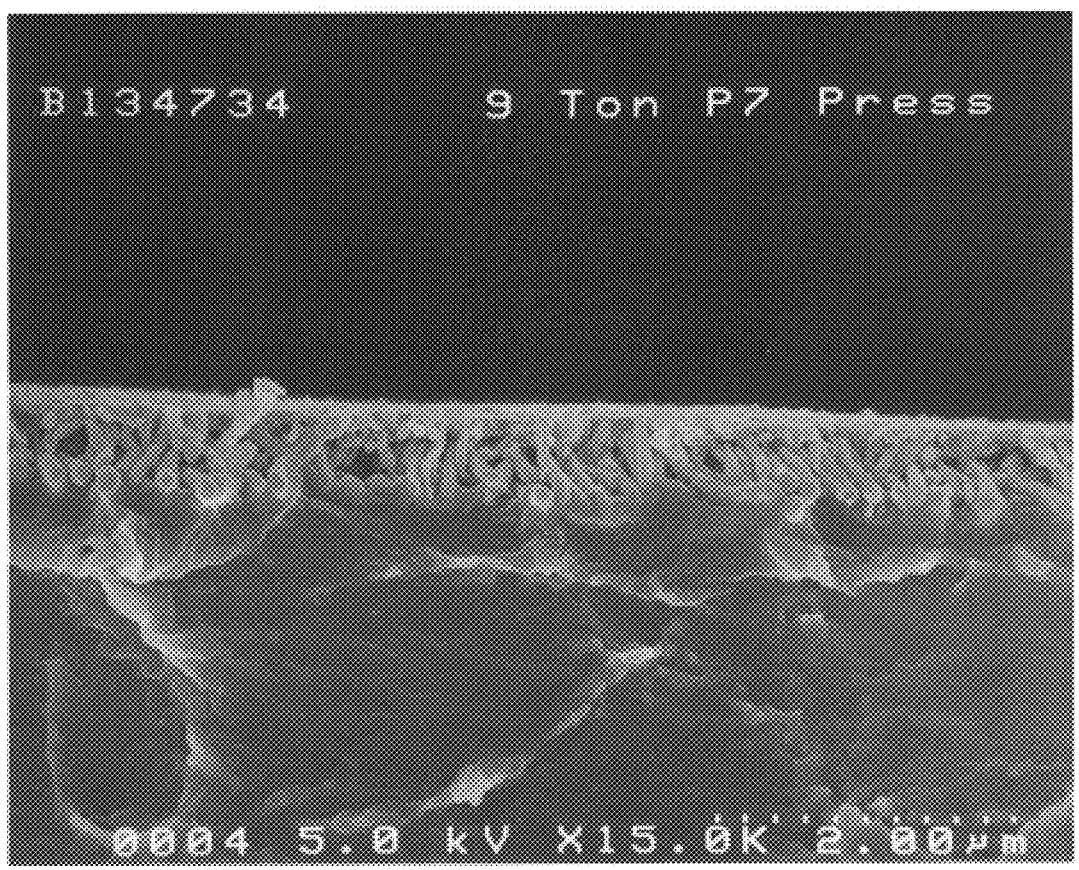
FIG. 8(a) is a is a scanning electron micrograph taken at 15,000× magnification of a cross section of one surface of an MEA of the present invention.
Figure 8B:
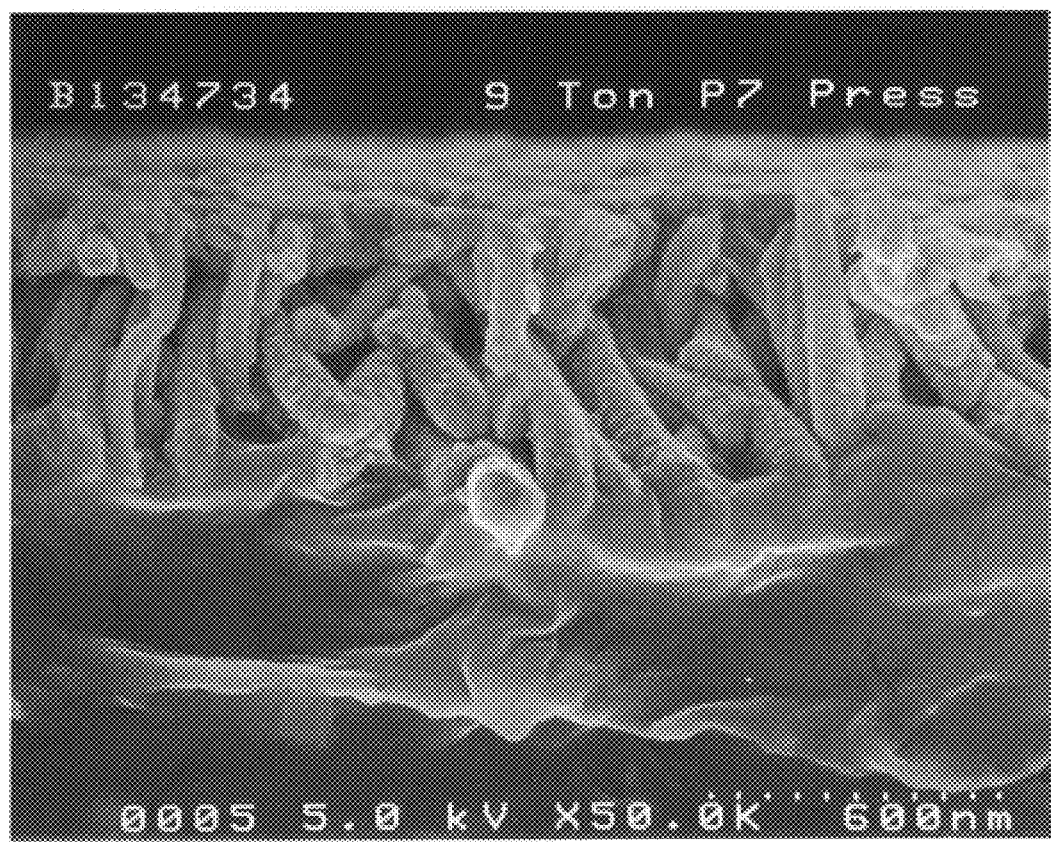
FIG. 8(b) is a scanning electron micrograph taken at 50,000× magnification of a cross section of one surface of an MEA of the present invention.

An MEA was prepared as described in Example 1, except that a pressure of 160 MPa (1.8 tons/$cm^2$) of electrode area was used for the static pressing. The polyimide substrate was peeled away leaving the catalyst particles attached to the surface of the membrane as shown in FIG. 8. FIG. 8 shows high resolution cross-sectional scanning electron micrographs at 15,000× (FIG. 8(*a*)) and 50,000× (FIG. 8(*b*)) magnifications, of the catalyst particles attached to the ICM surface.

The micrographs of FIG. 8 show that almost all of the catalyst coating on the support particles remained outside the ICM and that there was no other ionomer or polymer electrolyte in contact with the catalyst. In contrast to Example 1, however, the catalyst coated support particles of this example appeared to be tilted, lying over with more of their tips embedded in the ICM surface. The overall thickness of the catalyst layer appeared to have been reduced by about 10% compared to the membrane of Example 1, wherein a lower pressure was used.

Example 3 (Comparative)

Figure 9:
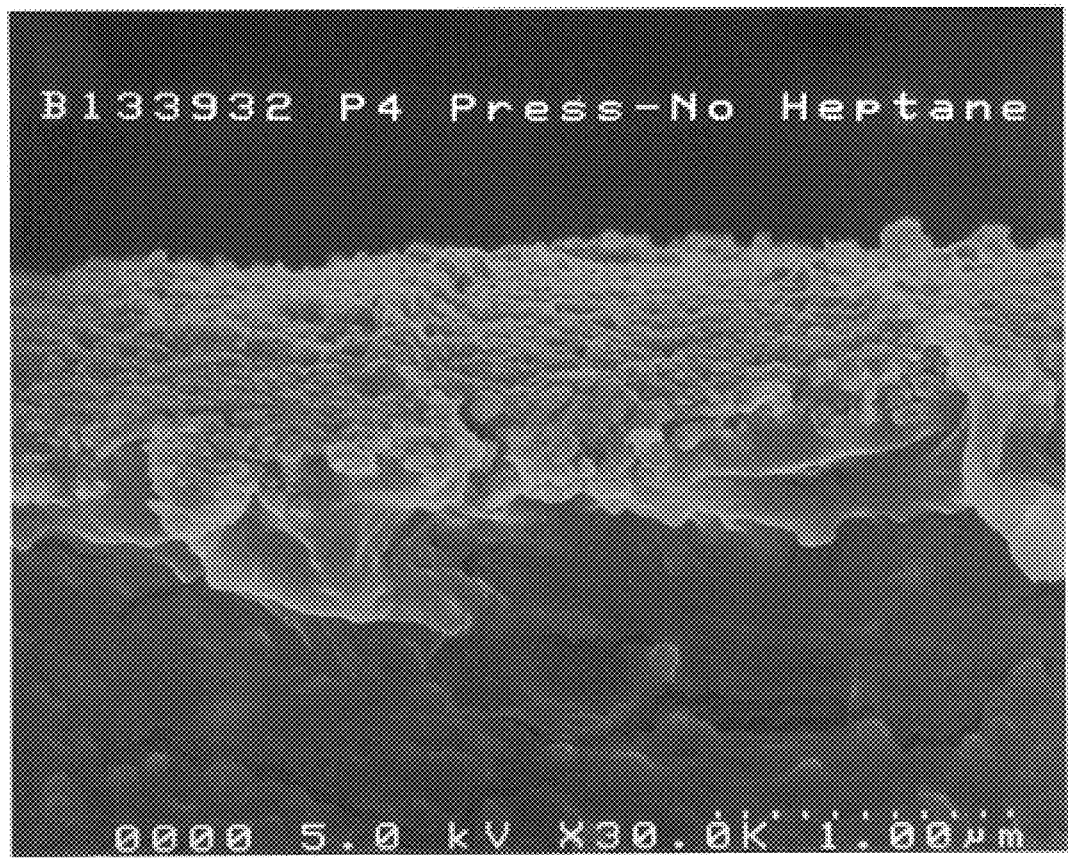
FIG. 9 is a scanning electron micrograph taken at 30,000× magnification of a cross section of one surface of a comparative MEA.

An MEA was formed by static hot-pressing catalyst coated support particles into the Nafion membrane surface without heptane solvent pretreatment, at 130° C. and 160 MPa (1.8 tons/$cm^2$ of electrode area) for one minute. FIG. 9 shows an SEM micrograph cross-section, at 30,000× magnification, of the surface region of the MEA. In contrast to Examples 1 and 2, no catalyst particles or parts of particles can be seen to extend above the surface of the ICM.

Example 4

Figure 10:
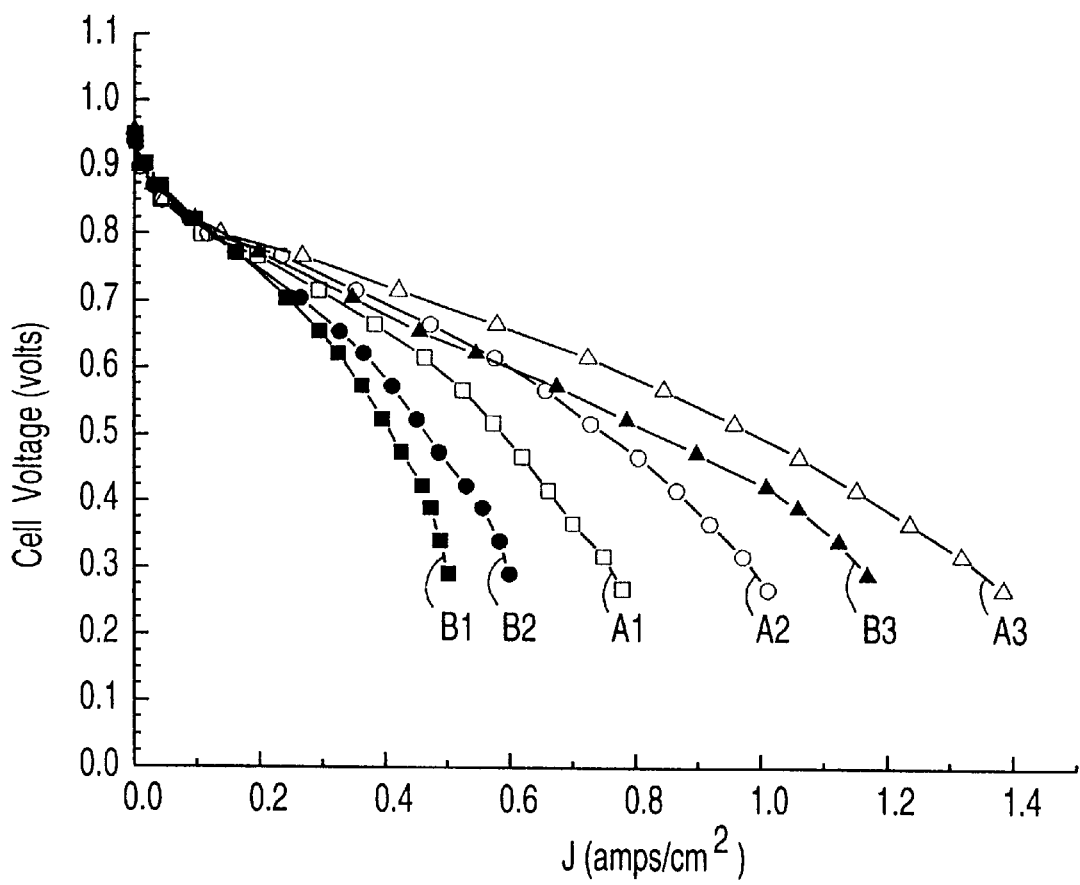
FIG. 10 is a graph showing cell voltage vs. current density for three fuel cells of the present invention (A1–3) and three comparative fuel cells (B1–3).

Three 10 $cm^2$ MEAs were prepared as described in Examples 1 and 2 using, respectively, Nafion 117 (4-1), Nafion 115 (4-2) and Nafion 112 (4-3), a catalyst coating of 1000 Å mass equivalent thickness of platinum, and a pressure of 44.5 MPa (0.5 tons/$cm^2$) of electrode area. The degree of encapsulation was approximately intermediate between that shown in FIGS. 7 and 8. Fuel cell polarization curves were obtained as described above, except the air pressure and flow rates for Example 4-3 (Nafion 112) were 69 kPa (10 psig) at 1.2 SLM. Polarization curves are shown in FIG. 10 Labeled A1, A2 and A3 respectively.

In comparison, three MEAs were prepared by the hot-pressing method described in Example 3, using Nafion 117 (4-1C), Nafion 115 (4-2C) and Nafion 112 (4-3C) as the ICMs, respectively. In other words, no heptane solvent pretreatment was used in the comparative examples. The catalyst support particles were fully embedded, similar to that shown in FIG. 9. Fuel cell polarization curves were obtained as described above, except the hydrogen pressure was 34.5 kPa (5 psig) for Examples 4-1C (Nafion 117) and 4-2C (Nafion 115), and the air flow rate was 2.5 SLM for Example 4-3C (Nafion 112). Polarization curves are shown in FIG. 10, labeled B1, B2 and B3, respectively. The performance of the fully embedded MEAs was inferior to that of Examples 4-1, 4-2, and 4-3, prepared according to the process of this invention.

Example 5

Figure 11:
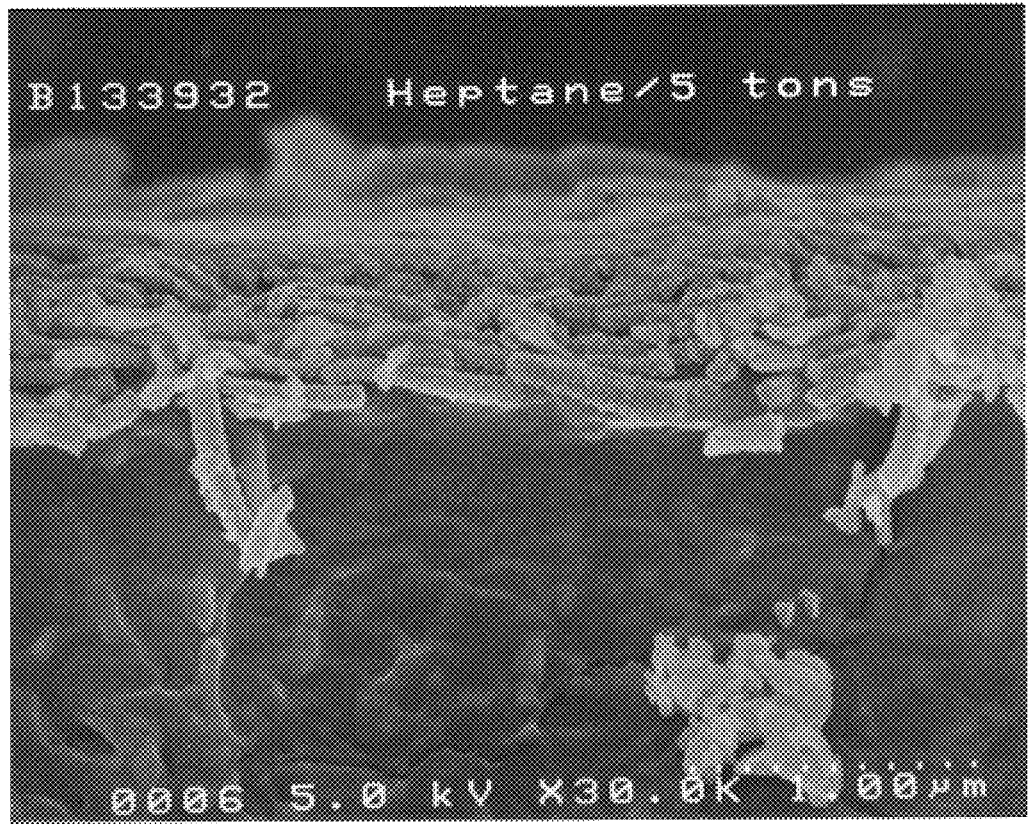
FIG. 11 is a scanning electron micrograph taken at 30,000× magnification of a cross section of one surface of an MEA of the present invention.

In this example, a Nafion membrane was pretreated by dipping in heptane for one second. An MEA was formed by applying vacuum to the assembly of layered materials in a Carver press for 2 minutes, then applying approximately 89 MPa (1 ton/$cm^2$ of electrode area) for 2 minutes at 23° C. FIG. 11 shows a 30,000× SEM micrograph of the catalyst layer as transferred to the Nafion ICM surface. The catalyst coated support particles are lying substantially parallel to one another on the surface.

Example 6

In this example, an MEA with a 50 $cm^2$ active electrode area was prepared by nip roll transferring the catalyst layer onto a heptane-pretreated ICM surface at 23° C. A three-layer sandwich was made as follows: A 10.4 cm×10.4 cm square of heptane-dipped Nafion 112 was placed between two nanostructured catalyst film layers on 50 μm thick (2 mil) polyimide substrates. The catalyst film layer to be the cathode consisted of 0.2 mg/$cm^2$ of E-Beam deposited Pt on nanostructured support particles that were, on average, 1.5 μm long. The catalyst film layer to be the anode consisted of 0.05 mg/$cm^2$ of e-beam deposited Pt on nanostructured support particles that were, on average, 0.5 μm long. The catalyst coated area on each polyimide substrate was a centered 50 $cm^2$ square. The three-layer sandwich was in turn placed between 10 additional (5 on each side) 10.4× 10.4 cm pieces of 50 μm thick polyimide. This stack was then passed through the nip of a hand-cranked mill with unheated steel rollers, 7.5 cm in diameter and 15 cm long. The gap was set at 50 μm and the stack passed through the nip at approximately 3 cm/sec. Mechanical strain-induced separation of the steel rolls due to play in the hardware was observed. The exact line pressure was not measured. It was observed however, that with the nip gap set initially at 50 μm, an 8 layer stack of 25 μm thick sheets of polyimide would increase the gap when half way through to 175 μm, as measured with a feeler gauge.

Figure 12:
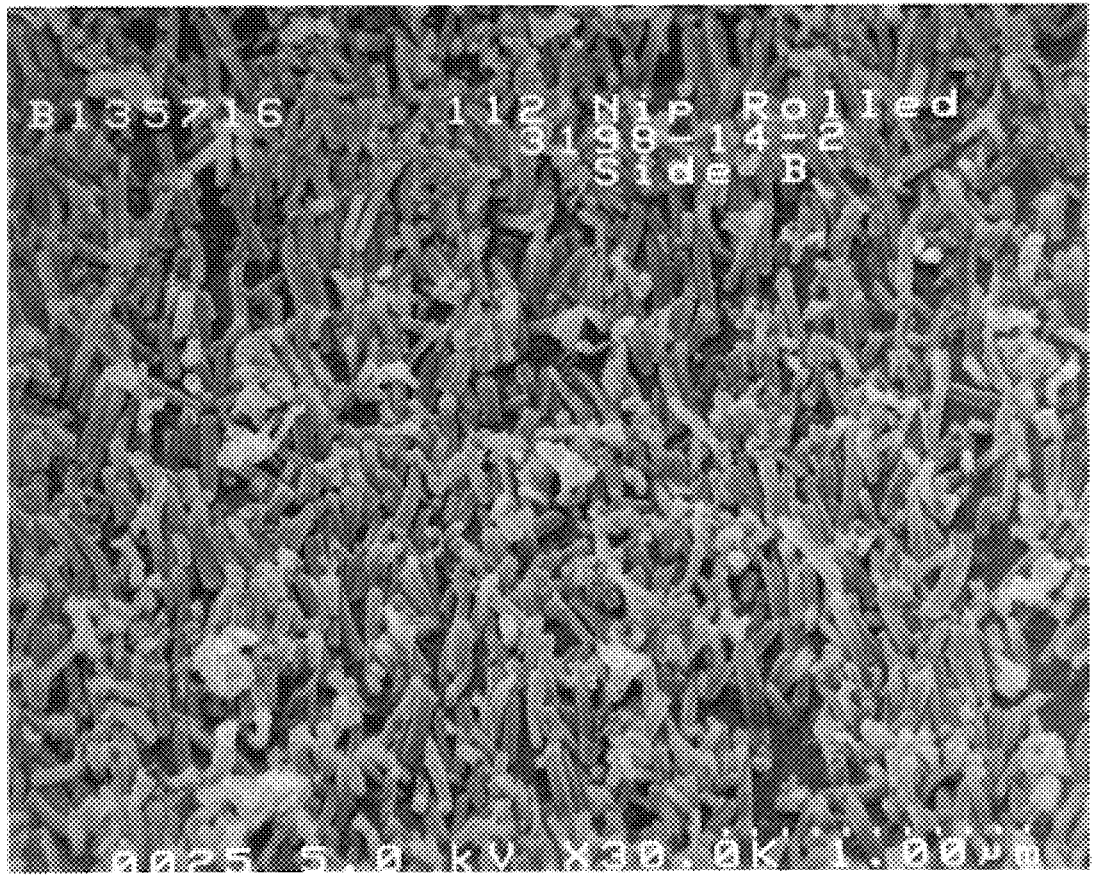
FIG. 12 is a scanning electron micrograph taken at 30,000× magnification of a plan view (top-down) of one surface of an MEA of the present invention.
Figure 13:
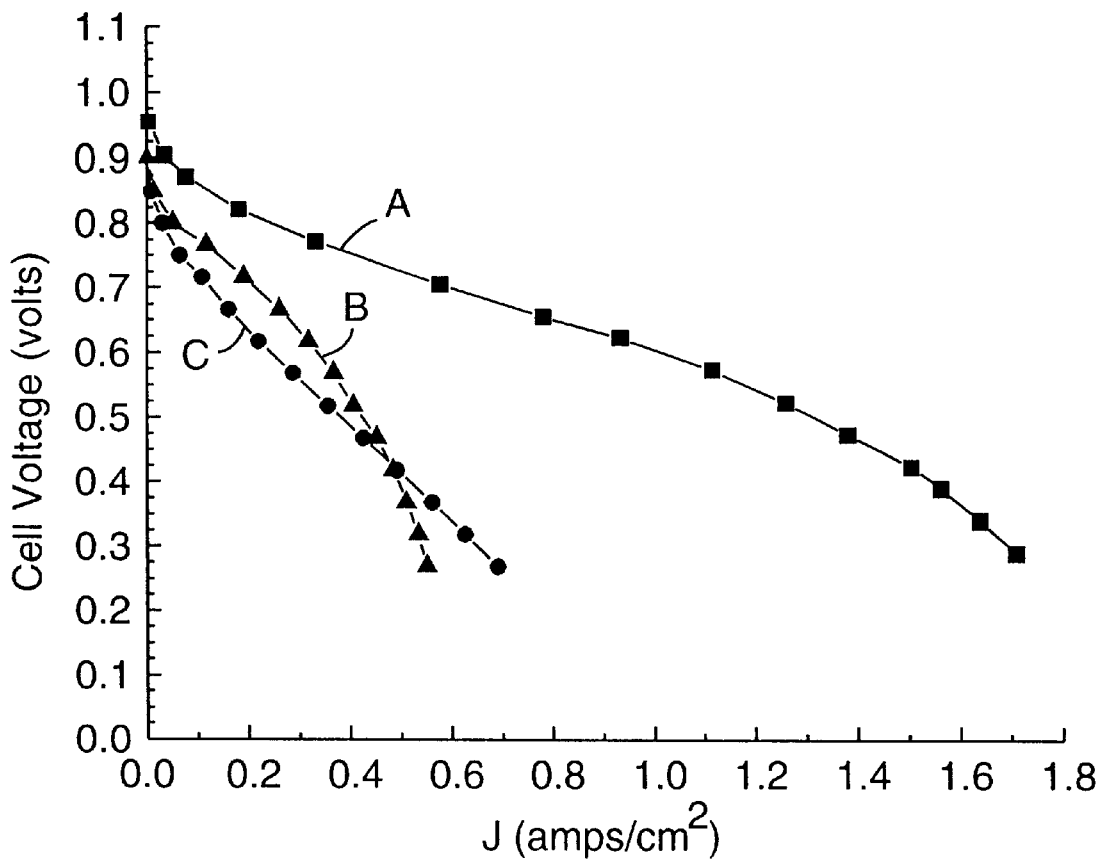
FIG. 13 is a graph showing cell voltage vs. current density for three fuel cells of the present invention.

When the polyimide substrates were removed from the ICM, the catalyst was seen to have transferred cleanly to both sides of the ICM. FIG. 12 shows a 30,000× magnification SEM micrograph, looking top-down, at the anode catalyst attached to the surface of an MEA sample prepared as described. (For scale, note that the protruding element portion apparent in FIGS. 2 and 13 is 0.2 μm in length.) In the sample, the catalyzed support particles were lying substantially parallel to one another and to the surface, similar to those seen in FIG. 11. The cathode catalyst was substantially the same in appearance. Trace A of FIG. 13 shows the $H_2$/air polarization curve from the 50 $cm^2$ MEA of this example. A satisfactory current density of 0.6 amps/$cm^2$ at 0.7 volts was obtained on just 34.5 kPa (gauge pressure) (5 psig) air with a total Pt loading of 0.25 mg/$cm^2$. The polarization results are especially significant considering, as shown from FIG. 12, that a significant portion of the actual catalyst surface area is not in direct contact with any ion conducting resin or membrane.

Alternatively, it was shown that the catalyst coated nanostructured support particles can be transferred to the Nafion by nip rolling at 23° C. even without solvent pretreatment of the membrane. Using the hand cranked two-roll mill, with the same 50 μm (2 mil) gap, a three-layer sandwich was prepared, with the Nafion 117 membrane used dry. The cathode catalyst layer had 0.2 mg/$cm^2$ of Pt on 1500 Å nanostructured catalyst supports. The anode catalyst layer had 0.05 mg/$cm^2$ of Pt on 500 Å nanostructured catalyst supports. For both the cathode and anode, the area of the catalyst coating was a 50 $cm^2$ square. Two additional sheets of 50 μm thick polyimide were placed on the outsides of the catalyst substrates. This stack was passed through the mill, at 23° C., at about 3 cm/sec. Transfer of catalyst particles to the Nafion was observed to be complete. FIG. 13, trace A shows a polarization curve from the 50 $cm^2$ MEA of this example. FIG. 13, trace C shows a polarization curve from a 10 $cm^2$ MEA of this example (i.e., transfer was effected without prior heptane treatment), tested as described above. Trace B shows a comparison polarization curve from a smaller (5 $cm^2$) MEA prepared similarly except it was pretreated with the heptane dip process. The performance of the heptane pretreated sample is better in the more critical, higher voltage portion of the curve.

Example 7

Samples were prepared by nip roll transfer of catalyst support particles to an ICM using a motor driven, controlled-pressure mill with heated steel rollers, 15 cm in diameter, moving at 0.9 m/min. (3 ft/min.). The nip pressure was controlled by hydraulic rams on the ends of one roll. Samples of Pt coated, 1500 Å nanostructured support particles were transferred to heptane-dipped Nafion 117 from 50 μm thick polyimide substrates. The catalyst area transferred was a strip approximately 3 to 4 cm wide. A three-layer stack of catalyst-substrate/membrane/catalyst-substrate was fed directly, with no other layers, into the nip with the hydraulic ram pressure set to either 138 kPa (20 psi) or 552 kPa (80 psi), and roller temperatures of 38, 52, and 66° C., respectively, for each pressure, and at 138 kPa and 79° C. Good transfer was obtained at 138 kPa ram pressure at all temperatures. Evidence of Nafion flow was visible on the samples prepared at 552 kPa such that the catalyst layer was not uniform, indicating that lower ram pressures were preferable.

It was also seen that thinner substrates for the catalyst support film, e.g., 25 μm instead of 50 μm thick polyimide, afforded more complete transfer of catalyst to the ICM at low temperatures and pressures, especially for the shorter catalyst support particle films, as described in Example 6. The thinner substrate material is less rigid and more deformable, such that better contact of the catalyst film with the ICM during the nip-rolling transfer process can be assumed.

Example 8

This example shows that heptane pretreatment can consist of a rapid, one second dip or a 5 minute soaking with nearly equivalent transfer of catalyst-supported particles.

Two MEAs comprising Nafion 117 ICMs, each approximately 5 $cm^2$ in area, were prepared as in Example 6, using a hand-cranked nip roller. One ICM sample was given a 1 second heptane exposure, the other a 5 minute soak in heptane before assembling the sandwich for pressing. Transfer of the catalysts to both sides of the pretreated membranes appeared very similar for both samples; however, the shorter catalyst support particles (on the anode side) appeared to transfer slightly less completely on the 5 minute exposure sample than on the single dip exposed sample. However, high resolution SEM micrographs showed the catalyst support particles were applied to the surfaces of each ICM as seen in FIGS. 11 and 12.

Example 9

Figure 14:
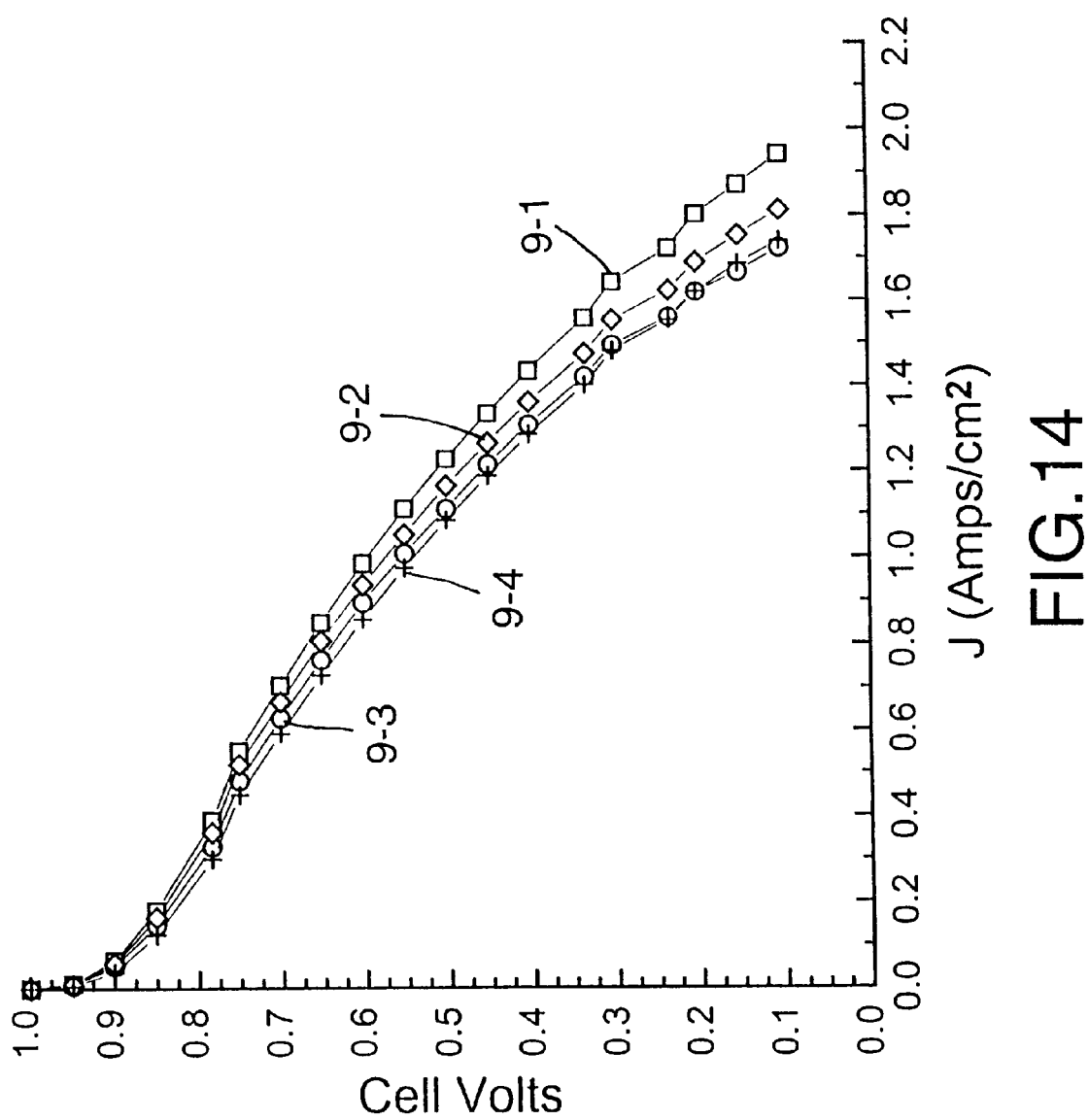
FIG. 14 is a graph showing cell voltage vs. current density for four fuel cells of the present invention.

MEA's were prepared as described above, using heat and static pressure for catalyst transfer onto Nafion 117 membranes. The Pt catalyst was coated onto nanostructured support particles, averaging about 1.5 μm in length, by electron beam evaporation. Supports of this length are designated as type A supports. MEA's having Pt loadings of 0.215, 0.160, 0.107, and 0.054 mg/$cm^2$ (designated 9-1, 9-2, 9-3, and 9-4, respectively) were prepared. Current densities for the MEA's are shown in FIG. 14. The data of FIG. 14 show that, as the Pt loading decreases on these long supports, fuel cell performance decreases. The current density of over 1.2 amps/$cm^2$ at 0.5 volts indicated for Sample 9-1 (0.215 mg/$cm^2$), is equal to or exceeds the maximum current density known in the art for Nafion 117, showing that the power output was membrane limited, even for this low mass loading.

Example 10

Figure 15:
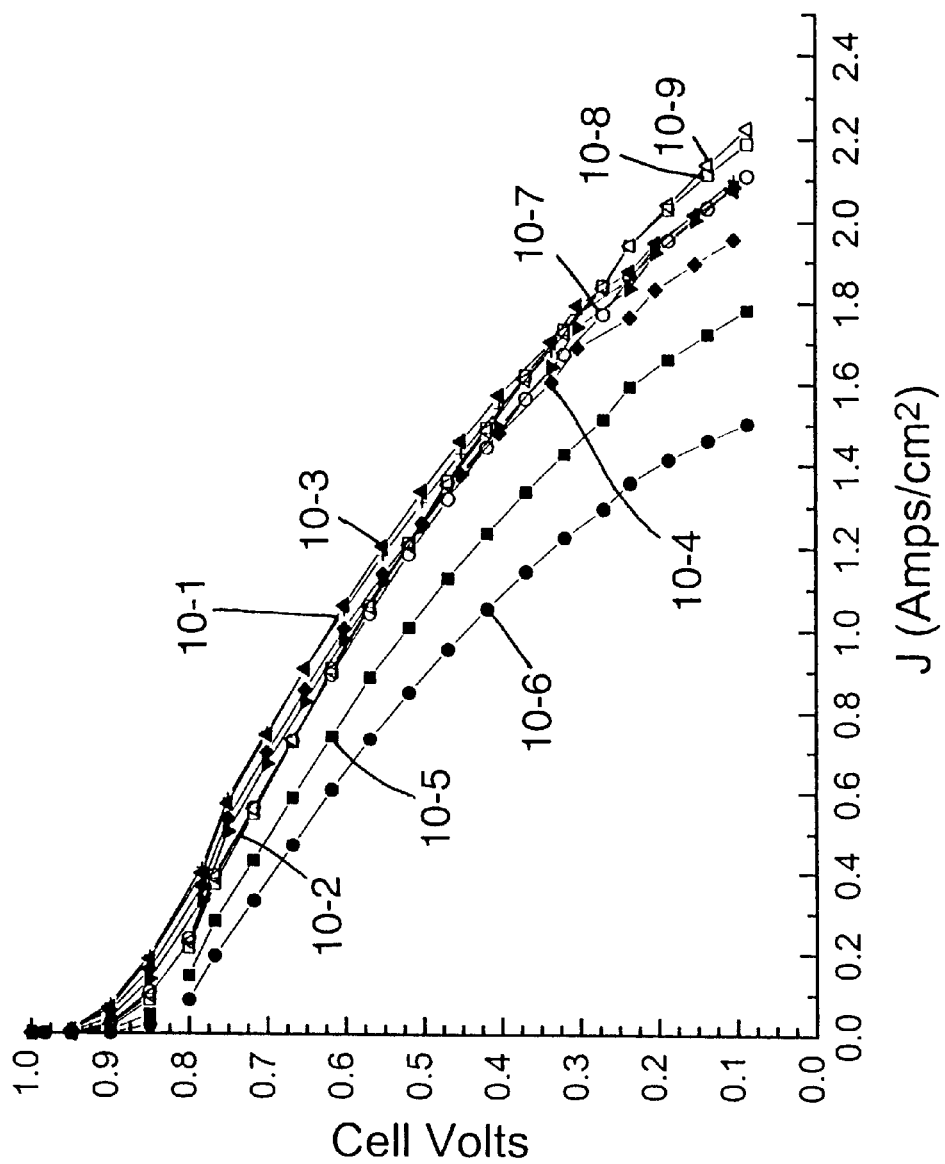
FIG. 15 is a graph showing cell voltage vs. current density for nine fuel cells of the present invention.

In these examples, MEAs were prepared as described above, using heat and static pressure for catalyst transfer onto Nafion 115 membranes. The Pt catalyst was coated onto the nanostructured supports particles by electron beam evaporation. Two lengths of support particles were used. These are designated as type A, on average 1.5 pm in length, and type B, on average 0.5 μm in length. The Pt loading on type A supports were 0.21, 0.16, 0.11, 0.05, 0.04, and 0.03 mg/$cm^2$, designated 10-1, 10-2, 10-3, 10-4, 10-5, and 10-6, respectively, in FIG. 15. For type B supports, the Pt loadings were 0.048 for one membrane (10-7) and 0.025 mg/$cm^2$ for two other MEAs (10-8 and 10-9). The data of FIG. 15 show that, for type A supports, as the Pt loading decreases below approximately 0.05 mg/$cm^2$, the fuel cell performance decreases as well. However, for type B supports, performance remains high even at the lowest catalyst loadings of 0.025 mg/$cm^2$.

Example 11

Figure 16:
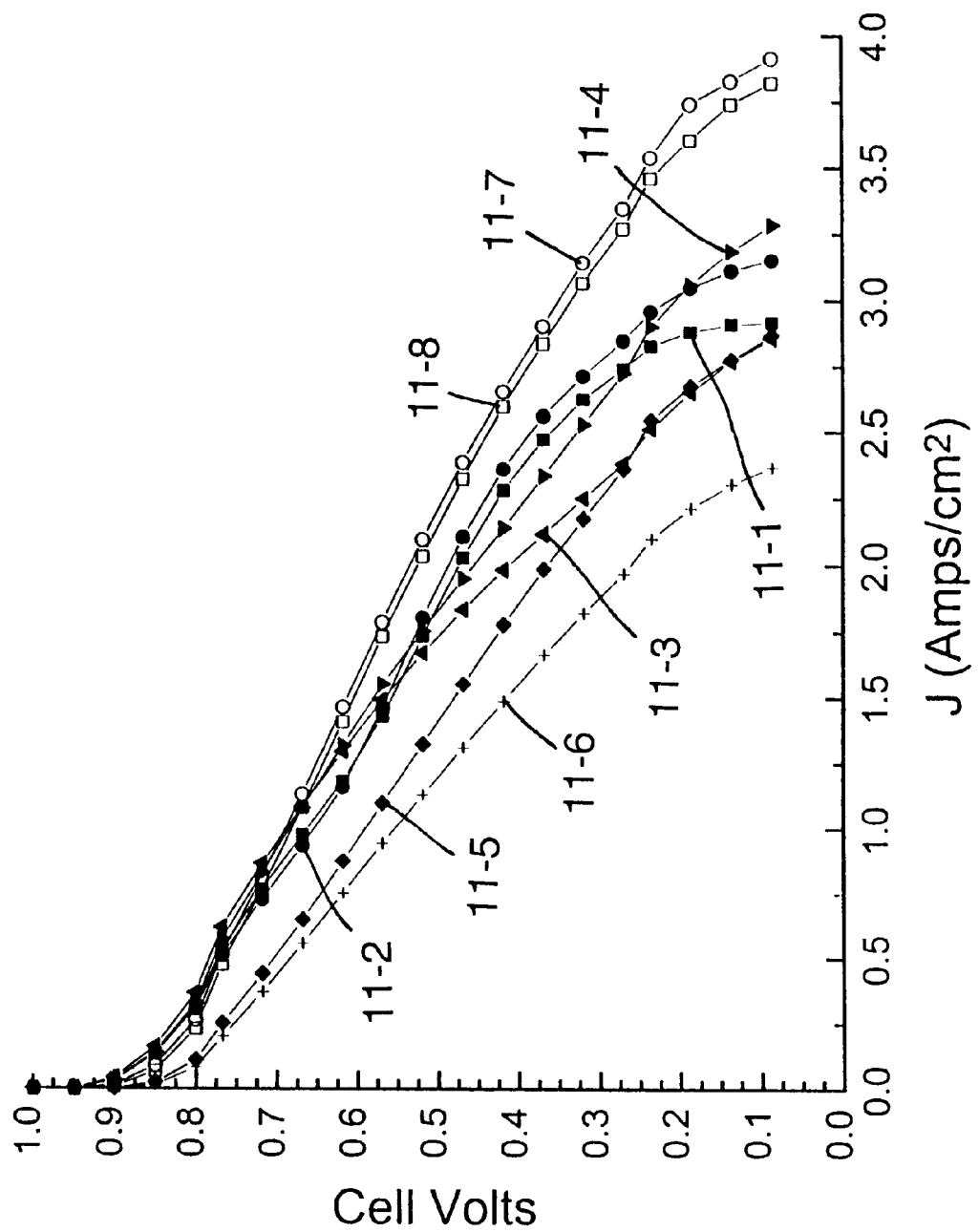
FIG. 16 is a graph showing cell voltage vs. current density for eight fuel cells of the present invention.

MEAs were prepared as previously described, using heat and static pressure for catalyst transfer onto Nafion 112 membranes and nanostructured support particles coated with Pt via electron beam evaporation. Two lengths of supports were used, designated as type A supports, on average 1.5 μm in length, and type B supports, on average 0.5 μm in length. The Pt loading of the type A supports was 0.21, 0.16, 0.11, 0.05, 0.04, and 0.03 mg/cm$^2$, designated 11-1, 11-2, 11-3, 11-4, 11-5, and 11-6, respectively, in FIG. 16. For the type B supports, the Pt loadings were 0.029 (11-7) and 0.0256 mg/cm$^2$ (11-8) for two MEAs. The data of FIG. 16 show that, for type A supports, as the Pt loading decreases below approximately 0.05 mg/cm$^2$, fuel cell performance decreases, as seen for Nafion 115 membranes of Example 10. However, for type B supports, the performance remains high even at the lowest loading. The current density of 2.25 amps/cm$^2$ at 0.5 volts indicated for a loading of 0.29 mg/cm$^2$ (Trace 11-7), is equal to the maximum current density known in the art with Nafion 112 membranes, and to our knowledge, represents the lowest loading ever demonstrated for this power output. FIGS. 2 and 3 show TEM's of a membrane identical to those obtained using the type B catalyst supports of this example.

A measure of catalyst utilization can be obtained by normalizing the current density to the mass loading and replotting the polarization curve as a function of current per unit mass of Pt, i.e. amps/mg of Pt. This type of plot is a cathode specific activity plot, and polarization curves for the type B supports of FIGS. 15 (10-8 and/or 10-9) and 16 (11-8) were replotted in this way as traces B and C in FIG. 1. In FIG. 1, comparison trace A is shown as obtained under similar cell conditions and membrane conductivity, but using conventional carbon particle supported catalysts coated from a dispersion. The cathode specific activity of the instant invention is seen to be far superior to the prior art, e.g., carbon particle supported catalysts.

Example 12

MEA's were prepared as previously described, using heat and static pressure for catalyst transfer onto an experimental membrane about 114 μm thick, made available by Dow and designated XUS13204.20. The Pt catalyst was coated onto the microstructures by electron beam evaporation. Two lengths of supports were used, designated as type A supports, on average 1.5 μm in length, and type B supports, on average 0.5 μm in length. The Pt loading of the type A supports was 0.21, 0.16, 0.11, and 0.05 mg/cm$^2$, designated 12-1, 12-2, 12-3, and 12-4, respectively, in FIG. 17. Type B supports were loaded with 0.044 and 0.029 mg/cm$^2$, designated 12-5 and 12-6, respectively. The data of FIG. 12 show that type B support particles with the lowest Pt loading gave superior performance at higher current densities. The current density of over 2 amps/cm$^2$ at 0.5 volts indicated in FIG. 12 for a loading of 0.029 mg/cm$^2$ (12-6), is equal to the maximum current density known in the art for this thickness of this Dow membrane.

Example 13

A series of small MEA's, approximately 1 cm$^2$, were prepared explicitly for characterization by X-ray diffraction. Pt was electron beam vapor deposited onto four type A (long) and four type B (short) nanostructured supports as described previously, at various mass loadings between 0.016 mg/cm$^2$ and 0.187 mg/cm$^2$. Standard 2-theta diffraction scans were obtained from the MEA samples and from a reference piece of the Nafion membrane without any catalyst material. Apparent crystallite sizes were determined from the Pt(111) diffraction peak half widths after correcting for instrumental broadening and the contribution of the Nafion. Peak widths were taken as the full width at half maximum of a calculated peak shape obtained from profile fitting procedures. FIG. 4 summarizes the variation of Pt crystallite size with mass loading. At these low loadings, high resolution SEM micrographs show that the Pt crystallites are distinct particles. The data of FIG. 4 show that the shorter, type B, supports give rise to larger crystallite sizes increasing at a faster rate with increasing Pt loading than the type A support. An explanation of the observation is that the amount of surface area on the sides of the type A supports is approximately three times that of the type B supports, and illustrates how the catalyst particle size and surface area can be controlled by the controlling the length of the acicular support particle.

Example 14

This example demonstrates that very low humidification of the oxidant supply stream is possible with the instant invention.

An MEA with 0.04 mg/cm$^2$ of Pt per electrode was prepared, using heat and static pressure for catalyst transfer onto a Nafion 112 membrane. Polarization curves were obtained at 207/414 kPa (30/60) psig H$_2$/O$_2$ and varying cathode humidification temperatures. The polarization curves for cathode humidity temperatures of, sequentially, 75° C., then 45° C., then with the sparge bottle by-passed, were identical, producing 2.25 amps/cm$^2$ at 0.5 volts. A second, identical MEA was prepared and tested similarly, except the oxygen humidification was bypassed from the very start of testing.

Example 15

This example demonstrates transfer of the acicular shaped catalyst coated support particles uniformly to the surface of a commercially available electrode backing layer material, ELAT™, identified above. A 5 cm$^2$ square piece of ELAT membrane was placed against a slightly larger piece of 25 μm thick polyimide carrying long supports (1.5 μm) having a loading of 0.2 mg/cm$^2$ of Pt. The side of the ELAT marked by the manufacturer as normally placed against the ICM in a fuel cell was the side placed against the catalyst film. A piece of 25 μm thick polyimide was placed on either side of the pair, and the assembly passed through the nip of the hand-cranked mill described in Example 6. The ELAT membrane was 0.5 mm thick. The degree of catalyst transfer was uniform over the area of the original substrate, but was observed not to be 100% complete. The original black nanostructured catalyst film coating on the substrate was light gray in appearance after the transfer procedure. The ELAT membrane was next used as the cathode in an MEA by placing it in the center of a 7.6 cm×7.6 cm square of Nafion 117, and placing a 5 cm$^2$ piece of Pt catalyst nanostructure coated polyimide (0.05 mg/cm$^2$) on the opposite side of the Nafion 117 membrane for the anode. The assembly was hot pressed at 130° C. as described in Example 3. The MEA was then tested in a fuel cell as described above, except it was operated at gauge pressures of 207/414 kPa (30/60 psig) of H$_2$/O$_2$, respectively. After operating for more than 24 hours, the stabilized polarization curve indicated significant cathode overpotential, but produced 0.1 amps/cm$^2$ at 0.25 volts and about 0.025 mps/cm$^2$ at 0.5 volts.

Example 16

Figure 17:
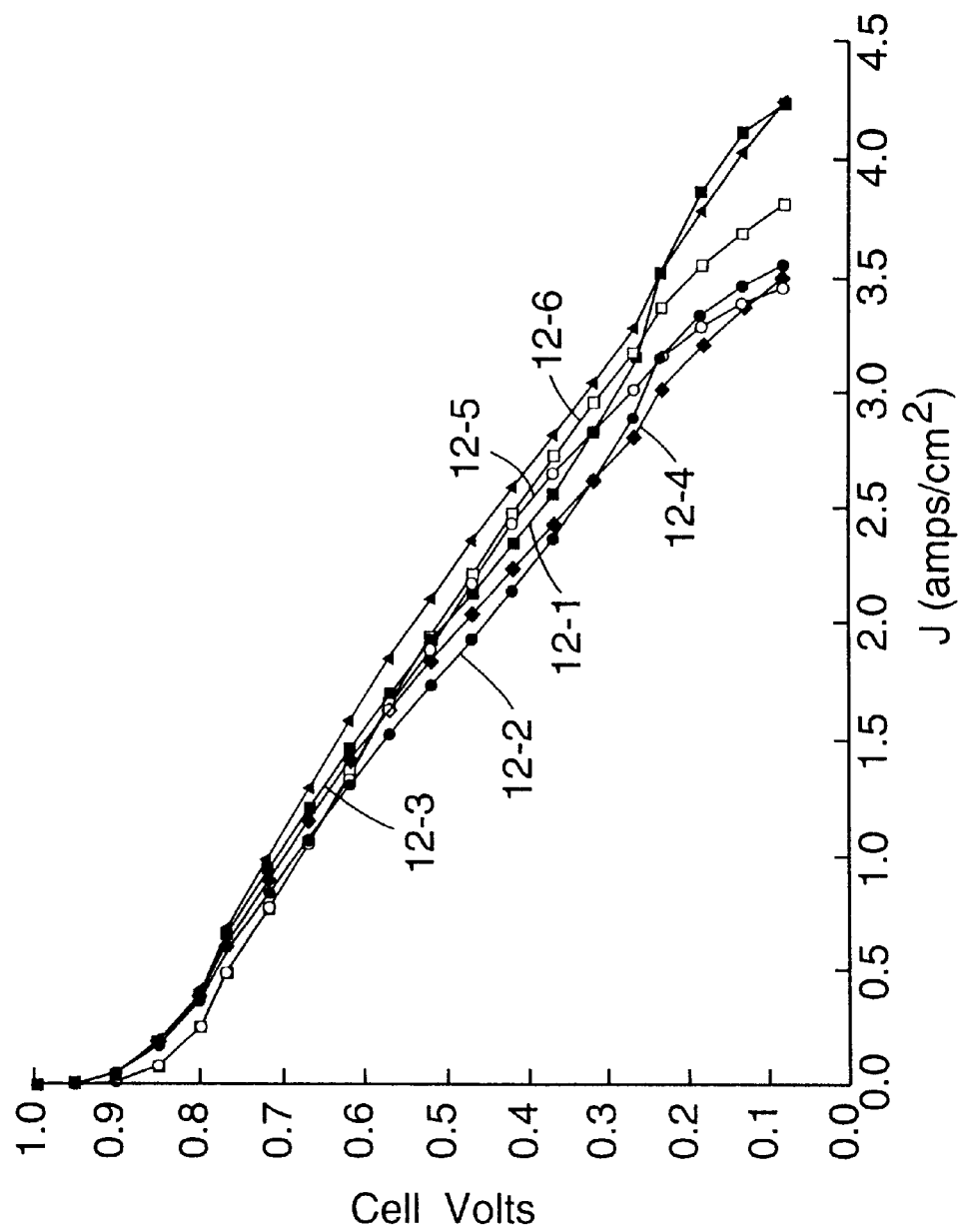
FIG. 17 is a graph showing cell voltage vs. current density for six fuel cells of the present invention.
Figure 18:
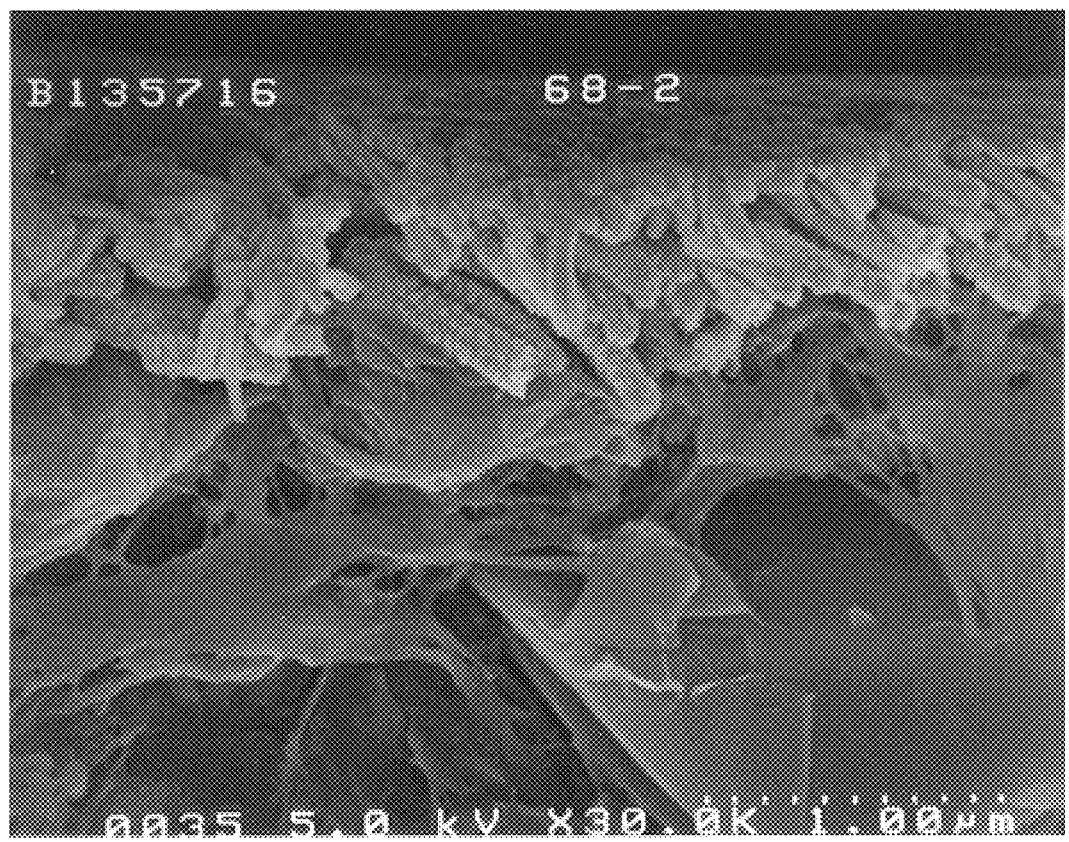
FIG. 18 is a scanning electron micrograph taken at 30,000× magnification of a cross section of one surface of an MEA of the present invention.

This example demonstrates partial embedding of the catalyst coated support particles in the surface of the electrode backing layer (EBL). Nanostructured catalyst coated support particles, 1.5 μm long, were prepared on 50 μm thick polyimide as previously described, having 0.3 mg/cm² of Pt. Samples of approximately 1 cm² area were laid catalyst side down on a similar sized piece of a carbon loaded polyolefin EBL prepared as described in U.S. Pat. No. 5,910,378, which is herein incorporated by reference, consisting of approximately 95 wt % conductive carbon in a porous membrane of high density polyethylene. Four sheets of 25 μm thick polyimide were placed on both sides of the sample and the assembly passed through the hand cranked mill described in Example 6 at an initial roller gap of 50 μm. The original catalyst support polyimide substrate was delaminated from the surface of the EBL, leaving the catalyst coated support particles on the surface of the EBL material. FIG. 17 shows an SEM micrograph at 30,000× magnification of a cross-sectional edge of the sample, clearly showing the acicular catalyst support particles lying on the surface of the EBL.

In examples 17 and 18 (comparative), the effectiveness of using a microtextured substrate for the catalyst support and forming the catalyst surface layer of the ICM with the same pattern is demonstrated. They also demonstrate use of a carbon precoat on the nanostructure support particle before Pt deposition to enhance the support particle conductivity, and the use of sputter deposition to apply both the carbon and Pt.

Example 17

A nanostructured catalyst support layer of type A supports was deposited onto a 5 cm² square nickel substrate, 0.25 mm thick, the surface of which was microtextured into a regular array of parallel V-grooves, with peak-to-peak heights of 20 μm. A mass equivalent thickness of 1500 Å of PR 149 (per 5 cm² planar area), was vapor deposited onto the substrate, then annealed as described above, to produce oriented nanostructure supports. A thin carbon precoat was sputter-deposited onto the oriented supports using a SunSource™ model 7.62 cm (3 in.) diameter DC magnetron sputtering source (Material Science, Inc., San Diego, Calif.) operating at 250 watts in 2.4 mTorr of argon. The mass equivalent thickness of the carbon applied was approximately 500 Å. This amount would be expected to apply an equivalent coating thickness of about 40 Å of carbon around the supports due to the approximately 10 to 15 fold increase in geometric surface area provided by the nanostructure support particles and a square root of two increase due to the geometric surface area increase of the microtextured substrate. Similarly, Pt was sputter deposited onto the nanostructure elements with a similar sized Pt target at 300 watts power in 2.3 mTorr of argon, to give a per-unit-planar-area mass loading of 0.165 mg/cm². This 5 cm² coated metal substrate was used as the source of cathode catalyst to form the MEA of this example.

Figure 19:
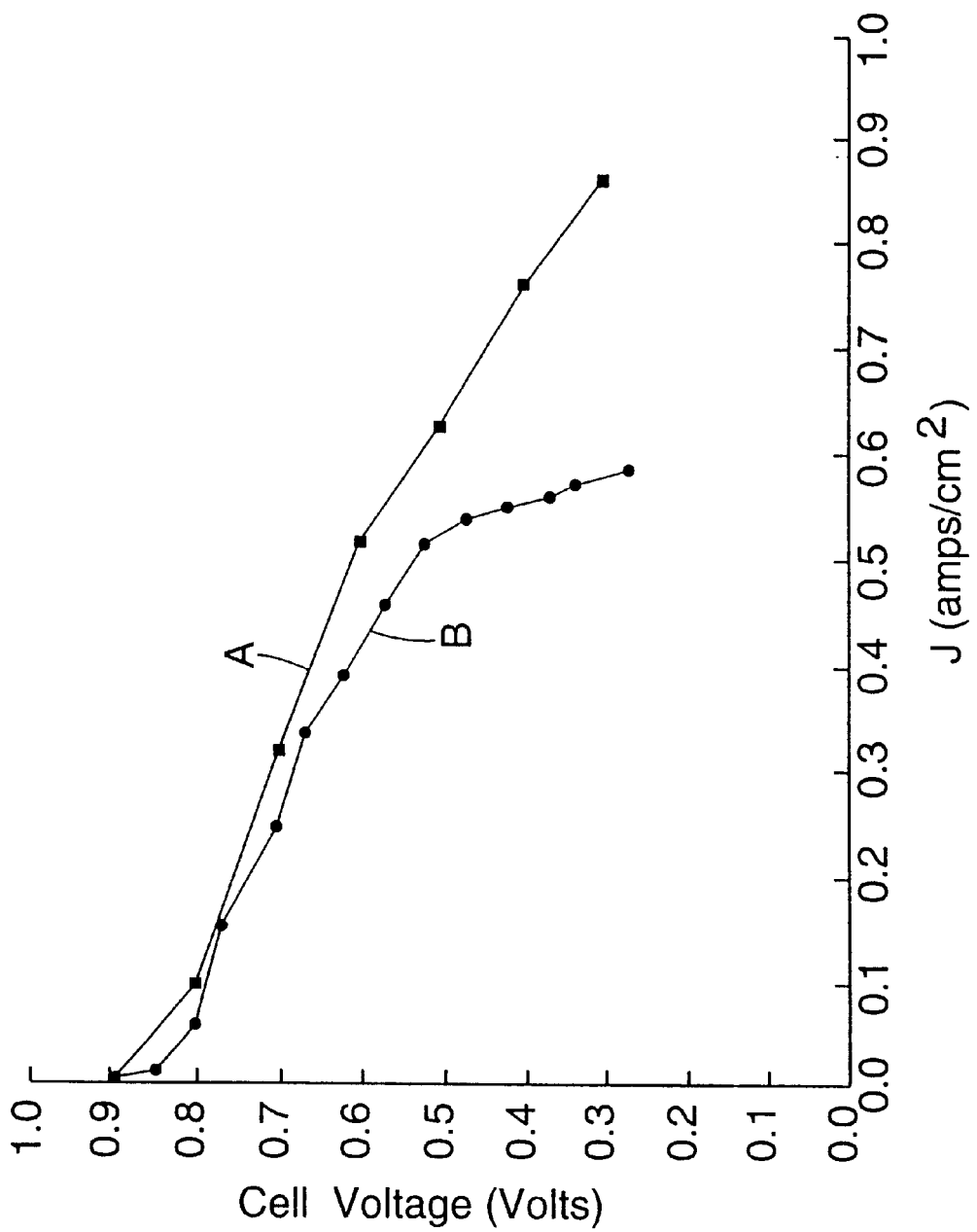
FIG. 19 is a graph showing cell voltage vs. current density for one fuel cell of the present invention and a comparative example.

For the anode catalyst source, type A supports were deposited and coated with a carbon precoat and Pt sputter-coated overlayer, onto a flat polyimide substrate, as described at the beginning of the examples. The amount of carbon and Pt loadings (0.165 mg/cm²) were the same as applied to the cathode substrate of this Example. To form the MEA, the cathode and anode substrates were placed on either side of a Nafion 115 ICM, 50 μm thick polyimide spacer sheets were placed outside these, followed by 125 μm thick metal shims. This sandwich was hot pressed as described above. The microformed metal substrate and the polyimide substrate were removed, leaving the respective catalyst layers embedded in the ICM surface. FIG. 5 shows SEM cross-sections, cut normal to the length of the V-grooves, at 1500× and 30,000× magnifications of the nanostructure-on-microformed surface layer of the MEA. The MEA was tested on the fuel cell test station at 207 kPa (30 psig) H₂ and air, 80° C. cell temperature, 105 to 115° C. anode humidity temperature (temperature of a water-filled sparge bottle through which the gasses flowed before reaching the cell) and 70° C. cathode humidity temperature. FIG. 19, trace A, shows the polarization curve obtained after over 40 hours of operation. The performance is seen to exceed the comparative example's performance described in Example 18 (Trace B, FIG. 19).

Example 18 (comparative)

An MEA was prepared with catalyst loadings and Nafion membrane identical to those describe in Example 18, except the cathode catalyst was prepared on a flat polyimide substrate without any microtexture, identical to the anode catalyst. The fuel cell polarization curve was obtained under the same testing conditions as Example 18. FIG. 19 shows the polarization curve obtained after over 40 hours of operation. The performance is seen to be poorer than the microformed substrate example's performance described in Example 18. The high current density performance is also seen to be particularly less, indicative of cathode flooding, suggesting that the microformed cathode catalyst shape has helped eliminate this effect.

Gas Sensors

U.S. Pat. No. 5,338,430 describes the fabrication and testing of gas sensors based on nanostructured electrode membranes in which the nanostructured elements are fully embedded in the surface of the solid polymer electrolyte. Gas sensors have been prepared by the method of this invention, wherein partially encapsulated acicular coated catalyst particles were attached to the surface of a Nafion membrane. These examples 19 and 20 (below) show that the performance of an MEA as an electrochemical carbon monoxide gas sensor significantly depends on the method of applying acicular catalyst support particles to the membrane surface. Catalyst coated particles applied by nip-rolling at ambient temperature, such that the particles were lying substantially parallel to and on top of the surface of the membrane, provided sensors that were superior to the case when catalyst coated particles were applied by a static press method at ambient temperature, such that the particles were partially encapsulated at their tips but oriented substantially normal to the surface.

Two sets of twelve, two-electrode gas sensors were prepared by transferring Pt coated nanostructure elements from polyimide substrates to both sides of Nafion 117 ion conducting membranes. In the first set, the transfer method was static pressing at room temperature (cold press), with no additional solvent, similar to the MEAs made in Example 3. In the second set, the transfer method was achieved by nip-rolling at room temperature as describe in Example 6, above, but with no additional solvent treatment of the Nafion. For all sensor samples the nanostructure elements comprised 1.5 to 2 μm long acicular support particles electron beam coated with 3400 Å of Pt.

Example 19. Cold Pressing

Catalyst support particle transfer was carried out by cold pressing a 2.5 cm×5 cm MEA sandwich, as has been described above, using a 15.2 cm (6 in.) laboratory press (Fred S. Carver Co., Wabash, Ind.) at 138 MPa (10 tons/in2) at ambient temperature, for 5 minutes. The Nafion membrane was pretreated and dried as described above. A 0.95 cm dinker die (J. F. Helmold & Bro., Inc., Elk Grove Village, Ill.) was then used to punch out 12 circular sensor elements from the MEA, each 0.95 cm in diameter. The original polyimide substrates were both removed and each sensor element was installed in a multi-cell two-electrode test chamber described below. SEM micrographs revealed the nanostructure elements were only partially embedded in the Nafion, and remained substantially normal to the membrane surface.

Example 20. Cold Nip-rolling

For the second set of 12 sensor MEA's, the cold rolled MEA from which they were die punched was prepared by passing the sandwich through a two-roll mill equipped with 7.6 cm diameter stainless steel rolls set with a fixed gap of less than 25 $\mu$m, using a 186 watt (¼ hp) motor and a Minarik model SL63 speed controller (available from Minarik Electric Co., Glendale, Calif.) set at the slowest possible speed. The Nafion membrane was pretreated and dried as described above, then vacuum dried (25 Torr) for 45 to 120 minutes at 23 to 30° C. The original polyimide substrates were both removed, and each sensor element was installed in a multi-cell two-electrode test chamber described below. SEM micrographs revealed the nanostructure elements were lying on the surface of the Nafion, substantially parallel to the membrane surface.

The test chamber was designed to allow electrical contact to be made to each electrode of each sensor element, while exposing the working electrode but not the counter electrode to the chamber atmosphere. An electronic circuit, similar to that described in U.S. Pat. Nos. 5,666,949 and 5,659,296, FIG. 12, attached to the multiple sensors held the counter electrodes at the same potential as the chamber and biased the working electrode while monitoring the cell current. The chamber atmosphere was controlled with respect to flow rates (3 Liters/min.), relative humidity, and the concentration of CO (0.1% in $N_2$, Matheson Gas Products, Secaucus, N.J.) mixed with laboratory air. The CO gas concentrations were measured at the chamber exit with a Draeger Model 190 CO gas detector (available from National Draeger, Inc., Pittsburgh, Pa.). All measurements were done at ambient temperature, approximately 23° C. The output produced by each sensor was monitored simultaneously with all 12 such sensors, as a voltage developed by a differential current amplifier.

Figure 20:
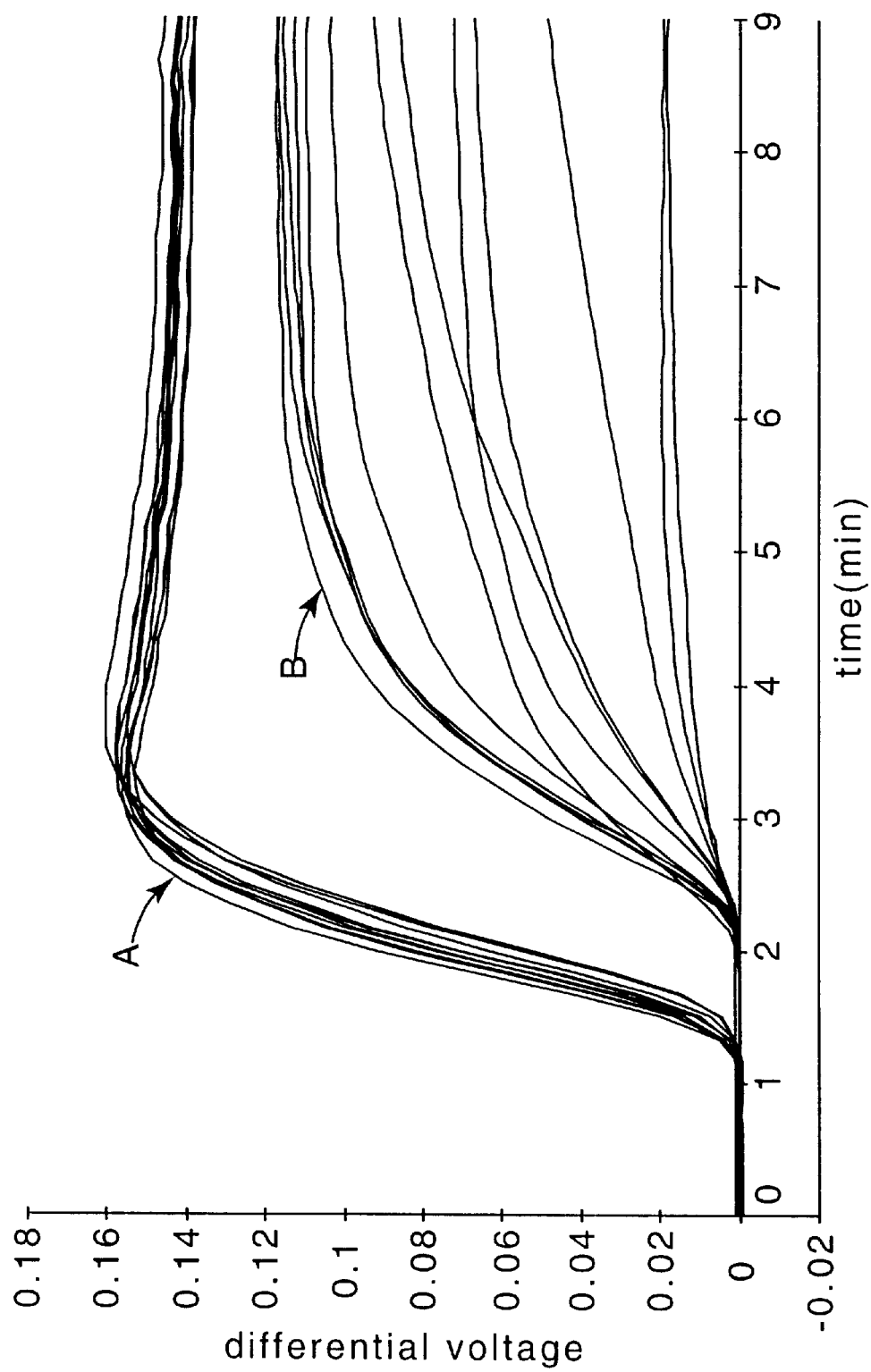
FIG. 20 is a graph showing CO response over time for CO sensors of the present invention.

FIG. 20 shows the responses of both sets of sensors when exposed to the sudden introduction of CO into the chamber inlet stream. The chamber relative humidity (RH) was 50% and the electronic circuit applied a bias of 0.1 volts to the working electrode. For the cold rolled prepared sensors (labeled A in FIG. 20, Example 19), the CO concentration was 82 parts per million (ppm) and for the cold pressed (labeled B in FIG. 20, Example 20), the CO concentration was 58 ppm. FIG. 20 shows that the cold rolled prepared sensors exhibited significantly more sensitivity and much less sensor-to-sensor variability than the cold pressed prepared sensors. The variance of the cold rolled sensor responses was 1.8%, versus 43.9% for the cold pressed sensors. This difference can be attributed to the better catalyst/membrane interface characteristics when the catalyst support particles were partially embedded by lying more parallel to the surface, than when they were partially embedded by having their tips embedded in the surface.

Figure 21:
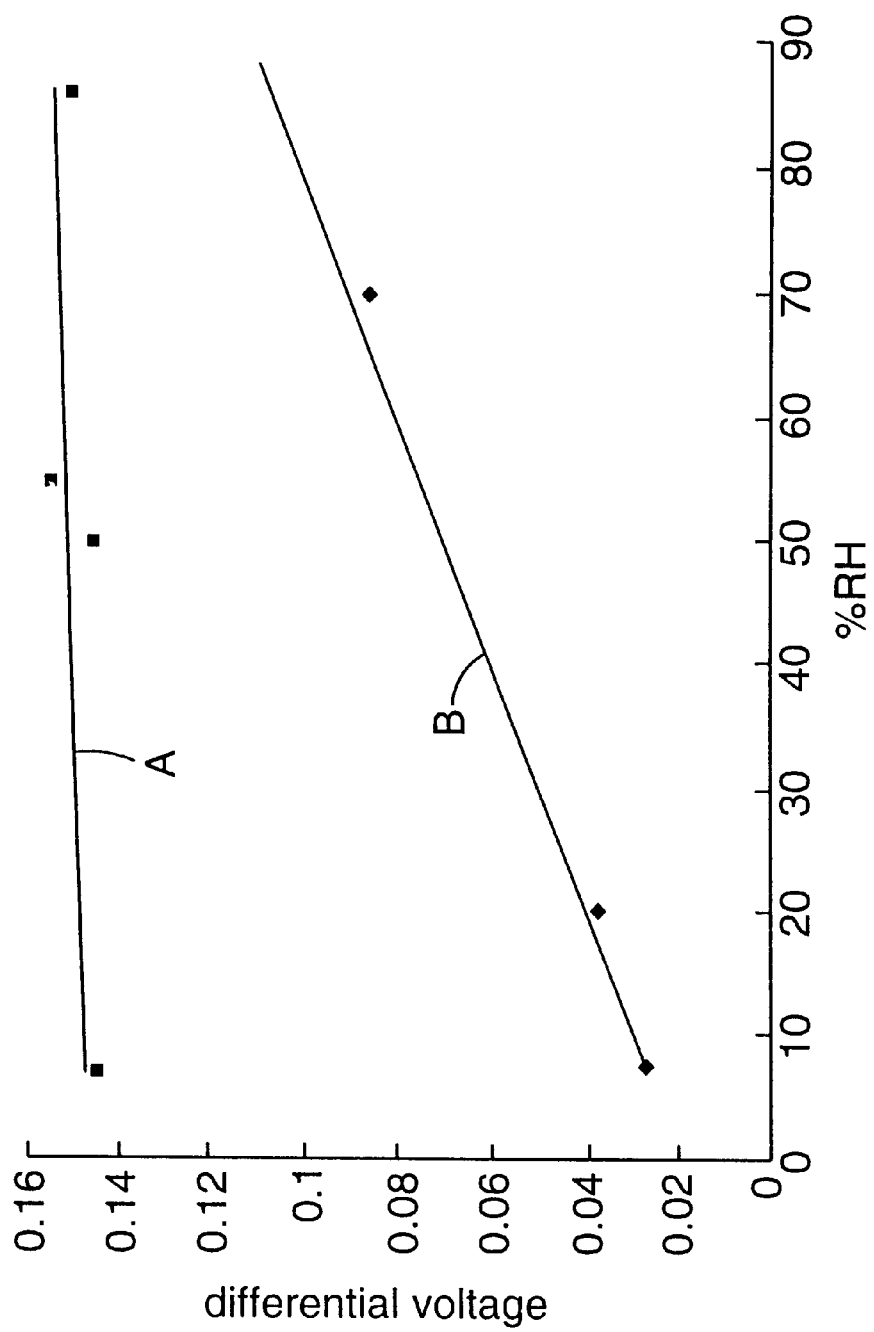
FIG. 21 is a graph showing CO response vs. relative humidity for CO sensors of the present invention.

A second set of measurements was carried out with both sets of sensors. The sensors were exposed to 100 ppm CO, with the same 0.1 volt bias on the sensors, and the performance monitored as the relative humidity of the inlet stream was varied. FIG. 21 compares the % RH dependence of the cold rolled prepared sensors (A) with the cold pressed prepared sensors (B). FIG. 21 shows that the cold rolled sensors (A) were much more stable with respect to relative humidity.

Example 21: Microtextured Catalyst Transfer Surface (MCTS) Formation

A thin polyimide film (50 $\mu$m thick, designated Kapton-H™, available from DuPont, Wilmington, Del.) was sputter-etched as taught by U.S. Pat. No. 4,340,276, which is herein incorporated by reference, and coated with a blend of 50 weight percent (wt %) hexamethylene diisocyanate trimer with 9 acrylate groups (HMDITA-9) prepared as taught by U.S. Pat. No. 4,650,845, which is herein incorporated by reference, and 50 wt % 1,6-hexanediol diacrylate (HDODA) resin (available from Sartomer, West Chester, Pa.). The resin was cast between the polyimide film and an electroformed nickel mold having prisms with an altitude of 25 $\mu$m and a peak to peak distance of 50 $\mu$m heated to about 57° C. (135° F.), using hand pressure with an ink roller to minimize the resin thickness. The resin was subsequently cured through the polyimide film at about 9.1 m/min (30 ft/min) with an Electrocurtain E-beam Model CB300 (available from Energy Sciences, Inc., Woburn, Mass.) at a dose of 50 kGy and an acceleration voltage of 275 kV, after which no delamination of the cured acrylate from the polyimide substrate was observed using the test method described by ASTM D3359-97 Test Method B (Standard Test Methods for Measuring Adhesion by Tape Test) with 3M No. 610 tape (available from 3M, St. Paul, Minn.).

Sections of the MCTS substrate about 15 cm×20 cm (6 in.×8 in.) were placed in a Mark 50 vacuum chamber (available from CHA Industries, Fremont, Calif.) at about 0.001 Torr and about 260° C. and coated with a thin (500 Å) platinum layer for static charge dissipation. A platinum layer of about 50 Å was later found sufficient. The films were then vapor coated in the same vacuum chamber with approximately 100 to 150 nanometers (nm) of PR-149 and converted into the whisker-like nanostructured surface with about 1 to 2 $\mu$m height and about 30 to 60 nm cross sections by annealing for a minimum of 30 minutes under approximately 0.001 Torr and about 260°. The resulting microstructure was then vapor coated with platinum using an electron beam (described above) for vapor deposition to form a nanostructured catalyst layer.

Figure 22A:
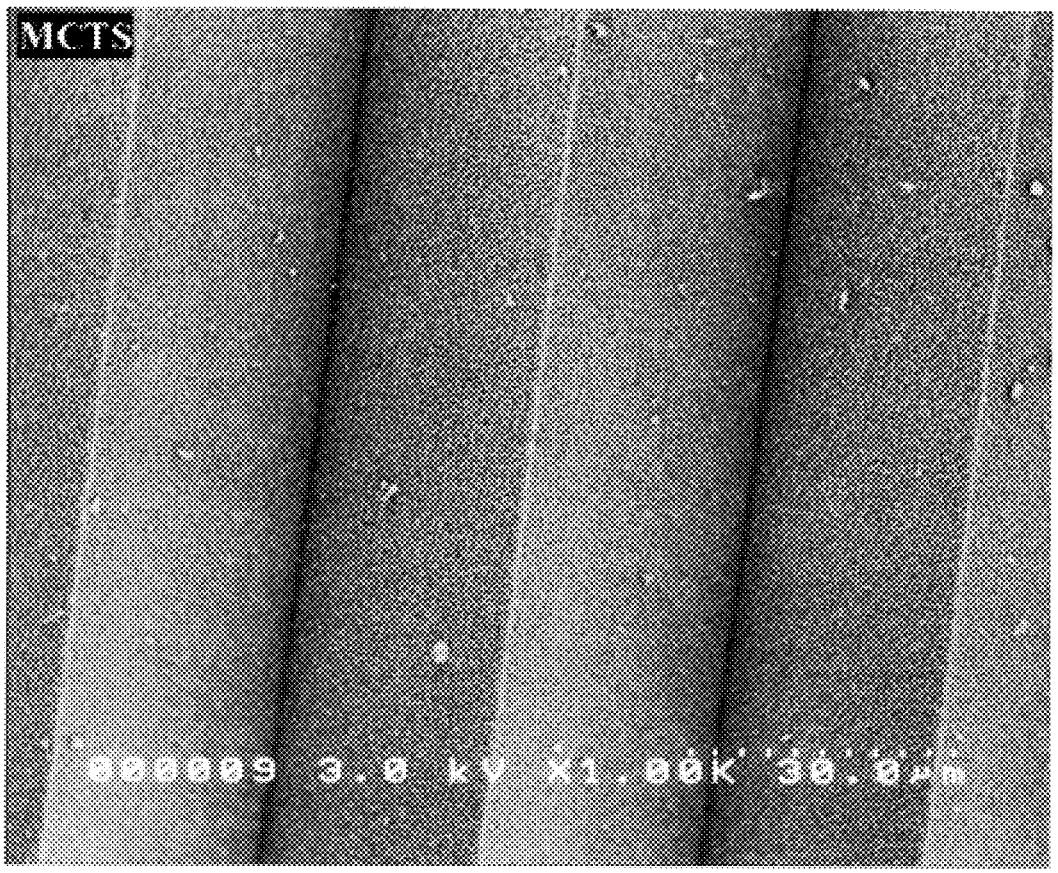
FIG. 22(a) is a scanning electron micrograph taken at 1000× magnification of on e surface of a microtextured catalyst transfer substrate (MCTS) of the present invention after deposition thereon of a nanostructured catalyst.
Figure 22B:
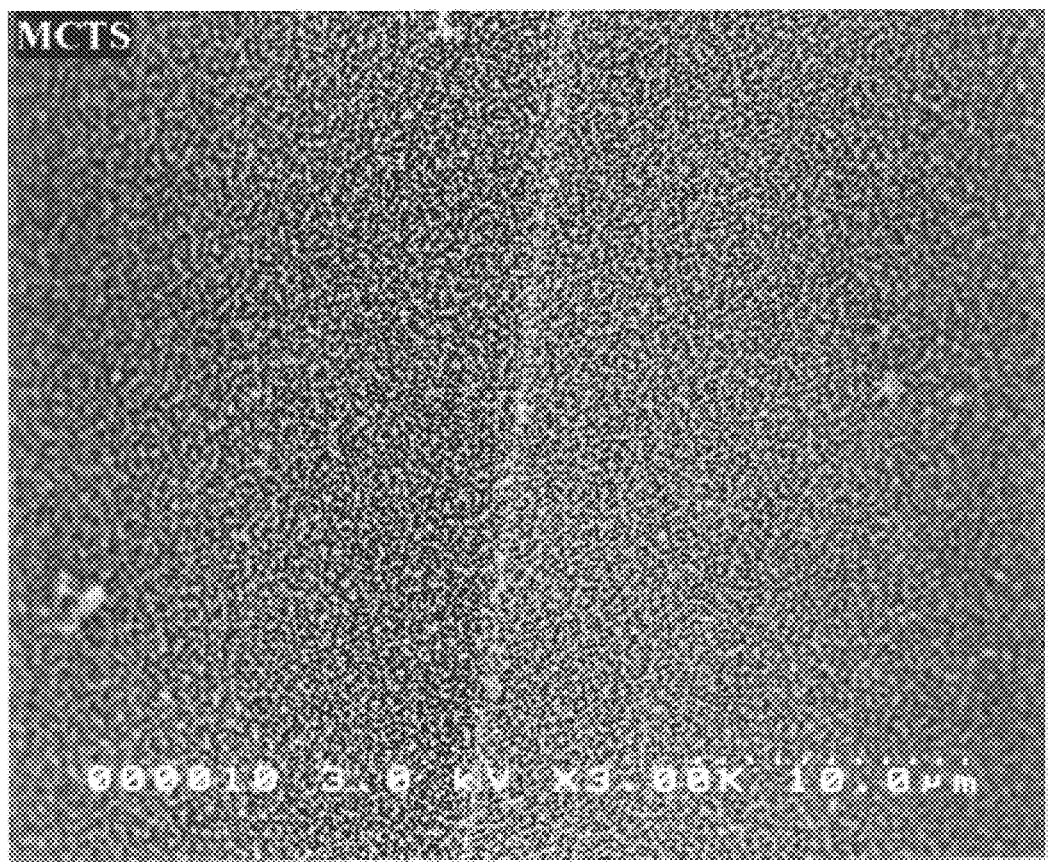
FIG. 22(b) is a scanning electron micrograph taken at 3000× magnification of the same surface as FIG. 22(a).
Figure 22C:
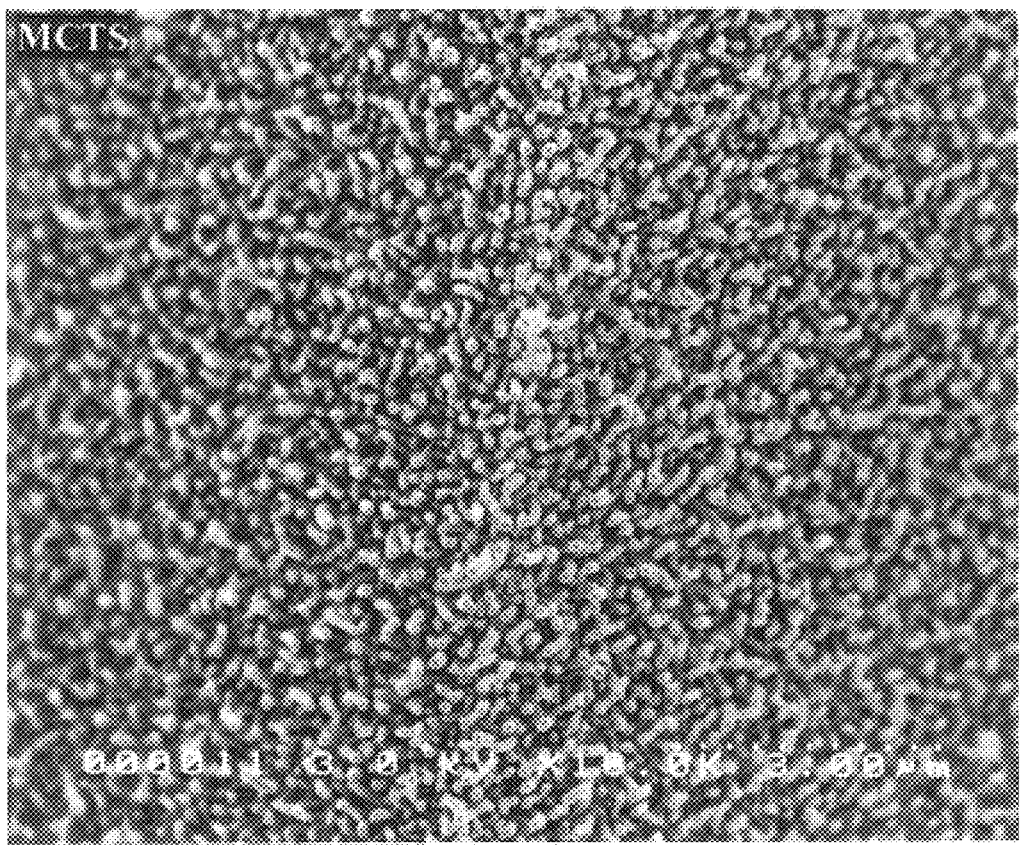
FIG. 22(c) is a scanning electron micrograph taken at 10,000× magnification of the same surface as FIG. 22(a).
Figure 22D:
FIG. 22(d) is a scanning electron micrograph taken at 40,000× magnification of the same surface as FIG. 22(a).
Figure 23:
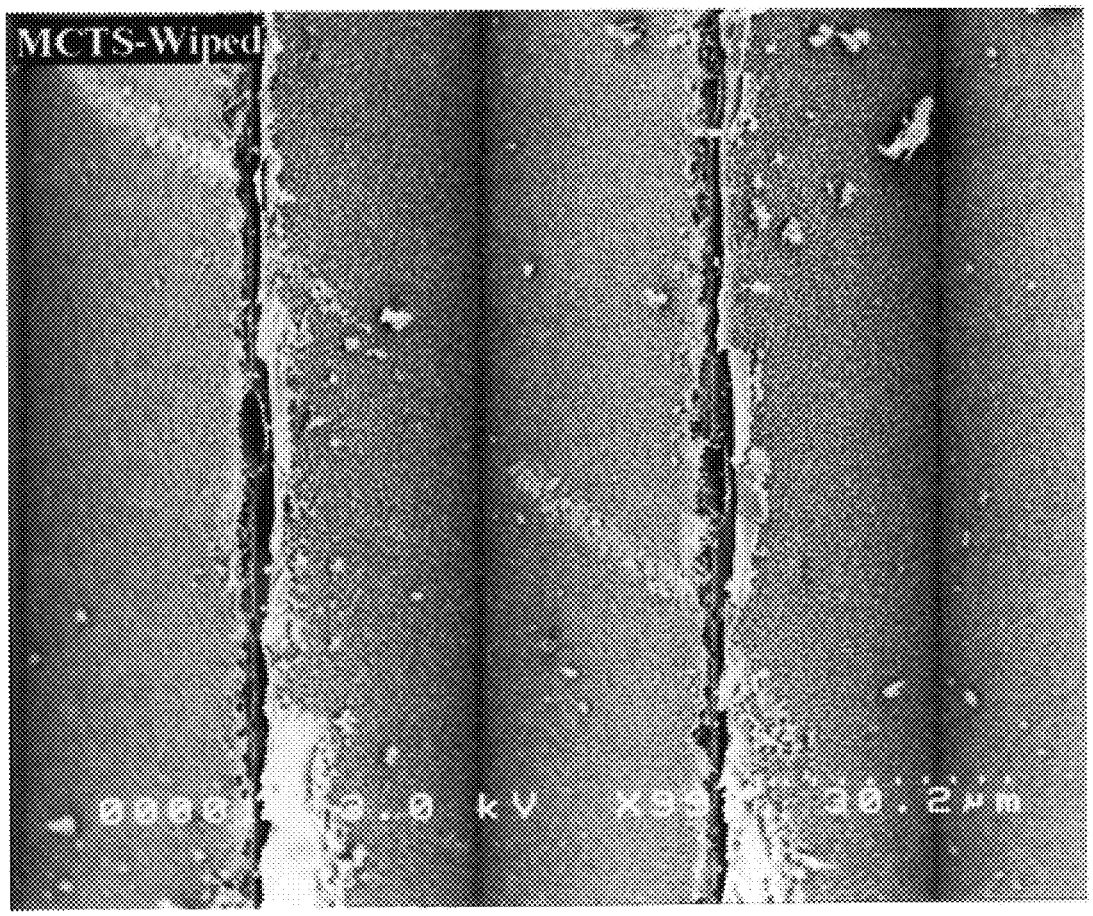
FIG. 23 is a scanning electron micrograph taken at 993× magnification of the same surface as FIG. 22(a), after wiping the surface with one pass of a cotton swab.

FIG. 22(a) is a scanning electron micrograph taken at 1000× magnification of one surface of a microtextured catalyst transfer substrate (MCTS) after deposition thereon of a nanostructured catalyst according to one aspect of the present invention. FIG. 23 is a scanning electron micrograph taken at 993× magnification of the same surface after wiping the surface with one pass of a cotton swab. The majority of catalyst coated whiskers remained on the MCTS. In comparison, virtually all of the whiskers were removed from a flat catalyst transfer substrate (FCTS) in the area contacted by wiping the surface with one pass of a cotton swab.

These results show that the MCTS protected nearly all of the nanostructured catalyst from damage and demonstrated that roll processing of the nanostructured catalyst can be achieved without damage to the catalyst using the MCTS.

Membrane electrode assemblies of three layers including an anode catalyst, polymer electrolyte membrane (PEM), and cathode catalyst were prepared using a MCTS containing a nanostructured anode catalyst and a second MCTS containing nanostructured cathode catalyst. Small sections of about 5 cm² of each catalyst-covered MCTS were pressed into the opposing surface of a PEM (Nafion™ 115) with 127 MPa pressure using a Carver vacuum press heated to 132° C. (270° F.). The catalyst-coated side of each MCTS was the side contacting the PEM. The two MCTS layers were then peeled from opposite sides of the PEM. Essentially complete catalyst transfer was observed using these conditions.

In another step, the PEM surface replicated the MCTS after cooling the three layer MEA while under the pressure described above. This resulted in a 40% increase in the PEM geometric surface area as compared with a PEM made using the FCTS.

Example 22

A thin polyimide film (50 μm thick, designated Kapton-H™, available from DuPont) was coated with a thin (less than about 1 μm) primer coating of 3% benzophenone in 1,6-hexanediol diacrylate. The primer was grafted onto the surface of the film exposing the coated film at 7.6 m/min (25 ft/min) to the radiation from a high intensity Fusion "H" lamp operating at 236 Watts/cm (EPIQ 6000, available from Fusion UV Systems, Inc., Gaithersburg, Md.). A blend of 50 wt % HMDITA-9 and 50 wt % HDODA resin was cast between the primed side of the polyimide film and an electroformed nickel mold having prisms with an altitude of 25 μm and a peak to peak distance of 50 μm. Every 30$^{th}$ row included prisms with an altitude of 38 μm. The mold was heated to 57° C. (135° F.). Hand pressure was applied to the film surface using an ink roller to minimize the resin thickness. The resin was subsequently cured through the polyimide film with an E-Beam (described above) using a dose of 50 kGy and an acceleration voltage of 275 kV. The substrate formed via this method was nearly identical in form and function to the substrate described in Example 21. There were no differences observed in catalyst deposition, catalyst transfer, and MEA performance. Moreover, no delamination of the catalyst from the support was observed using the ASTM D3359-97 test (described above).

This example provided an alternate method of preparing the MCTS.

Example 23

A thin polyimide film (50 μm thick, designated Kapton-KJ™, available from DuPont) was coated with a thin (less than about 1 μm) primer coating of 3% benzophenone in 1,6-hexanediol diacrylate. The primer was grafted onto the surface of the film by irradiating the coating at 7.6 m/min (25 ft/min) under a high intensity Fusion "H" lamp operating at 236 Watts/cm.

A blend of 74 wt % dipentaerythritol pentacrylate (SR 399, available from Sartomer, West Chester, Pa.) and 25 wt % HDODA containing 0.6 wt % camphorquinone and 0.4 wt % N,N-dimethyl-p-toluidine as a photoinitiator was then cast between the HDODA-primed side of the polyimide film and an electroformed nickel mold, as described in Example 22. The acrylate resin was subsequently cured through the polyimide film at 9.1 m/min (30 ft/min) using a Fusion "Q" lamp (available from Fusion UV Systems, Inc., Gaithersburg, Md.) operating at 236 Watts/cm, forming a film composite. This composite was removed from the mold and then the microtextured side was post-cured at 9.1 m/min (30 ft/min) under a Fusion "H" lamp at 236 Watts/cm. The MCTS formed using this method exhibited negligible differences in catalyst deposition, catalyst transfer, and MEA performance as compared to the substrates described in Examples 21 and 22. The present substrate also did not delaminate, indicating that the MCTS can also be prepared by the method described in this example.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A substrate comprising a polymeric layer having a first surface wherein at least a portion of said first surface is microtextured, said microtextures having a depth of at least 5 μm, said substrate bearing microstructures on at least one microtextured portion of said first surface.

2. The substrate according to claim 1 in which the substrate is dimensionally stable within a tolerance of 20% at 200° C.

3. The substrate according to claim 1 in which the substrate is dimensionally stable within a tolerance of 10% at 200° C.

4. The substrate according to claim 1 in which the substrate is dimensionally stable within a tolerance of 5% at 200° C.

5. The substrate of claim 1 wherein the polymeric layer comprises a material selected from the group consisting of acrylics, epoxies, fluoropolymers, polyamides, polyimides, polyketones, and polyphenyleneoxides.

6. The substrate of claim 1 wherein the polymeric layer comprises a radiation cured acrylate.

7. The substrate according to claim 1 wherein the polymeric layer comprises a material cured by radiation.

8. The substrate according to claim 1 wherein the polymeric layer comprises a material cured by electron beam, ultraviolet, visible, or thermal radiation.

9. The substrate according to claim 1 further comprising a catalyst deposited on the microstructures.

10. The substrate according to claim 1 which is capable of wrapping around the circumference of an about 30 cm diameter cylinder without breaking the substrate.

11. The substrate according to claim 10 which may be rolled upon itself.

12. The substrate according to claim 1 further comprising a support layer providing mechanical support to the polymeric layer.

13. The substrate according to claim 12 wherein the support layer comprises a material selected from the group consisting of metal foils, epoxies, fluoropolymers, polyamides, polyimides, polyketones, and polyphenyleneoxides.

14. The substrate according to claim 12 further comprising an adhesion promoting interface between the support layer and the polymeric layer.

15. The substrate according to claim 12 wherein the support layer has a roughened surface to promote attachment of the polymeric layer.

16. The substrate according to claim 12 wherein the support layer has an etched surface to promote attachment of the polymeric layer.

17. A process for making a three-layer membrane electrode assembly comprising the steps of:

A) providing a substrate according to claim 9;

B) providing a polymer electrolyte membrane; and

C) transferring the microstructures to one or more surfaces of a polymer electrolyte membrane.

18. The process according to claim 17 which is continuous.

19. A process for making a five-layer membrane electrode assembly comprising the steps of:

A) providing one or more three-layer membrane electrode assemblies according to the process of claim 17; and B) providing an electrode backing layer on each surface of said three-layer membrane electrode assembly.

20. A process for making a substrate of claim 1 comprising the steps of:

A) providing a polymer layer having a first surface;

B) shaping at least one portion of said first surface into a microtextured surface;

C) curing the microtextured surface of the polymer layer;

D) depositing a microstructure precursor onto the microtextured surface of the polymer layer; and E) converting the microstructure precursor to form microstructures.

21. The process of claim 20 further comprising the step of coating the microstructures with a catalyst.

22. A process for making the substrate of claim 1 comprising the steps of:

A) providing a support layer having a first surface;

B) depositing a polymer layer onto the first surface of the support layer;

C) shaping at least the first surface of the polymer layer into a microtextured surface;

D) curing the polymer layer having the microtextured surface;

E) depositing a microstructure precursor onto the microtextured surface; and

F) converting the microstructure precursor to form microstructures.

23. The process of claim 22 further comprising the step of including an adhesion promoting means between the first surface of the support layer and the polymer layer.

24. The process of claim 22 further comprising the step of coating the microstructures with a catalyst.

* * * * *